US011391499B2

(12) United States Patent
Kato et al.

(10) Patent No.: US 11,391,499 B2
(45) Date of Patent: Jul. 19, 2022

(54) HEAT PUMP CYCLE DEVICE AND VALVE DEVICE

(71) Applicant: DENSO CORPORATION, Kariya (JP)

(72) Inventors: Daiki Kato, Kariya (JP); Masaaki Kawakubo, Kariya (JP); Tetsuya Ito, Kariya (JP); Yasuhiro Kawase, Nisshin (JP); Ryohei Sugimura, Kariya (JP); Hiroshi Mieda, Kariya (JP)

(73) Assignee: DENSO CORPORATION, Kariya (JP)

( * ) Notice: Subject to any disclaimer, the term of this patent is extended or adjusted under 35 U.S.C. 154(b) by 211 days.

(21) Appl. No.: 16/774,250

(22) Filed: Jan. 28, 2020

(65) Prior Publication Data

US 2020/0158382 A1 May 21, 2020

Related U.S. Application Data

(63) Continuation of application No. PCT/JP2018/024596, filed on Jun. 28, 2018.

(30) Foreign Application Priority Data

Jul. 31, 2017 (JP) .............................. JP2017-148296

(51) Int. Cl.
*F25B 49/02* (2006.01)
*F25B 9/14* (2006.01)
(Continued)

(52) U.S. Cl.
CPC ................ *F25B 49/02* (2013.01); *F25B 9/14* (2013.01); *F25B 30/02* (2013.01); *F25B 41/20* (2021.01);
(Continued)

(58) Field of Classification Search
CPC .. F25B 31/005; F25B 30/02; F25B 2345/003; F25B 2600/2515; F25D 31/005;
(Continued)

(56) References Cited

U.S. PATENT DOCUMENTS

2016/0185185 A1  6/2016  Suzuki et al.
2016/0193896 A1*  7/2016  Miyakoshi ............... B60H 1/22
                                                                       62/155

(Continued)

FOREIGN PATENT DOCUMENTS

| JP | 2014213765 A | 11/2014 |
| JP | 2017187150 A | 10/2017 |
| JP | 2017190944 A | 10/2017 |

*Primary Examiner* — Elizabeth J Martin
(74) *Attorney, Agent, or Firm* — Harness, Dickey & Pierce, P.L.C.

(57) ABSTRACT

In a heat pump cycle device, a flow passage switching portion includes a flow passage switching valve body configured to open and close a cooling side flow passage. A refrigerant circulation circuit includes a low-pressure flow passage through which a low-pressure refrigerant decompressed by a first decompressor flows toward a compressor in a heating mode, and a pre-evaporator flow passage provided between the flow passage switching valve body and a refrigerant inlet of an evaporator. The flow passage switching portion causes a pre-evaporator flow passage to communicate with the low-pressure flow passage while bypassing the evaporator when a refrigerant pressure in the low-pressure flow passage is lower than a refrigerant pressure in the pre-evaporator flow passage, in the heating mode.

11 Claims, 32 Drawing Sheets

(51) Int. Cl.
    *F25B 30/02*    (2006.01)
    *F25D 31/00*    (2006.01)
    *F25B 41/325*   (2021.01)
    *F25B 41/35*    (2021.01)
    *F25B 41/20*    (2021.01)
    *F25B 41/39*    (2021.01)

(52) U.S. Cl.
    CPC ............ *F25B 41/325* (2021.01); *F25B 41/35* (2021.01); *F25B 41/39* (2021.01); *F25D 31/005* (2013.01); *F25B 2345/003* (2013.01); *F25B 2600/2515* (2013.01)

(58) Field of Classification Search
    CPC .............. B60H 1/3229; B60H 1/32281; B60H 1/00485; B60H 2001/00171; B60H 2001/3267; B60H 2001/3297; F16K 11/14; F16K 11/16; F16K 11/161; F16K 11/00; F16K 11/02; F16K 11/04; F16K 11/06; F16K 11/065; F16K 11/048; F16K 11/0716
    See application file for complete search history.

(56)          References Cited

U.S. PATENT DOCUMENTS

2019/0070929 A1* 3/2019 Nakamura ............... B60H 1/32
2019/0092135 A1  3/2019 Sugimura et al.

\* cited by examiner

HEAT PUMP CYCLE DEVICE AND VALVE DEVICE

CROSS REFERENCE TO RELATED APPLICATION

The present application is a continuation application of International Patent Application No. PCT/JP2018/024596 filed on Jun. 28, 2018, which designated the U.S. and claims the benefit of priority from Japanese Patent Application No. 2017-148296 filed on Jul. 31, 2017. The entire disclosures of all of the above applications are incorporated herein by reference.

TECHNICAL FIELD

The present disclosure relates to a heat pump cycle device and a valve device.

BACKGROUND

A heat pump cycle device may include a flow passage switching portion that switches a refrigerant flow passage in a refrigerant circulation circuit. For example, the flow passage switching portion switches between a cooling side flow passage and a heating side flow passage.

SUMMARY

According to an aspect of the present disclosure, a heat pump cycle device includes a refrigerant circulation circuit in which a refrigerant circulates and flows. In the heat pump cycle device, a flow passage switching portion is configured to switch between a cooling side flow passage through which the refrigerant flowing out of a heat exchanger is guided to a compressor via a second decompressor and an evaporator in a cooling mode and a heating side flow passage through which the refrigerant flowing out of the heat exchanger is guided to the compressor while bypassing the second decompressor and the evaporator in a heating mode. The flow passage switching portion includes a flow passage switching valve body that is located between the heat exchanger and the second decompressor to open and close the cooling side flow passage, and the flow passage switching valve body is configured to open the cooling side flow passage in the cooling mode and to close the cooling side flow passage in the heating mode.

The refrigerant circulation circuit may include a low-pressure flow passage through which a low-pressure refrigerant decompressed by a first decompressor and having a pressure lower than a pressure of the refrigerant discharged from the compressor flows toward the compressor in the heating mode, and a pre-evaporator flow passage provided between the flow passage switching valve body and a refrigerant inlet of the evaporator. The flow passage switching portion may be configured to cause the pre-evaporator flow passage to communicate with the low-pressure flow passage while bypassing the evaporator, when a refrigerant pressure in the low-pressure flow passage is lower than a refrigerant pressure in the pre-evaporator flow passage in the heating mode.

DESCRIPTION OF EMBODIMENTS

Figure 1:
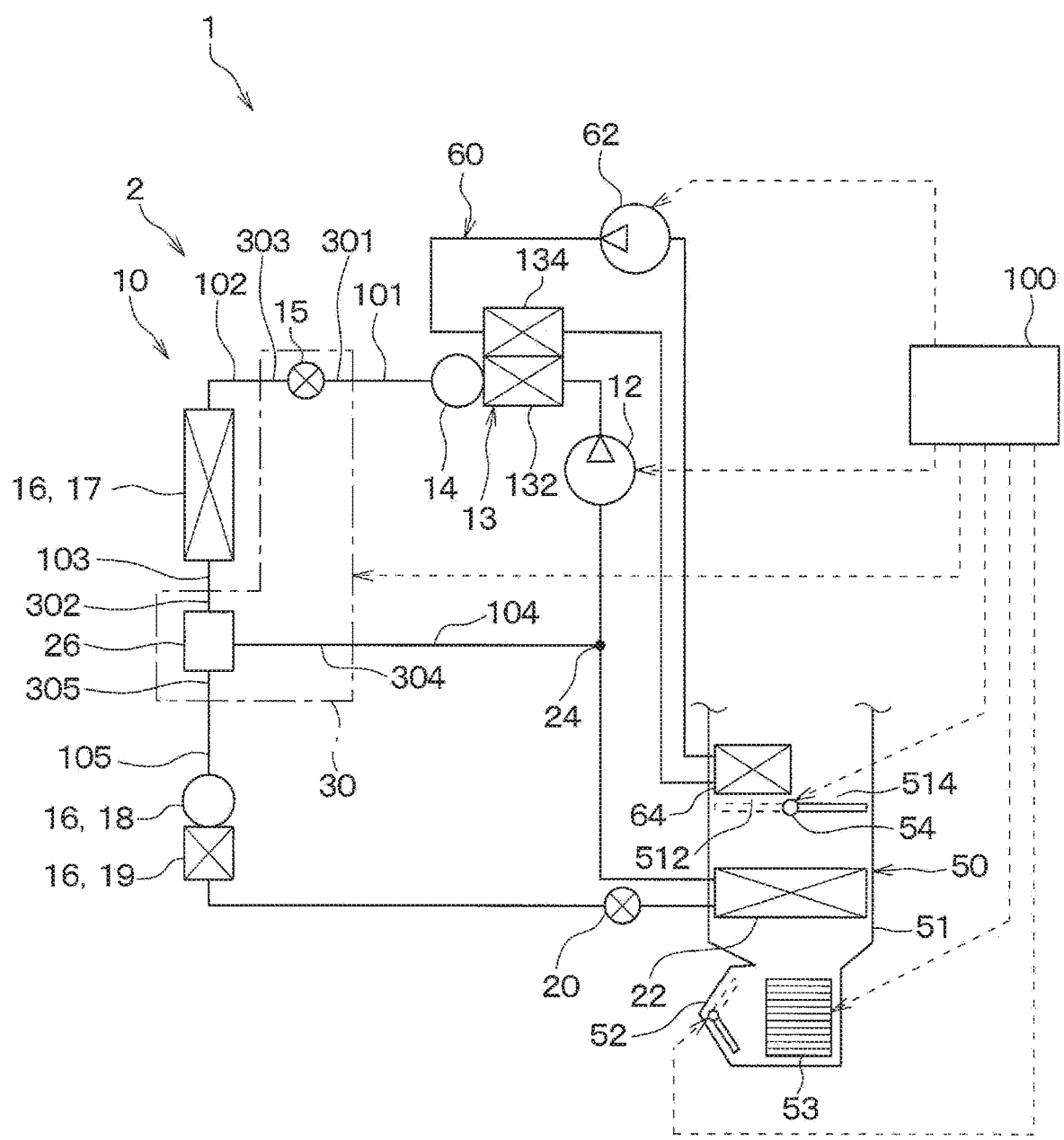
FIG. 1 is a diagram showing an entire configuration of a vehicle air conditioner according to a first embodiment.

A heat pump cycle device may switch its operation mode between a cooling mode and a heating mode. The heat pump cycle device includes a flow passage switching portion that switches a refrigerant flow passage in a refrigerant circulation circuit. Specifically, the flow passage switching portion switches between a cooling side flow passage and a heating side flow passage. The cooling side flow passage guides a refrigerant flowing out of a heat exchanger to a compressor, through a second decompressor and an evaporator in the cooling mode. The heating side flow passage guides the refrigerant flowing out of the heat exchanger to the compressor while bypassing the second decompressor and the evaporator in the heating mode. Such a flow passage switching portion is provided between the heat exchanger and the second decompressor and has a flow passage switching valve body that opens and closes the cooling side flow passage. The flow passage switching valve body is designed to open the cooling side flow passage in the cooling mode and close the cooling side flow passage in the heating mode.

In the above-mentioned heat pump cycle device, when activated in the heating mode, a liquid refrigerant that remains in a pre-evaporator flow passage located between the flow passage switching valve body and the evaporator flows into the compressor only through the evaporator to be then recovered by the compressor. At this time, the surface temperature of the evaporator decreases as the refrigerant flows through the evaporator. Consequently, frost or odor due to freezing may be caused at the evaporator.

The present disclosure is for providing a heat pump cycle device and a valve device capable of preventing the generation of frost and odor due to freezing at an evaporator in a heating mode.

According to at least one or plural embodiments of the present disclosure, a heat pump cycle device is provided with a refrigerant circulation circuit in which a refrigerant circulates and flows. The heat pump cycle device may include: a compressor configured to compress and discharge a refrigerant drawn into the compressor; a radiator configured to dissipate heat from the refrigerant discharged from the compressor; a first decompressor configured to decompress and expand the refrigerant flowing out of the radiator; a heat exchanger configured to exchange heat between the refrigerant and a heat medium other than the refrigerant; a second decompressor configured to decompress and expand the refrigerant flowing out of the heat exchanger; an evaporator configured to evaporate the refrigerant decompressed and expanded by the second decompressor; and a flow passage switching portion configured to switch a refrigerant flow passage in the refrigerant circulation circuit.

The flow passage switching portion switches between a cooling side flow passage through which the refrigerant flowing out of the heat exchanger is guided to the compressor via the second decompressor and the evaporator in a cooling mode and a heating side flow passage through which the refrigerant flowing out of the heat exchanger is guided to the compressor while bypassing the second decompressor and the evaporator in a heating mode. The flow passage switching portion includes a flow passage switching valve body that is located between the heat exchanger and the second decompressor to open and close the cooling side flow passage, and the flow passage switching valve body is configured to open the cooling side flow passage in the cooling mode and to close the cooling side flow passage in the heating mode.

The refrigerant circulation circuit includes a low-pressure flow passage through which a low-pressure refrigerant decompressed by the first decompressor and having a pressure lower than a pressure of the refrigerant discharged from the compressor flows toward the compressor in the heating mode, and a pre-evaporator flow passage provided between the flow passage switching valve body and a refrigerant inlet of the evaporator, and the flow passage switching portion causes the pre-evaporator flow passage to communicate with the low-pressure flow passage while bypassing the evaporator when a refrigerant pressure in the low-pressure flow passage is lower than a refrigerant pressure in the pre-evaporator flow passage in the heating mode.

With this configuration, at the start of the heating mode, at least a part of the refrigerant present in the pre-evaporator flow passage can be caused to flow into the compressor while bypassing the evaporator. Thus, the amount of the refrigerant passing through the evaporator can be reduced, as compared with the case where the refrigerant remaining in the pre-evaporator flow passage flows into the compressor only through the evaporator. Consequently, a decrease in the temperature of the evaporator when recovering the refrigerant can be suppressed. The generation of frost and odor due to freezing at the evaporator can be prevented.

According to another embodiment of the present disclosure, a valve device used in a heat pump cycle device is provided. The heat pump cycle device is configured to be switchable between a cooling side flow passage through which the refrigerant flowing out of the heat exchanger is guided to the compressor via the second decompressor and the evaporator in a cooling mode and a heating side flow passage through which the refrigerant flowing out of the heat exchanger is guided to the compressor while bypassing the second decompressor and the evaporator in a heating mode.

The valve device is provided between the heat exchanger and the second decompressor, and includes a flow passage switching valve body configured to open and close the cooling side flow passage. The flow passage switching valve body opens the cooling side flow passage by operating an actuator to drive the flow passage switching valve body in the cooling mode and closes the cooling side flow passage by operating the actuator in the heating mode.

The heat pump cycle device includes a low-pressure flow passage through which a low-pressure refrigerant decompressed by the first decompressor and having a pressure lower than a pressure of the refrigerant discharged from the compressor flows toward the compressor in the heating mode, and a pre-evaporator flow passage provided between the flow passage switching valve body and a refrigerant inlet of the evaporator.

When the refrigerant pressure in the low-pressure flow passage is lower than the refrigerant pressure in the pre-evaporator flow passage, and a pressure difference between the refrigerant pressure in the low-pressure flow passage and the refrigerant pressure in the pre-evaporator flow passage is larger than a predetermined value in the heating mode, the flow passage switching valve body opens the cooling side flow passage by the pressure difference. The flow passage switching valve body closes the cooling side flow passage when the pressure difference is smaller than the predetermined value in the heating mode.

Thus, when the refrigerant pressure in the low-pressure flow passage is lower than the refrigerant pressure in the pre-evaporator flow passage, and the pressure difference between the refrigerant pressure in the low-pressure flow passage and the refrigerant pressure in the pre-evaporator flow passage is larger than the predetermined value, the flow passage switching valve body opens the cooling side flow passage by the pressure difference, so that the pre-evaporator flow passage communicates with the low-pressure flow passage while bypassing the evaporator. The flow passage switching valve body closes the cooling side flow passage when the pressure difference is smaller than the predetermined value in the heating mode, so that the pre-evaporator flow passage does not communicate with the low-pressure flow passage while bypassing the evaporator.

Thus, at the start of the heating mode, at least a part of the refrigerant remaining in the pre-evaporator flow passage can be caused to flow into the compressor while bypassing the evaporator. Consequently, the amount of the refrigerant passing through the evaporator can be reduced, as compared with the case where the refrigerant remaining in the pre-evaporator flow passage flows into the compressor only through the evaporator. Therefore, a decrease in the temperature of the evaporator when recovering the refrigerant can be suppressed. The generation of frost and odor due to freezing at the evaporator can be prevented.

If the refrigerant is recovered by the compressor only through the second decompressor and the evaporator, it takes time to recover the refrigerant depending on the opening degree of the passage in the second decompressor. In this case, the refrigerant circulation circuit may be in the refrigerant shortage state at the start of the heating mode. In contrast, according to another aspect of the present disclosure described above, at least a part of the refrigerant that remains in a portion of the pre-evaporator flow passage at the flow passage switching valve body side rather than the second decompressor can flow into the compressor while bypassing the second decompressor and the evaporator. Thus, the refrigerant can be quickly recovered, as compared with the case where the refrigerant is recovered by the compressor only through the second decompressor and the evaporator. Therefore, the refrigerant shortage in the refrigerant circulation circuit can be prevented in the heating mode. Reference numerals with parentheses attached to the respective constituent elements and the like indicate an example of the correspondent relationships between the constituent elements and specific constituent elements to be described in the embodiments below.

Hereinafter, detail embodiments of the present disclosure will be described with reference to the accompanying drawings. In the respective embodiments below, the same or equivalent parts will be denoted by the same reference characters.

First Embodiment

As shown in FIG. 1, in the present embodiment, a heat pump cycle device 2 of the present disclosure is used in a vehicle air conditioner 1. The vehicle air conditioner 1 includes the heat pump cycle device 2, an interior air conditioning unit 50, and a controller 100. The heat pump cycle device 2 includes a heat pump circuit 10.

The vehicle air conditioner 1 is mounted on a hybrid vehicle that can obtain a traveling driving force from both an internal combustion engine (not shown) and a traveling electric motor. The hybrid vehicle or electric vehicle wastes less heat in the vehicle and is thus difficult to secure a heat source for air heating of the interior of a vehicle cabin, compared to any other vehicle which obtains a traveling driving force only from the internal combustion engine. For this reason, the vehicle air conditioner 1 of the present embodiment is configured to perform air-heating of the interior of the vehicle cabin by the interior air conditioning unit 50 using the high-temperature and high-pressure refrigerant discharged from a compressor 12 in the heat pump circuit 10 as a heat source.

The heat pump circuit 10 is a fluid circulation circuit in which a refrigerant circulates as a predetermined fluid. The heat pump circuit 10 constitutes a heat pump cycle. More specifically, the heat pump circuit 10 uses an HFC-based refrigerant (for example, R134a) as the refrigerant and constitutes a vapor compression subcritical refrigeration cycle in which the pressure of the high-pressure side refrigerant does not exceed the critical pressure of the refrigerant. Obviously, the used refrigerant may be an HFO-based refrigerant (for example, R1234yf), carbon dioxide, or the like.

The heat pump circuit 10 is configured to be switchable between a refrigerant circuit in an air cooling mode of performing air-cooling of the interior of the vehicle cabin by cooling the ventilation air to be blown into the vehicle cabin, and a refrigerant circuit in an air heating mode of performing air-heating of the interior of the vehicle cabin by heating the ventilation air to be blown into the vehicle cabin. In the present embodiment, the ventilation air to be blown into the vehicle cabin serves as the fluid to be temperature-regulated. In the present embodiment, the air cooling mode corresponds to the cooling mode of cooling the fluid to be temperature-regulated, whereas the air heating mode corresponds to the heating mode of heating the fluid to be temperature-regulated.

The heat pump circuit 10 includes the compressor 12, a coolant-refrigerant heat exchanger 13, an air heating liquid reservoir 14, an exterior heat exchanger 16, an air cooling expansion valve 20, an evaporator 22, an integrated valve device 30, and the like.

The compressor 12 is disposed inside a bonnet. The compressor 12 compresses and discharges the refrigerant drawn thereinto. The compressor 12 of the present embodiment is constituted of an electric compressor that is driven by an electric motor (not shown). The compressor 12 is capable of changing its discharge capacity of the refrigerant in accordance with the rotation speed of the electric motor. The operation of the compressor 12 is controlled by a control signal output from the controller 100.

The coolant-refrigerant heat exchanger 13 includes a first heat exchanging portion 132 through which the high-pressure refrigerant discharged from the compressor 12 flows and a second heat exchanging portion 134 through which an antifreeze solution flows.

The coolant-refrigerant heat exchanger 13 is a radiator that dissipates heat from the refrigerant flowing through the first heat exchanging portion 132 by heat exchange with the antifreeze solution flowing through the second heat exchanging portion 134. The antifreeze solution flowing through the second heat exchanging portion 134 is heated by the refrigerant flowing through the first heat exchanging portion 132.

The second heat exchanging portion 134 is provided in an antifreeze solution circulation circuit 60 through which the antifreeze solution flows. The antifreeze solution circulation circuit 60 is provided with a circulation pump 62 that circulates the antifreeze solution, and a heater core 64 that dissipates heat from the antifreeze solution. The operation of the circulation pump 62 is controlled by a control signal from the controller 100.

The heater core 64 is disposed in a hot air passage 512 formed in an air conditioning case 51 of the interior air conditioning unit 50. The heater core 64 is a radiator that dissipates heat from the antifreeze solution flowing therethrough, by heat exchange with the ventilation air that has passed through the hot air passage 512. The ventilation air passing through the hot air passage 512 is heated by the antifreeze solution flowing through the heater core 64.

Therefore, the coolant-refrigerant heat exchanger 13 of the present embodiment serves as a radiator that indirectly dissipates heat from the high-pressure refrigerant discharged from the compressor 12, into the ventilation air via the antifreeze solution and the heater core 64.

The air heating liquid reservoir 14 separates the refrigerant flowing out of the coolant-refrigerant heat exchanger 13, into a liquid refrigerant and a gas refrigerant. The air heating liquid reservoir 14 temporarily stores part of the refrigerant flowing out of the first heat exchanging portion 132.

The integrated valve device 30 is one valve device that integrates therein the air heating expansion valve 15 and a three-way valve 26. The integrated valve device 30 is configured as a combined control valve in which the air heating expansion valve 15 and the three-way valve 26 operate in synchronization with each other. The operation of the integrated valve device 30 is controlled by a control signal from the controller 100.

Figure 2:
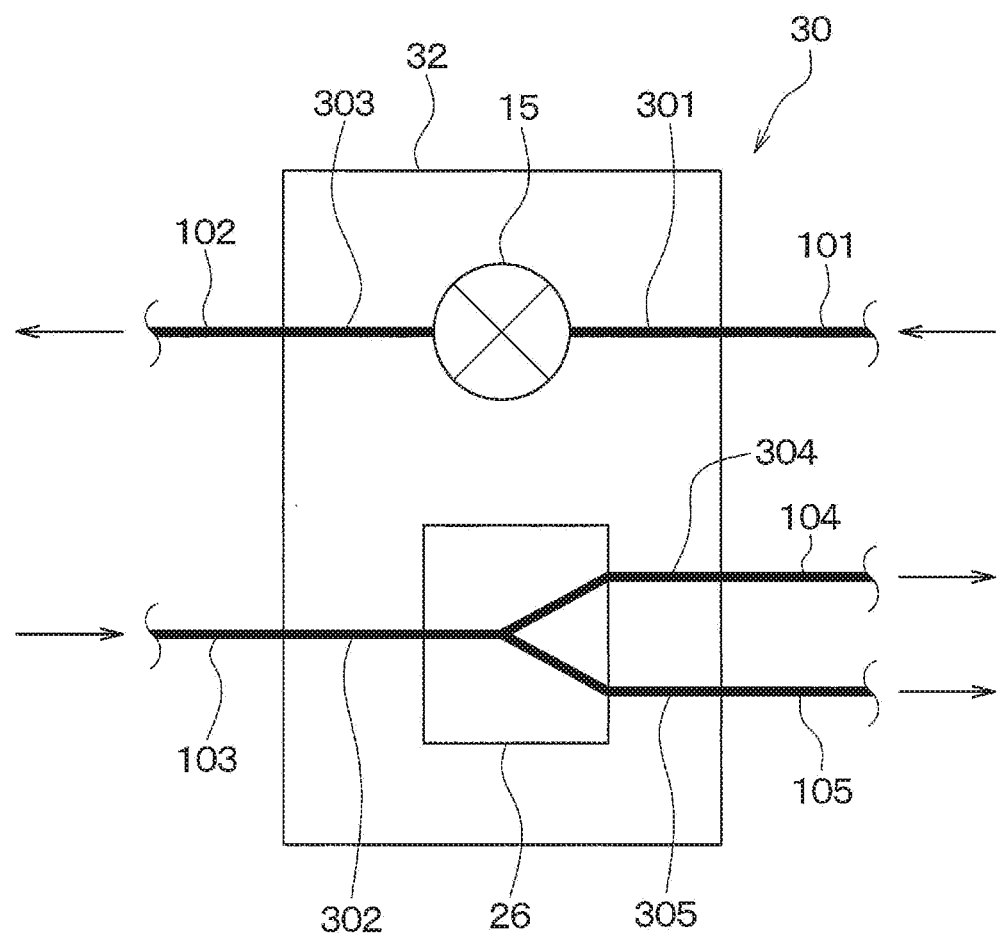
FIG. 2 is a schematic view of an integrated valve device shown in FIG. 1.

As shown in FIG. 2, the integrated valve device 30 includes a body portion 32, the air heating expansion valve 15, and the three-way valve 26. As refrigerant passages through which the refrigerant flows, the body portion 32 has a first inlet passage 301 and a second inlet passage 302, into which the refrigerant flows, as well as a first outlet passage 303, a second outlet passage 304, and a third outlet passage 305, from which the refrigerant flows.

The first inlet passage 301 is an inlet passage for the air heating expansion valve 15. The first outlet passage 303 is an outlet passage for the air heating expansion valve 15. The second inlet passage 302 is an inlet passage for the three-way valve 26. The second outlet passage 304 and the third outlet passage 305 are outlet passages for the three-way valve 26.

As shown in FIGS. 1 and 2, the first inlet passage 301 leads to a flow passage 101 through which the refrigerant flowing out of the coolant-refrigerant heat exchanger 13 flows. The first outlet passage 303 leads to a flow passage 102 that guides the refrigerant to a core portion 17. Therefore, the first inlet passage 301 and the first outlet passage 303 are decompressor passages that guide the refrigerant flowing out of the coolant-refrigerant heat exchanger 13 to the core portion 17.

The second inlet passage 302 leads to a flow passage 103 through which the refrigerant flowing out of the core portion 17 flows. Therefore, the second inlet passage 302 is an introduction passage into which the refrigerant flowing out of the core portion 17 flows.

The second outlet passage 304 leads to an air heating flow passage 104 that guides the refrigerant to the suction side of the compressor 12 while bypassing a liquid receiver 18, a subcooling portion 19, the air cooling expansion valve 20, and the evaporator 22. The third outlet passage 305 leads to an air cooling flow passage 105 that guides the refrigerant to the suction side of the compressor 12 via the liquid receiver 18, the subcooling portion 19, the air cooling expansion valve 20, and the evaporator 22.

The air heating flow passage 104 corresponds to a heating side flow passage that guides the refrigerant flowing out of the heat exchanger to the compressor while bypassing the second decompressor and the evaporator in the heating mode. The air cooling flow passage 105 corresponds to a cooling side flow passage that guides the refrigerant flowing out of the heat exchanger to the compressor while bypassing the second decompressor and the evaporator in the cooling mode. Therefore, the second outlet passage 304 is a heating side lead-out passage that leads out the refrigerant to the heating side flow passage. The third outlet passage 305 is a cooling side lead-out passage that leads out the refrigerant to the cooling side flow passage. The detailed configuration of the integrated valve device 30 will be described later.

The air heating expansion valve 15 is a flow rate adjusting valve that adjusts the flow rate of the refrigerant flowing from the first inlet passage 301 to the first outlet passage 303. The air heating expansion valve 15 decompresses and expands the refrigerant flowing out of the air heating liquid reservoir 14 in the heating mode. The three-way valve 26 selectively switches between the air heating flow passage 104 and the air cooling flow passage 105. In this way, the three-way valve 26 is a flow passage switching valve that switches the flow passage of the refrigerant in the heat pump circuit 10.

The exterior heat exchanger 16 is a heat exchanger that is disposed outside the vehicle cabin so as to be exposed to the air outside the vehicle cabin (i.e., outside air). The exterior heat exchanger 16 includes the core portion 17, the liquid receiver 18, and the subcooling portion 19.

The core portion 17 is a heat exchanger that exchanges heat between the refrigerant and the outside air as a heat medium other than the refrigerant. The core portion 17 functions as a heat absorber that absorbs heat from the outside air or a radiator that dissipates heat into the outside air, depending on the temperature of the refrigerant and the outside air temperature. The core portion 17 functions as a condenser that condenses the refrigerant by dissipating heat from the refrigerant into the outside air in the air cooling mode. The core portion 17 functions as an evaporator that evaporates the refrigerant by absorbing heat from the outside air in the air heating mode.

The liquid receiver 18 separates the refrigerant flowing out of the core portion 17 into a liquid refrigerant and a gas refrigerant. The liquid receiver 18 temporarily stores part of the separated liquid refrigerant as excess refrigerant in the cycle.

The subcooling portion 19 is a heat exchanger that cools the liquid refrigerant flowing out of the liquid receiver 18 by exchanging heat with the outside air in the air cooling mode.

The air cooling expansion valve 20 decompresses and expands the refrigerant flowing out of the exterior heat exchanger 16 in the air cooling mode. The air cooling expansion valve 20 of the present embodiment is constituted of a thermal expansion valve that decompresses and expands the refrigerant to flow into the evaporator 22 by a mechanical mechanism such that the superheat degree of the refrigerant at the refrigerant outlet side of the evaporator 22 is within a predetermined range.

The evaporator 22 is connected to the refrigerant outlet side of the air cooling expansion valve 20. The evaporator 22 is disposed on the upstream side of the air flow with respect to the heater core 64 within the air conditioning case 51 of the interior air conditioning unit 50. The evaporator 22 is a cooling heat exchanger that evaporates the low-pressure refrigerant decompressed by the air cooling expansion valve 20 by exchanging heat with the ventilation air to cool the ventilation air. The refrigerant outlet side of the evaporator 22 is connected to the refrigerant suction side of the compressor 12.

In the heat pump circuit 10 of the present embodiment, a merging portion 24 is provided between the evaporator 22 and the compressor 12 so as to merge the refrigerant flow downstream side of the evaporator 22 with the refrigerant flow downstream side of the second outlet passage 304 in the integrated valve device 30.

Next, the interior air conditioning unit 50 will be described. The interior air conditioning unit 50 is disposed inside a dashboard (instrumental panel) at the foremost portion of the interior of the vehicle cabin. The interior air conditioning unit 50 has therein the air conditioning case 51 that forms an air passage for the ventilation air to be blown into the vehicle cabin, while forming an outer shell therein.

An inside/outside air switching device 52 is disposed at the most upstream side of air flow in the air conditioning case 51. The inside/outside air switching device 52 switches between the air inside the vehicle cabin (inside air) and the outside air and introduces the switched air into the air conditioning case 51. A blower 53 is disposed on the downstream side of the air flow with respect to the inside/outside air switching device 52. The blower 53 blows the air introduced thereinto via the inside/outside air switching device 52, to the interior of the vehicle cabin. The blower 53 is constituted of an electric blower. The rotation speed of the blower 53 is controlled by a control signal output from the controller 100 to be described later.

The evaporator 22 and the heater core 64 are disposed on the downstream side of the air flow with respect to the blower 53. The evaporator 22 and the heater core 64 are disposed in this order relative to the ventilation air flow.

In the air conditioning case 51 of the present embodiment, the hot air passage 512 in which the heater core 64 is disposed and a bypass passage 514 through which the air flows bypassing the hot air passage 512 are provided on the downstream side of the air flow with respect to the evaporator 22.

An air mix door 54 is disposed in the air conditioning case 51 to adjust the air volume of the ventilation air flowing into the hot air passage 512 and the air volume of the ventilation air flowing into the bypass passage 514. The operation of the air mix door 54 is controlled by a control signal output from the controller 100, which will be described later.

An opening (not shown) that communicates with the interior of the vehicle cabin as a space to be air-conditioned is formed in a portion of the air conditioning case 51 at the most downstream side of the air flow. The air that is temperature-regulated by the evaporator 22 and the heater core 64 is blown out into the vehicle cabin through the opening (not shown).

Next, the controller 100, which is an electric control unit of the vehicle air conditioner 1, will be described. The controller 100 is constituted of a well-known microcomputer, including a CPU, a ROM, a RAM, and the like, and peripheral circuits thereof. A storage unit of the controller 100 is constituted of a non-transitory substantive storage medium.

The controller 100 performs various arithmetic computations and other processing based on control programs stored in the ROM or the like, and controls the operations of respective control units for the compressor 12, the integrated valve device 30, the circulation pump 62, the inside/outside air switching device 52, the blower 53, the air mix door 54, and the like, which are connected to the output side of the controller 100.

The controller 100 incorporates therein the control units for controlling various control target devices connected to its output side. For example, in the present embodiment, a component of the controller 100 (for example, hardware and/or software) that controls the operation of the integrated valve device 30 constitutes a drive control unit for driving the integrated valve device 30.

Figure 3:
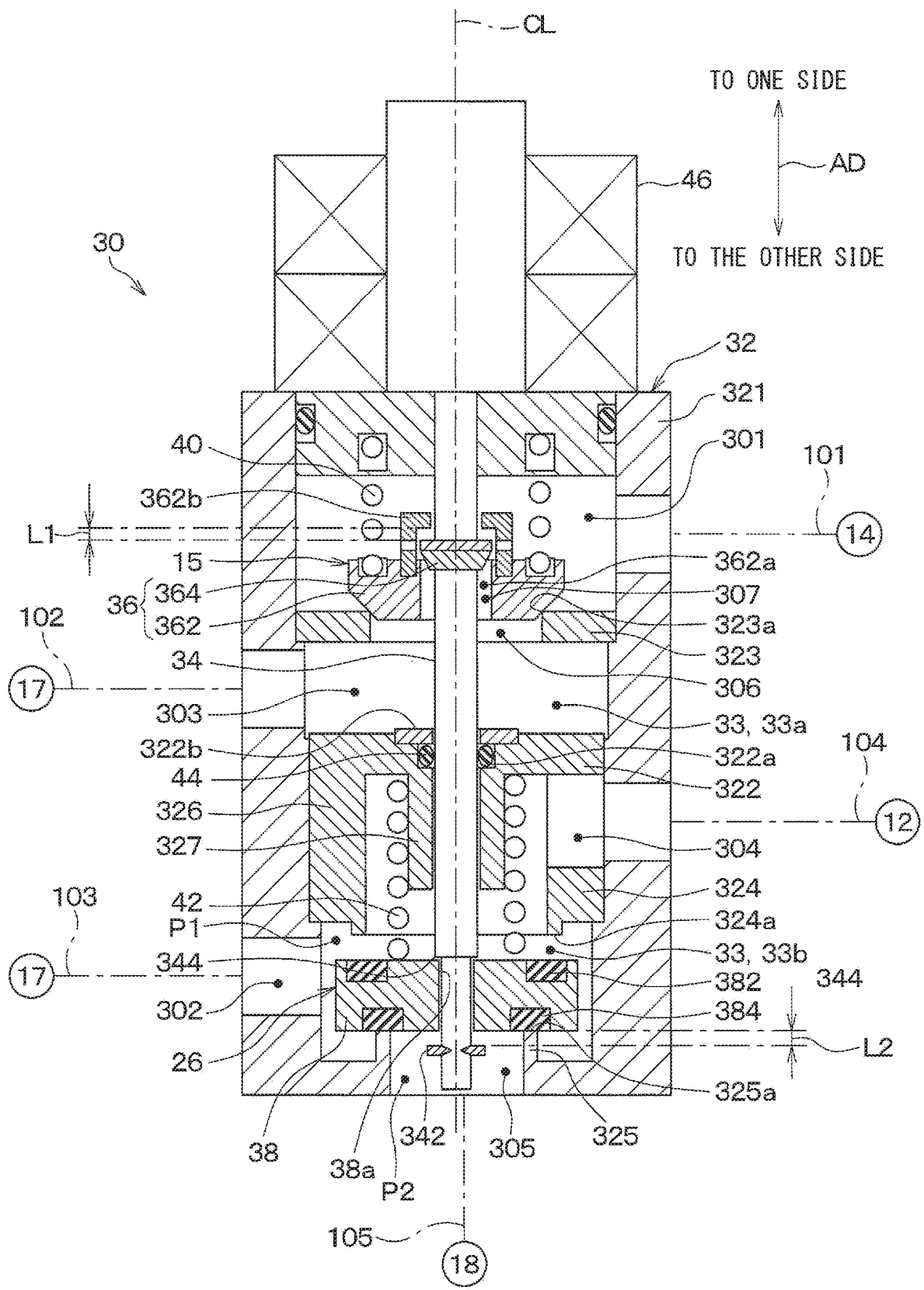
FIG. 3 is a cross-sectional view of the integrated valve device of FIG. 1.

Subsequently, the details of the integrated valve device 30 of the present embodiment will be described below. As shown in FIG. 3, the integrated valve device 30 includes the body portion 32, a rod 34, a first valve body 36, a second valve body 38, a first urging spring 40, a second urging spring 42, and an actuator 46. The arrow AD shown in FIG. 3 is the direction that extends along the axial center CL of the rod 34 in the integrated valve device 30 (i.e., the axial direction of the rod 34). The axial center CL of the rod 34 of the present embodiment extends along the vertical direction. Thus, in the present embodiment, the axial direction AD of the rod 34 coincides with the vertical direction. One side of the axial direction AD corresponds to the upper side. The other side of the axial direction AD corresponds to the lower side.

The body portion 32 is made of a metal material with excellent heat resistance and pressure resistance. The body portion 32 may be made of a resin material with excellent heat resistance and pressure resistance. An internal space 33 constituting a refrigerant passage is formed inside the body portion 32. Specifically, the body portion 32 includes a cylindrical portion 321, a partition 322, a first valve seat forming portion 323, a second valve seat forming portion 324, and a third valve seat forming portion 325.

The cylindrical portion 321 is a cylindrical member that constitutes the outer appearance of the body portion 32. The partition 322, the first valve seat forming portion 323, the second valve seat forming portion 324, and the third valve seat forming portion 325 are provided inside the cylindrical portion 321.

The partition 322 partitions the internal space 33 into an upper space 33a and a lower space 33b. The upper space 33a is a space located above the partition 322. The lower space 33b is a space located below the partition 322. The partition 322 is constituted of a member separated from the cylindrical portion 321. The partition 322 is fixed to the cylindrical portion 321 by press fitting or the like.

The first valve seat forming portion 323, the first valve body 36, and the first urging spring 40 are provided inside the upper space 33a. The first valve seat forming portion 323, the first valve body 36, and the first urging spring 40 constitute the air heating expansion valve 15. The first valve seat forming portion 323 corresponds to the flow-rate valve seat forming portion. The first valve body 36 corresponds to a flow rate adjustment valve body. The first urging spring 40 corresponds to a flow-rate urging member.

The first valve seat forming portion 323 forms a first valve seat 323a. The first valve seat 323a is a valve seat for a main valve body, which a main valve body 362 of the first valve body 36 comes into contact with or separates from. The first inlet passage 301 is formed above the first valve seat forming portion 323 in the upper space 33a. The first outlet passage 303 is formed below the first valve seat forming portion 323 in the upper space 33a. Therefore, the upper space 33a corresponds to a space within the body portion 32 partitioned by the partition 322, which space is located on the first outlet passage 303 side and includes the first outlet passage 303.

A passage communication hole 306 for communicating the first inlet passage 301 with the first outlet passage 303 is formed in the first valve seat forming portion 323. The first valve seat forming portion 323 is a member different from the cylindrical portion 321. The first valve seat forming portion 323 is fixed to the cylindrical portion 321 by press fitting or the like.

The first valve body 36 is disposed above the first valve seat forming portion 323. The first valve body 36 includes the main valve body 362 and a sub-valve body 364.

The main valve body 362 comes into contact with or separates from the first valve seat 323a. The main valve body 362 is not fixed to the rod 34. The main valve body 362 is provided with a first insertion hole 362a through which the rod 34 is inserted. The first insertion hole 362a has a hole diameter larger than the outer diameter of the rod 34 so that a gap passage 307 through which the refrigerant flows is formed between an inner wall surface of the first insertion hole 362a and the rod 34. Specifically, the first insertion hole 362a formed in the main valve body 362 has a larger hole diameter than a second insertion hole 38a formed in the second valve body 38.

The sub-valve body 364 is a valve body that adjusts the opening area of the gap passage 307 in a state where the main valve body 362 abuts against the first valve seat 323a. The sub-valve body 364 is fixed to the rod 34. For this reason, the sub-valve body 364 is configured to be movable integrally with the rod 34. The sub-valve body 364 is formed of a valve body that has its outer diameter smaller than that of the main valve body 362. The sub-valve body 364 is disposed above the main valve body 362.

The sub-valve body 364 also functions as a pressing portion that presses the main valve body 362 upward, that is, to the side where the main valve body 362 is separated from the first valve seat 323a. To displace the main valve body 362 away from the first valve seat 323a, the main valve body 362 is provided with a sub-valve abutting portion 362b that abuts against the sub-valve body 364 when the rod 34 is moved upward. The sub-valve abutting portion 362b is connected to the main valve body 362. The sub-valve abutting portion 362b is a cylindrical member that has a bottom on one side. An opening is formed in a side wall of the cylindrical member.

The first urging spring 40 is disposed above the main valve body 362. The first urging spring 40 is an urging member that urges the main valve body 362 downward, i.e., toward the side where the main valve body 362 faces the first valve seat 323a. The first urging spring 40 is a coil spring.

When the rod 34 moves from the lower side to the upper side, the sub-valve body 364 abuts against the sub-valve abutting portion 362b, and the sub-valve body 364 thereby presses the sub-valve abutting portion 362b upward, causing the rod 34 to urge the main valve body 362 upward. Consequently, the main valve body 362 is separated from the first valve seat 323a. The first inlet passage 301 and the first outlet passage 303 communicate with each other through a gap 308 and the passage communication hole 306, which are located between the main valve body 362 and the first valve seat 323a. As a result, the flow-rate adjustment passage between the first inlet passage 301 and the first outlet passage 303 is brought into an opened state. The opened state is a state in which the refrigerant is hardly decompressed, but the refrigerant flows from the first inlet passage 301 to the first outlet passage 303. In the opened state, the opening area of the flow-rate adjustment passage is set to a predetermined size. In the opened state, the flow-rate adjustment passage is mainly configured by the passage communication hole 306 and the gap 308 between the main valve body 362 and the first valve seat 323a.

When the rod 34 moves from the upper side to the lower side, the sub-valve body 364 is separated from the sub-valve abutting portion 362b, bringing the rod 34 into the state of not urging the main valve body 362. In such a state, the first urging spring 40 urges the main valve body 362 downward. Consequently, the main valve body 362 abuts against the first valve seat 323a, thus eliminating the gap 308 between the main valve body 362 and the first valve seat 323a. The first inlet passage 301 and the first outlet passage 303 communicate with each other via the passage communication hole 306 and the gap passage 307. As a result, the flow-rate adjustment passage between the first inlet passage 301 and the first outlet passage 303 is brought into a throttled state. In the throttled state, the gap passage 307 and the passage communication hole 306 constitute the flow-rate adjustment passage. The throttled state is a state in which the opening area of the flow-rate adjustment passage is smaller than that in the opened state. That is, the throttled state is a state in which the flow of the refrigerant flowing from the first inlet passage 301 to the first outlet passage 303 is throttled more than that in the opened state. In such a throttled state, the sub-valve body 364 decreases the opening area of the gap passage 307 as the rod 34 moves from the upper side to the lower side.

In this way, the first valve body 36 is brought into the opened state when the rod 34 moves upward to place the main valve body 362 away from the first valve seat 323a. When the rod 34 moves downward to cause the main valve body 362 to abut against the first valve seat forming portion 323, the first valve body 36 is in a throttled state of exhibiting the decompression effect of the refrigerant. That is, the first valve body 36 is configured to be capable of switching between the opened state and the throttled state.

The first valve body 36 can adjust the opening area of the gap passage 307 to a desired size by displacing the sub-valve body 364 in the throttled state. That is, the first valve body 36 is capable of reducing the pressure of the refrigerant flowing out of the first outlet passage 303 to a desired pressure in the throttled state. In other words, the first valve body 36 is configured to be capable of adjusting the flow rate of the refrigerant in the throttled state.

In the present embodiment, the passage opening degree of the gap passage 307 is finely adjusted by displacing the sub-valve body 364. Thus, the driving force required to move the rod 34 can be reduced, compared to the case where the opening degree of the passage is finely adjusted by the main valve body 362.

The second valve seat forming portion 324, the third valve seat forming portion 325, the second valve body 38, and the second urging spring 42 are provided in the lower space 33b. The second valve seat forming portion 324, the third valve seat forming portion 325, the second valve body 38, and the second urging spring 42 constitute the three-way valve 26. The second valve body 38 corresponds to a flow passage switching valve body. The second valve seat forming portion 324 corresponds to a switching valve seat forming portion disposed on the partition side of the flow passage switching valve body. The second urging spring 42 corresponds to a switching urging member.

The second outlet passage 304 is formed above the second valve seat forming portion 324 in the lower space 33b. Therefore, the lower space 33b corresponds to a space within the body portion 32 partitioned by the partition 322, which space is located on the second outlet passage 304 side and includes the second outlet passage 304. The second inlet passage 302 is formed between the second valve seat forming portion 324 and the third valve seat forming portion 325 in the lower space 33b. A passage communication hole that communicates with the second inlet passage 302 is formed in the third valve seat forming portion 325. The passage communication hole constitutes the third outlet passage 305.

The second valve seat forming portion 324 is disposed above the second valve body 38. The second valve seat forming portion 324 forms a second valve seat 324a. The upper side of the second valve body 38, that is, the partition 322 side of the second valve body 38 comes into contact with or separates from the second valve seat 324a. The second valve seat 324a corresponds to a switching valve seat which the partition side of the flow passage switching valve body comes into contact with or separates from. The second valve seat forming portion 324 is connected to the partition 322 via a connecting portion 326. In the present embodiment, the second valve seat forming portion 324 is formed as a member integral with the partition 322. The integral member is a continuous member that has no seam.

The third valve seat forming portion 325 is disposed below the second valve body 38. The third valve seat forming portion 325 forms a third valve seat 325a. The lower side of the second valve body 38, that is, the side of the second valve body 38 away from the partition 322 comes into contact with or separates from the third valve seat 325a. The third valve seat forming portion 325 is formed as a member integral with the cylindrical portion 321.

The second valve body 38 is disposed between the second valve seat forming portion 324 and the third valve seat forming portion 325 in the axial direction AD. The second valve body 38 has packings 382 and 384 at a part thereof that abuts against the valve seat 324a of the second valve seat forming portion 324 and another part there of that abuts against the valve seat 325a of the third valve seat forming portion 325, respectively. The second valve body 38 is not fixed to the rod 34. The second valve body 38 is provided with the second insertion hole 38a into which the rod 34 is inserted. The second insertion hole 38a has a hole diameter slightly larger than the outer diameter of the rod 34 so that a fine gap passage through which the refrigerant hardly circulates is formed between the rod 34 and the inner wall surface of the second insertion hole 38a.

The second urging spring 42 is disposed above the second valve body 38. The second urging spring 42 is an urging member that urges the second valve body 38 downward, i.e., toward the side where the second valve body 38 closes the third outlet passage 305. The second urging spring 42 is a coil spring. The second valve body 38 abuts against the third valve seat 325a by the urging force of the second urging spring 42. Consequently, the integrated valve device 30 is in a first communication state where the second inlet passage 302 communicates with the second outlet passage 304 while closing the third outlet passage 305.

The second valve body 38 is pressed upward by a pressing portion 342 provided on the rod 34 against the urging force of the second urging spring 42. At this time, the second valve body 38 is urged upward, that is, in the direction that closes the second outlet passage 304. When urged upward, the second valve body 38 abuts against the second valve seat forming portion 324. Consequently, the integrated valve device 30 is in a second communication state where the second inlet passage 302 communicates with the third outlet passage 305 while closing the second outlet passage 304.

When the abutting state against the pressing portion 342 is released, the second valve body 38 moves downward by the urging force of the second urging spring 42. Consequently, the second valve body 38 is in the first communication state.

The rod 34 is a shaft member that interlocks the first valve body 36 with the second valve body 38. The rod 34 moves along the axial center CL to displace the first valve body 36 and the second valve body 38. The rod 34 is constituted of a single stick-shaped member that extends along the axial center CL. The main valve body 362 and the second valve body 38 are mounted on the rod 34. The rod 34 is integrally provided with the sub-valve body 364 and the pressing portion 342 that presses the second valve body 38. The rod 34 has its upper end connected to the actuator 46 and moves in the axial direction AD by the driving force output from the actuator 46.

The partition 322 is provided with a third insertion hole 322a through which the rod 34 is inserted. The integrated valve device 30 includes a sealing member 44 that seals a gap between an inner wall surface of the third insertion hole 322a and the rod 34 in a state where the rod 34 is slidable. The sealing member 44 is a ring-shaped elastic member. The sealing member 44 is covered with a cover portion 322b provided on the upper side of the partition 322. The sealing member 44 can prevent the refrigerant flowing through the first outlet passage 303 from flowing into the second outlet passage 304 from the gap between the inner wall surface of the third insertion hole 322a and the rod 34.

The partition 322 has a cylindrical portion 327 extending from the peripheral portion of the third insertion hole 322a toward the three-way valve 26. The rod 34 is inserted into the cylindrical portion 327. The cylindrical portion 327 supports the second urging spring 42.

The actuator 46 is a driving portion that outputs a driving force for moving the rod 34 in the axial direction AD. The actuator 46 of the present embodiment is constituted of a linear actuator, which converts a rotational motion of a device into a linear motion (i.e., a sliding motion) thereof and outputs the linear motion.

The actuator 46 of the present embodiment includes an electric motor that generates a rotational driving force by energization, a power conversion mechanism, and the like. The electric motor is constituted of a stepping motor capable of controlling a rotation angle in accordance with a pulse signal input thereto. The power conversion mechanism is a mechanism that converts the rotational motion of the output shaft of the electric motor into the linear motion and moves the rod 34 in the axial direction AD.

Figure 4:
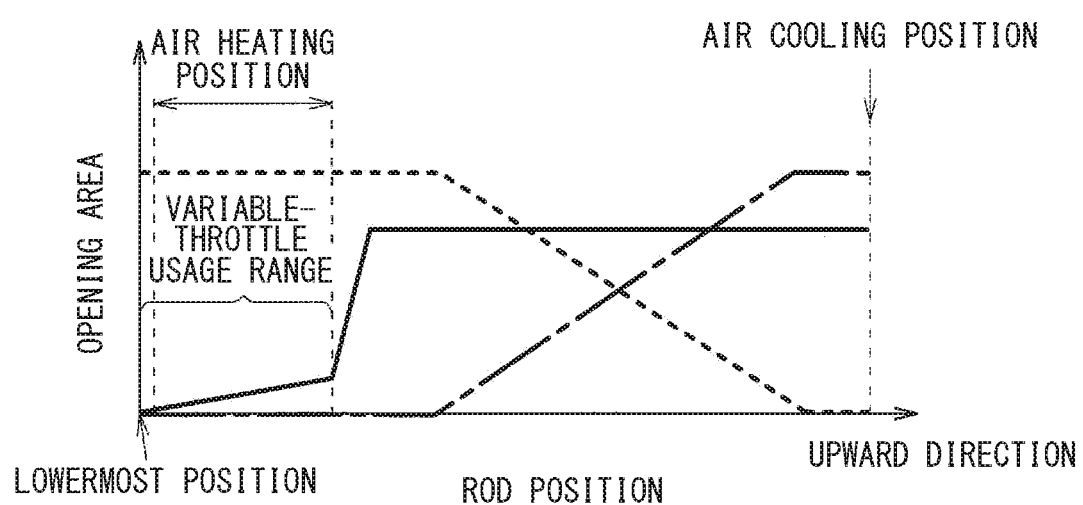
FIG. 4 is a diagram showing the relationship between the opening area of each outlet passage and the position of a rod in the integrated valve device shown in FIG. 3.

Here, FIG. 4 is a characteristic diagram showing the relationship between the respective opening areas of the first outlet passage 303, the second outlet passage 304, and the third outlet passage 305 and the position of the rod 34 in the integrated valve device 30. In FIG. 4, the solid line indicates changes in the opening area of the first outlet passage 303; the broken line indicates changes in the opening area of the second outlet passage 304; and the dashed-dotted line indicates changes in the opening area of the third outlet passage 305. The opening area of the first outlet passage 303 is a passage cross-sectional area of the flow-rate adjustment passage adjusted by the first valve body 36. The respective opening areas of the second outlet passage 304 and the third outlet passage 305 are the respective passage cross-sectional areas of the second outlet passage 304 and the third outlet passage 305 adjusted by the second valve body 38, respectively. The opening area of each of the first outlet passage 303, the second outlet passage 304, and the third outlet passage 305 is the passage cross-sectional area effective for the refrigerant to flow.

As shown in FIG. 4, the integrated valve device 30 can adjust the respective opening areas of the first outlet passage 303, the second outlet passage 304, and the third outlet passage 305 by changing the position of the rod 34. The lowermost position of the rod 34 corresponds to the state of the integrated valve device 30 shown in FIG. 3. When the rod 34 is located at an air heating position, the integrated valve device 30 is in the state shown in FIG. 5. When the rod 34 is located at a refrigerant position, the integrated valve device 30 is in the state shown in FIG. 6.

Specifically, when the rod 34 is located at the lowest position, as shown in FIG. 3, the pressing portion 342 of the rod 34 is separated from the second valve body 38. Thus, the second urging spring 42 urges the second valve body 38. The rod 34 does not urge the second valve body 38. Consequently, the second valve body 38 is separated from the second valve seat 324a, causing the second valve body 38 to abut against the third valve seat 325a. As a result, the second outlet passage 304 is fully opened, and the third outlet passage 305 is completely closed. That is, as shown in FIG. 4, the opening area of the second outlet passage 304 becomes maximum, and the opening area of the third outlet passage 305 becomes zero (0). Thus, as shown in FIG. 3, the second valve body 38 is brought into the first communication state where the second inlet passage 302 communicates with the second outlet passage 304 while blocking the third outlet passage 305.

At this time, as shown in FIG. 3, the sub-valve body 364 of the first valve body 36 is separated from the sub-valve abutting portion 362b. Thus, the first urging spring 40 urges the main valve body 362. The rod 34 does not urge the main valve body 362. Consequently, the main valve body 362 abuts against the first valve seat 323a. Furthermore, the sub-valve body 364 abuts against the main valve body 362 to close the gap passage 307. As a result, the first outlet passage 303 is completely closed. That is, as shown in FIG. 4, the opening area of the first outlet passage 303 becomes zero (0). At this time, since the first outlet passage 303 is completely closed, the circulation of the refrigerant is stopped in the heat pump circuit 10.

Figure 5:
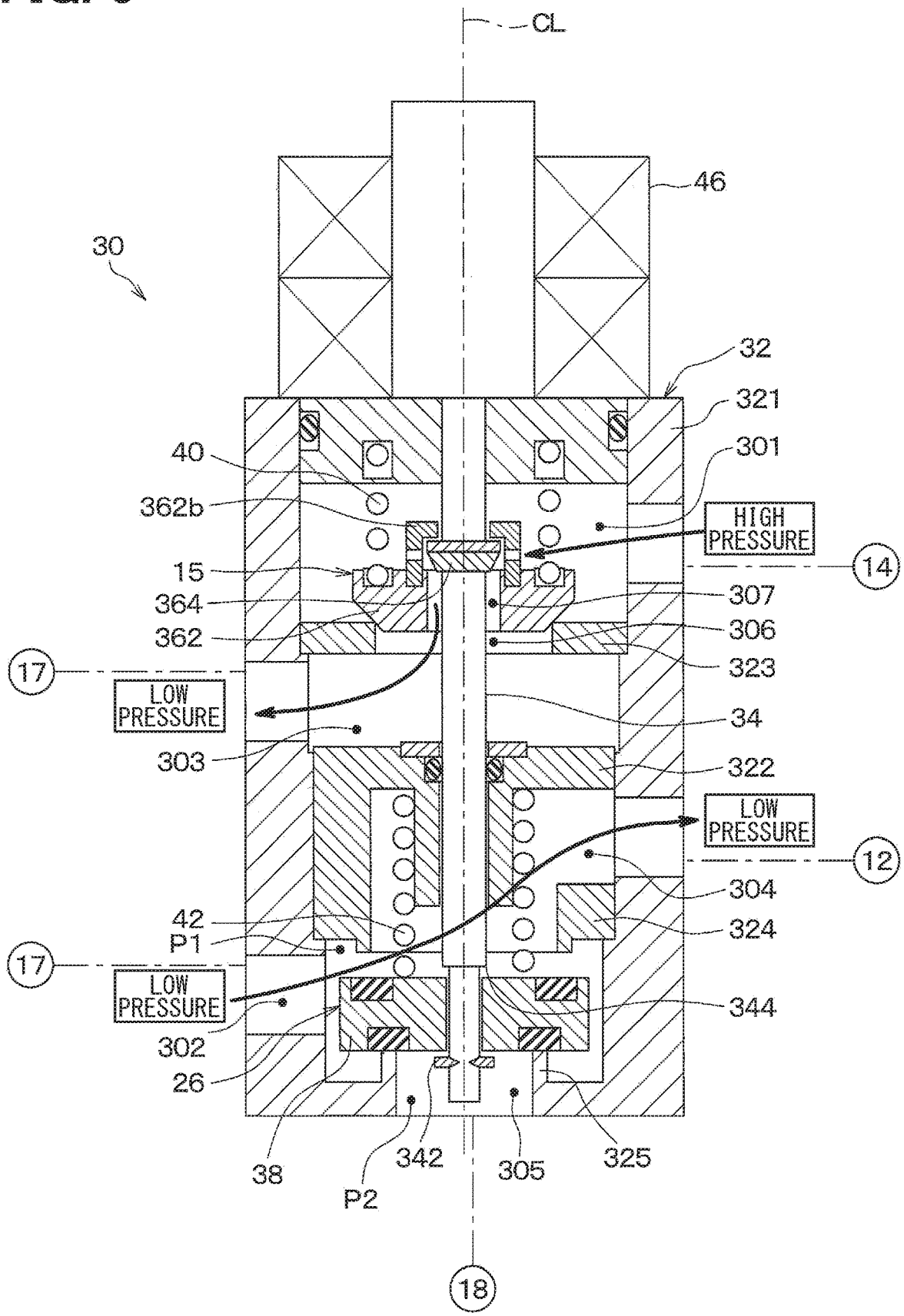
FIG. 5 is a cross-sectional view of the integrated valve device of the first embodiment in an air heating mode.

The rod 34 moves upward from the lowermost position, so that the rod 34 is located at the air heating position. At this time, as shown in FIG. 5, the pressing portion 342 of the rod 34 remains separated from the second valve body 38. Consequently, the second valve body 38 is in the first communication state, similarly to when the rod is located at the lowermost position.

At this time, the sub-valve body 364 of the first valve body 36 is separated from the main valve body 362. Thus, the first inlet passage 301 and the first outlet passage 303 communicate with each other through the gap passage 307 and the passage communication hole 306. Therefore, the refrigerant flowing from the first inlet passage 301 to the first outlet passage 303 is decompressed to a desired pressure.

The second urging spring 42 urges the second valve body 38, and the rod 34 does not urge the second valve body 38, and the second valve body 38 thereby maintains the first communication state. Thus, in the first communication state, the position of the sub-valve body 364 can be finely adjusted by changing the position of the rod 34. Consequently, the opening area of the first outlet passage 303 can be changed in a variable-throttle usage range of the rod positions shown in FIG. 4.

In this way, when the position of the rod 34 is in the variable-throttle usage range, the pressing portion 342 is separated from the second valve body 38. Thus, the second urging spring 42 urges the second valve body 38, and the rod 34 does not urge the second valve body 38, and the second valve body 38 can thereby maintain the first communication state. When the second valve body 38 is in the first communication state, the rod 34 urges the sub-valve body 364 of the first valve body 36, so that the first valve body 36 can adjust the flow rate of the refrigerant.

As shown in FIG. 3, when the position of the rod 34 is located at the lowest side in the axial direction AD, the distance L2 between the pressing portion 342 and the second valve body 38 in the axial direction AD is equal to or longer than the distance L1 between the sub-valve body 364 and the sub-valve abutting portion 362b in the axial direction AD. Thus, the pressing portion 342 is separated from the second valve body 38 when the position of the rod 34 is within the variable-throttle usage range, which is a range that can change the opening area of the first outlet passage 303.

Figure 6:
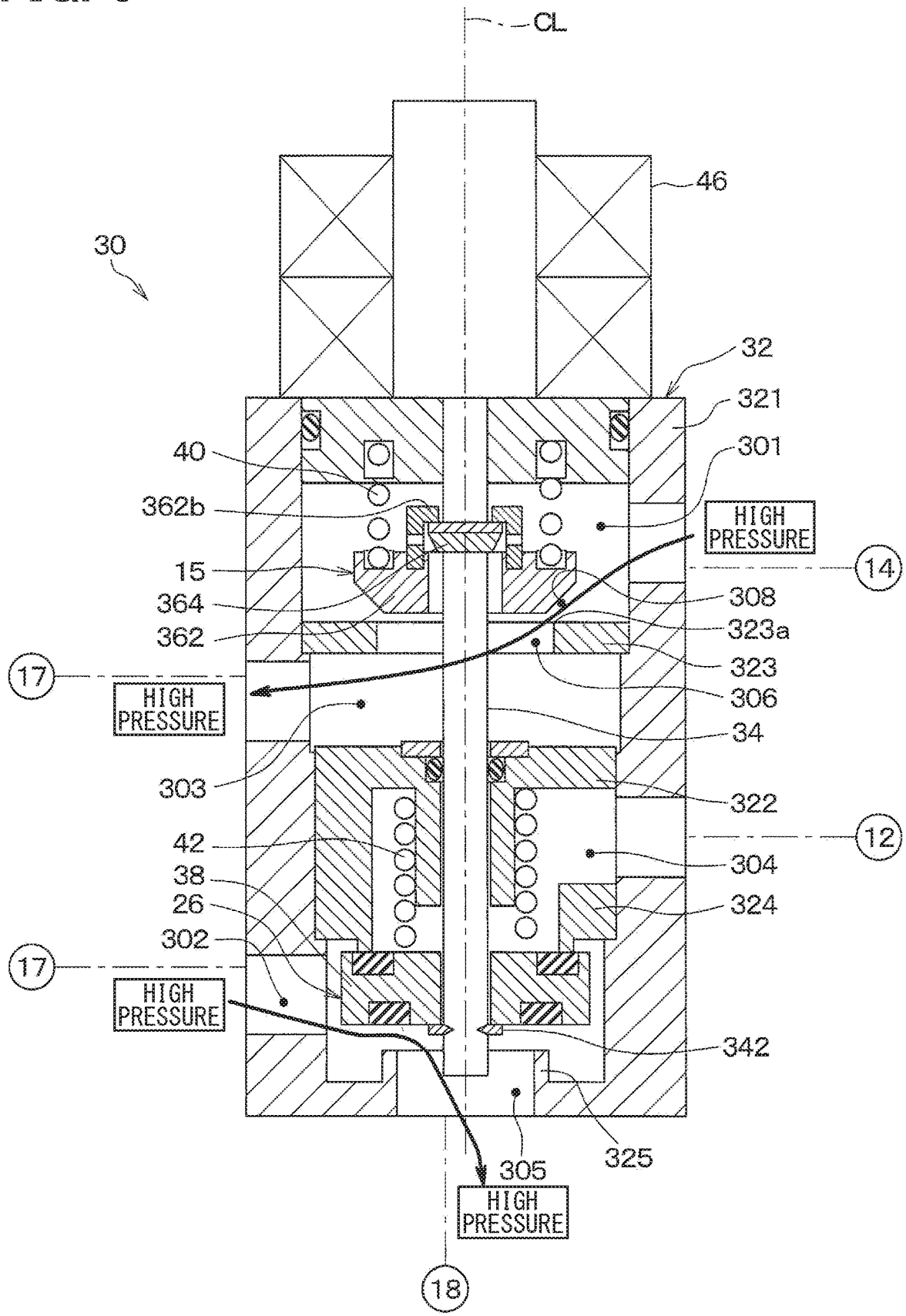
FIG. 6 is a cross-sectional view of the integrated valve device of the first embodiment in an air cooling mode.

When the rod 34 moves upward from the air heating position to be located at the air cooling position, the pressing portion 342 of the rod 34 abuts against the second valve body 38 as shown in FIG. 6. The rod 34 urges the second valve body 38 upward against the urging force of the second urging spring 42. Consequently, the second valve body 38 is separated from the third valve seat 325a, causing the second valve body 38 to abut against the second valve seat 324a. As a result, the second outlet passage 304 is completely closed, and the third outlet passage 305 is fully opened. That is, as shown in FIG. 4, the opening area of the second outlet passage 304 becomes zero (0), and the opening area of the third outlet passage 305 becomes maximum. Thus, as shown in FIG. 6, the second valve body 38 is brought into the second communication state where the second inlet passage 302 communicates with the third outlet passage 305 while closing the second outlet passage 304.

At this time, the sub-valve body 364 of the first valve body 36 abuts against the sub-valve abutting portion 362b. The rod 34 urges the main valve body 362 upward. Consequently, the main valve body 362 is separated from the first valve seat 323a. Thus, the first inlet passage 301 and the first outlet passage 303 communicate with each other through the passage communication hole 306 and the gap 308 between the main valve body 362 and the first valve seat 323a. Therefore, the refrigerant flowing from the first inlet passage 301 to the first outlet passage 303 flows into the core portion 17 of the exterior heat exchanger 16 without almost being decompressed.

In this way, the second valve body 38 is moved in the axial direction AD and can thereby switch selectively between the first communication state and the second communication state of the integrated valve device. Meanwhile, the first valve body 36 is moved in the axial direction AD and can thereby switch selectively between the opened state in which the refrigerant flows from the first inlet passage 301 to the first outlet passage 303 and the throttled state in which the flow of the refrigerant from the first inlet passage 301 to the first outlet passage 303 is throttled more than that in the opened state. In addition, the first valve body 36 can adjust the flow rate of the refrigerant in the throttled state. That is, the first valve body 36 can switch between the opened state and the variable throttle state.

As shown in FIG. 4, both the moving direction of the rod 34 that switches the first valve body 36 from the variable throttle state to the opened state and the moving direction of the rod 34 that increases the flow rate of the refrigerant when the first valve body 36 is in the variable throttle state are oriented in the same upward direction. That is, the direction that increases the opening area of the first outlet passage 303 is the same as the moving direction of the rod 34 that is oriented toward one side in the axial direction AD.

With this configuration, the first valve body 36 can be controlled easily as compared to the case where the direction that increases the opening area of the first outlet passage 303 is not the same as the moving direction of the rod 34 oriented toward one side in the axial direction AD. Unlike the present embodiment, for example, there may be a comparative case where the moving direction of the rod 34 that switches the first valve body 36 from the variable throttle state to the opened state is opposite to the moving direction of the rod 34 that increases the flow rate of the refrigerant when the first valve body 36 is in the variable throttle state. In this case, if the opening area of the first outlet passage 303 is made extremely small with the first valve body 36 being in the variable throttle state, the first valve body 36 will be brought into the opened state. In contrast, the present embodiment can avoid the first valve body 36 from being brought into the opened state when the opening area of the first outlet passage 303 is made extremely small with the first valve body 36 being in the variable throttle state.

Next, the operation of the vehicle air conditioner 1 of the present embodiment will be described. The vehicle air conditioner 1 of the present embodiment can switch its operation mode between the air cooling mode and the air heating mode by the control of each control target device by the controller 100. Hereinafter, the operation of the vehicle air conditioner 1 in the air cooling mode and the air heating mode will be described.

(Air Cooling Mode)

Figure 7:
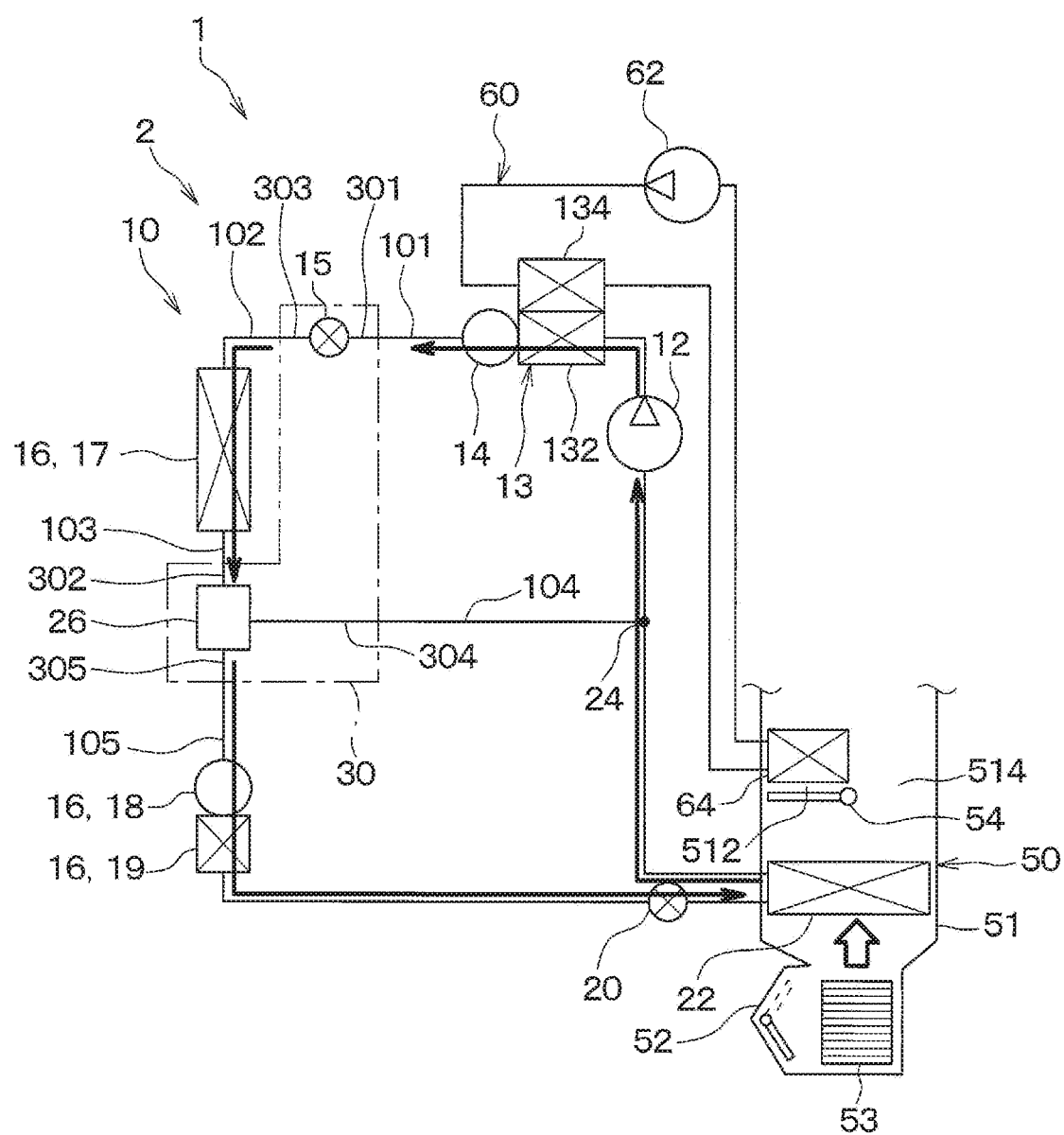
FIG. 7 is a diagram showing the vehicle air conditioner of the first embodiment in the air cooling mode.

As shown in FIG. 7, the controller 100 controls the position of the air mix door 54 to open the bypass passage 514 when the operation mode of the air conditioner is set to the air cooling mode. Thus, the interior air conditioning unit 50 in the air cooling mode is configured to cause the whole amount of ventilation air having passed through the evaporator 22 to pass through the bypass passage 514. The controller 100 stops the circulation pump 62 not to exchange heat between the refrigerant and the antifreeze solution in the coolant-refrigerant heat exchanger 13.

The controller 100 controls the actuator 46 such that the rod 34 is located at the air cooling position shown in FIG. 6. Thus, the heat pump circuit 10 becomes a refrigerant circuit in the air cooling mode.

In the refrigerant circuit during the air cooling mode, the high-pressure refrigerant discharged from the compressor 12 flows into the coolant-refrigerant heat exchanger 13. During this time, as the circulation pump 62 is stopped, the high-pressure refrigerant flows from the coolant-refrigerant heat exchanger 13 into the integrated valve device 30 without almost exchanging any heat with the antifreeze solution.

As shown in FIG. 6, in the air cooling mode, the air heating expansion valve 15 is in an opened state. Thus, the high-pressure refrigerant flowing into the first inlet passage 301 of the integrated valve device 30 flows out of the first outlet passage 303 without almost being decompressed. The high-pressure refrigerant flowing out of the first outlet passage 303 flows into the core portion 17 of the exterior heat exchanger 16. The high-pressure refrigerant flowing into the core portion 17 dissipates heat into the outside air, and then flows into the second inlet passage 302 of the integrated valve device 30. In the air cooling mode, the three-way valve 26 is in the second communication state. Thus, the high-pressure refrigerant flowing into the second inlet passage 302 flows into the liquid receiver 18 via the third outlet passage 305.

As shown in FIG. 7, the high-pressure refrigerant flowing into the liquid receiver 18 is separated into a gas-phase refrigerant and a liquid-phase refrigerant. The liquid refrigerant stored in the liquid receiver 18 flows into the subcooling portion 19. The high-pressure refrigerant flowing into the subcooling portion 19 dissipates heat into the outside air and then flows into the air cooling expansion valve 20 to be decompressed to a low-pressure refrigerant. The refrigerant decompressed in the air cooling expansion valve 20 flows into the evaporator 22, evaporates therein by absorbing heat from the ventilation air, which is to be blown into the vehicle cabin, and is then drawn into the compressor 12 again.

As mentioned above, in the air cooling mode, after being cooled by the evaporator 22 of the heat pump circuit 10, the ventilation air is blown out into the vehicle cabin without being heated by the heater core 64. Thus, the air-cooling of the interior of the vehicle cabin is achieved.

(Air Heating Mode)

Figure 8:
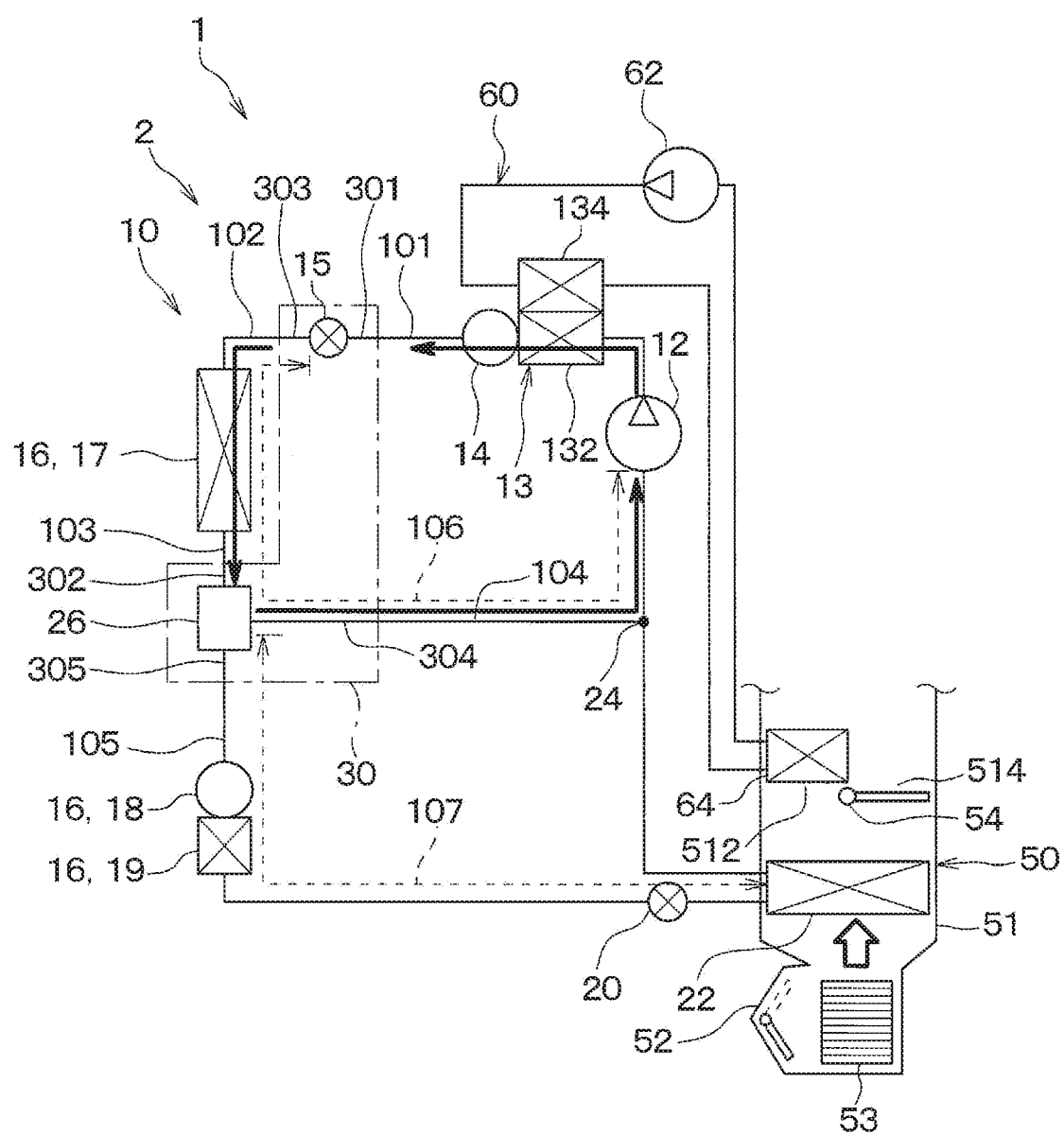
FIG. 8 is a diagram showing the vehicle air conditioner of the first embodiment in the air heating mode.

As shown in FIG. 8, the controller 100 controls the position of the air mix door 54 to close the bypass passage 514 when the operation mode of the air conditioner is set to the air heating mode. Thus, the interior air conditioning unit 50 in the air heating mode is configured to cause the whole amount of ventilation air having passed through the evaporator 22 to pass through the hot air passage 512. The controller 100 operates the circulation pump 62 so as to exchange heat between the refrigerant and the antifreeze solution in the coolant-refrigerant heat exchanger 13.

The controller 100 controls the actuator 46 such that the rod 34 is located at the air heating position shown in FIG. 5. Thus, the heat pump circuit 10 becomes a refrigerant circuit in the air heating mode.

In the refrigerant circuit during the air heating mode, the high-pressure refrigerant discharged from the compressor 12 flows into the first heat exchanging portion 132 of the coolant-refrigerant heat exchanger 13, so that the heat included in the high-pressure refrigerant is dissipated into the ventilation air via the antifreeze solution and the heater core 64. The high-pressure refrigerant that dissipates its heat in the coolant-refrigerant heat exchanger 13 is separated into a gas refrigerant and a liquid refrigerant in the air heating liquid reservoir 14. Then, the liquid refrigerant separated in the air heating liquid reservoir 14 flows into the integrated valve device 30.

As shown in FIG. 5, in the air heating mode, the air heating expansion valve 15 is in the variable throttle state. Thus, the high-pressure refrigerant flowing into the first inlet passage 301 of the integrated valve device 30 is decompressed to the low-pressure refrigerant and then flows out of the first outlet passage 303. At this time, the controller 100 adjusts the opening area of the first outlet passage 303 (that is, the controller 100 adjusts the opening area of the gap passage 307 that constitutes the flow-rate adjustment passage) such that the superheat degree of the refrigerant on the refrigerant suction side of the compressor 12 is within a predetermined range.

The refrigerant flowing out of the first outlet passage 303 flows into the core portion 17 of the exterior heat exchanger 16. The refrigerant flowing into the core portion 17 absorbs heat from the outside air to evaporate. The gas refrigerant evaporated in the core portion 17 flows into the second inlet passage 302 of the integrated valve device 30. In the air heating mode, the three-way valve 26 is in the first communication state. Thus, the low-pressure refrigerant flowing into the second inlet passage 302 flows out of the second outlet passage 305 and then flows through the air heating flow passage 104.

As shown in FIG. 8, the gas refrigerant flowing out of the integrated valve device 30 flows to the refrigerant suction side of the compressor 12 via the air heating flow passage 104 and is then compressed again by the compressor 12.

As mentioned above, in the air heating mode, the ventilation air is indirectly heated by the heat of the high-pressure refrigerant in the heat pump circuit 10. Then, the ventilation air heated by the interior air conditioning unit 50 is blown out into the interior of the vehicle cabin. Thus, the air-heating of the interior of the vehicle cabin is achieved.

(Start of Air Heating Mode)

The operation of the integrated valve device 30 at the start of the air heating mode will be described below. The term "start of the air heating mode" as used herein corresponds to either a predetermined period of time immediately after the startup of the operation of the compressor in the air heating mode from the stopped state of the compressor or a predetermined period of time immediately after switching the operation mode of the air conditioner from the air cooling mode to the air heating mode.

Figure 9:
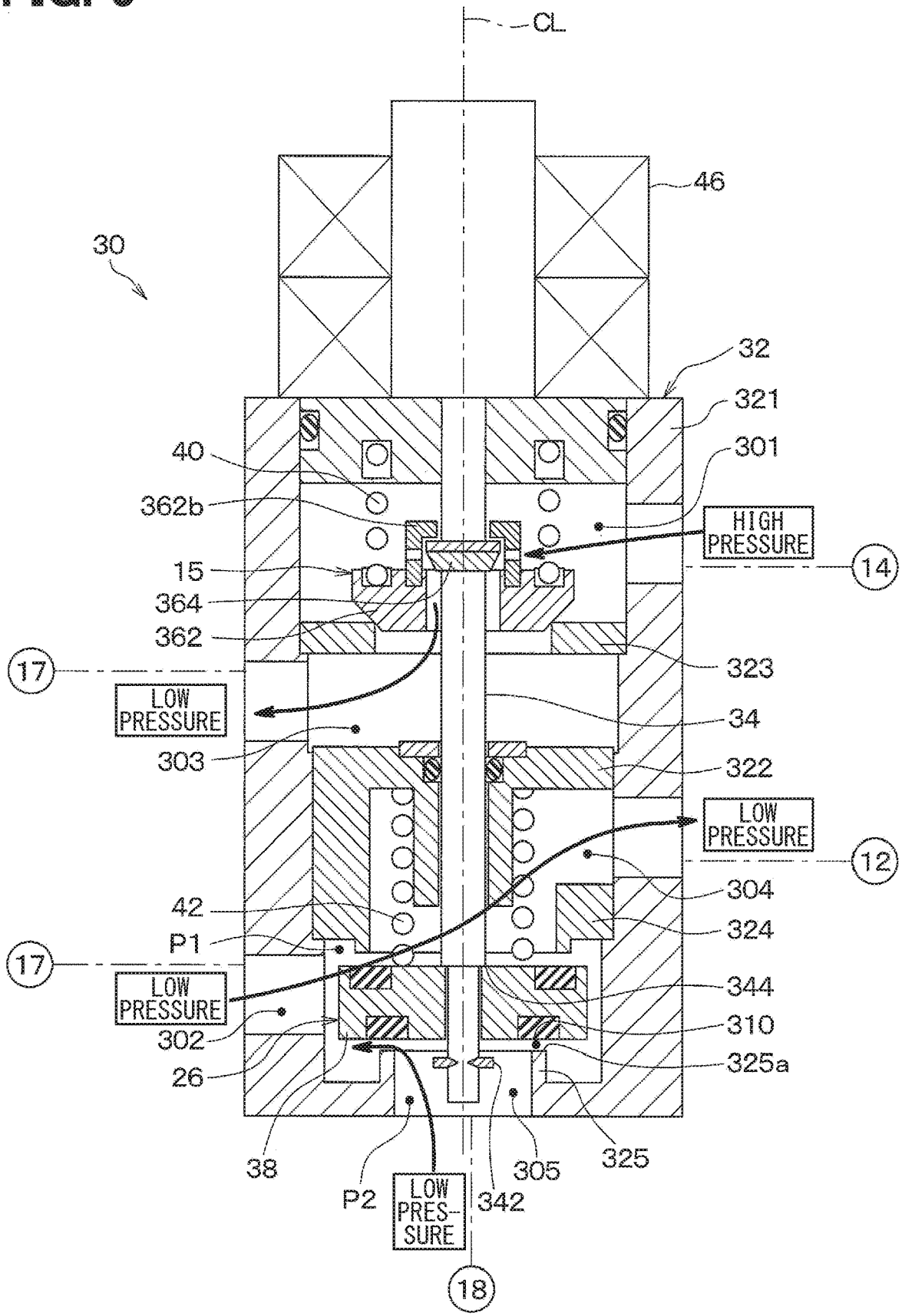
FIG. 9 is a cross-sectional view of the integrated valve device of the first embodiment at start of the air heating mode.

In the present embodiment, as shown in FIG. 9, during the air heating mode, when the refrigerant pressure P1 of the second inlet passage 302 in the integrated valve device 30 is lower than the refrigerant pressure P2 of the third outlet passage 305 and a pressure difference between both pressures is larger than a predetermined value, the second valve body 38 opens the third outlet passage 305 by the pressure difference. When the pressure difference is smaller than the predetermined value, the second valve body 38 closes the third outlet passage 305. Specifically, the urging force of the second urging spring 42 is set such that the second valve body 38 opens the third outlet passage 305 when the pressure difference is larger than the predetermined value. The predetermined value is a pressure value larger than 0.

The rod 34 has a step portion 344. The step portion 344 is located above the second valve body 38. The step portion 344 functions as a stopper that stops the movement of the second valve body 38 when the second valve body 38 moves upward in a situation where the movement of the rod 34 is stopped.

Immediately after the start of the air heating mode, the position of the rod 34 is set at the air heating position. Thus, as shown in FIG. 5, the second valve body 38 closes the third outlet passage 305. However, the refrigerant pressure in a low-pressure flow passage 106 shown in FIG. 8 decreases immediately after the start of the air heating mode. The refrigerant pressure in a pre-evaporator flow passage 107 shown in FIG. 8 is maintained at a saturation pressure of the refrigerant that corresponds to the ambient temperature where the pre-evaporator flow passage 107 is disposed. However, the refrigerant pressure in the pre-evaporator flow passage 107 is considered to be higher than the saturation pressure corresponding to the ambient temperature, at start of the air-heating when switching from the air cooling mode to the air heating mode.

The low-pressure flow passage 106 is a refrigerant flow passage through which a low-pressure refrigerant decompressed by the air heating expansion valve 15 and having a lower pressure than a high-pressure refrigerant discharged from the compressor 12 flows toward the compressor 12. The low-pressure flow passage 106 is positioned between the refrigerant outlet of the air heating expansion valve 15 and the refrigerant suction port of the compressor 12 in the air heating mode. The pre-evaporator flow passage 107 is a refrigerant flow passage between the second valve body 38 and the refrigerant inlet of the evaporator 22 when the second valve body 38 is in the position shown in FIG. 5 (i.e., the position where the second valve body 38 closes the third outlet passage 305).

Thus, the refrigerant pressure P1 in the second inlet passage 302 becomes lower than the refrigerant pressure P2 in the third outlet passage 305. When the pressure difference between both these pressures becomes larger than the predetermined value, as shown in FIG. 9, the second valve body 38 moves upward due to the pressure difference between both the pressures. The second valve body 38 abuts against the step portion 344.

Thus, the second valve body 38 opens the third outlet passage 305 while keeping the second outlet passage 304 open. That is, the second valve body 38 causes the pre-evaporator flow passage 107 shown in FIG. 10 to communicate with the low-pressure flow passage 106 without the evaporator 22 interposed therebetween.

Figure 10:
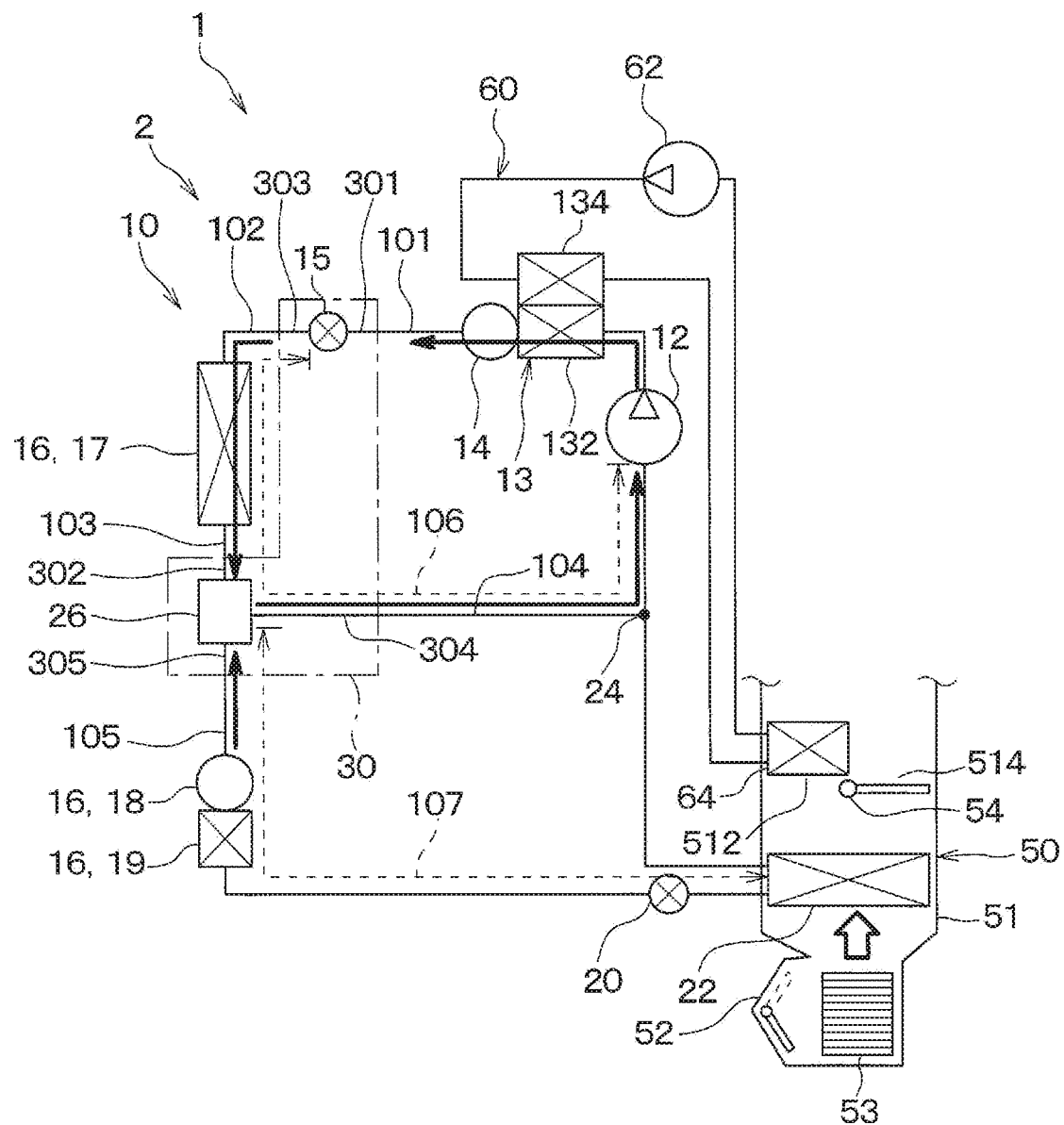
FIG. 10 is a diagram showing the vehicle air conditioner of the first embodiment at the start of the air heating mode.

Consequently, at the start of the air heating mode, as shown in FIG. 9, the liquid refrigerant that remains in the pre-evaporator flow passage 107 flows from the third outlet passage 305 to the second outlet passage 304 in the integrated valve device 30. As shown in FIG. 10, the refrigerant flowing out of the second outlet passage 304 is drawn into the compressor 12 via the air heating flow passage 104.

At this time, the gap between the second valve body 38 and the valve seat 325a of the third valve seat forming portion 325 shown in FIG. 9 becomes a communication portion 310 that causes the pre-evaporator flow passage 107 to communicate with the low-pressure flow passage 106 while bypassing the evaporator 22. In the present embodiment, the flow passage resistance of the communication portion 310 is set smaller than the flow passage resistance of the evaporator 22 such that the refrigerant flows more through the communication portion 310 than the evaporator 22 when the refrigerant present in the pre-evaporator flow passage 107 flows to the low-pressure flow passage 106. The size of the passage cross-sectional area of the communication portion 310 is set so that the flow passage resistance of the communication portion 310 becomes a desired flow passage resistance. That is, the dimension of a gap between the second valve body 38 and the valve seat 325a of the third valve seat forming portion 325 is set.

Thus, at the start of the air heating mode, as indicated by the arrow in FIG. 10, most of the refrigerant that remains in the pre-evaporator flow passage 107 flows into the compressor 12 while bypassing the evaporator 22 and is recovered by the compressor 12. At this time, the refrigerant hardly flows through the evaporator 22. Thus, the amount of the refrigerant flowing through the evaporator 22 can be reduced as compared with the case where the refrigerant remaining in the pre-evaporator flow passage 107 flows into the compressor 12 only through the evaporator 22. Consequently, a decrease in the temperature of the evaporator 22 when recovering the refrigerant can be suppressed. Therefore, the generation of frost and odor due to freezing at the evaporator 22 can be prevented.

With this configuration, the refrigerant that remains in the pre-evaporator flow passage 107 at the second valve body 38 side rather than the air cooling expansion valve 20 can be quickly recovered by the compressor 12, as compared to the case where the remaining refrigerant flows into the compressor 12 via the air cooling expansion valve 20 and the evaporator 22. Therefore, the heat pump circuit 10 can avoid the refrigerant shortage state in the air heating mode.

In the present embodiment, the flow passage resistance of the communication portion 310 is set so that most of the refrigerant in the pre-evaporator flow passage 107 flows to the low-pressure flow passage 106 only through the communication portion 310, selected from the evaporator 22 and the communication portion 310. However, the flow passage resistance of the communication portion 310 may be set so that the refrigerant in the pre-evaporator flow passage 107 flows to the low-pressure flow passage 106 through both the evaporator 22 and the communication portion 310. For example, the flow passage resistance of the communication portion 310 may be set to be the same as the flow passage resistance of the evaporator 22. Even in this case, a decrease in the temperature of the evaporator 22 when recovering the refrigerant can be suppressed, as compared with the case where the refrigerant in the pre-evaporator flow passage 107 flows to the low-pressure flow passage 106 only through the evaporator 22. Therefore, the generation of frost and odor due to freezing at the evaporator 22 can be prevented.

When the refrigerant is recovered by the compressor 12 only through the air cooling expansion valve 20 and the evaporator 22, it takes time to recover the refrigerant depending on the opening degree of the passage in the air cooling expansion valve 20. In this case, the heat pump circuit 10 may be in the refrigerant shortage state at the start of the air heating mode.

In contrast, according to the present embodiment, at least part of the refrigerant that remains in the pre-evaporator flow passage 107 at the second valve body 38 side rather than the air cooling expansion valve 20 can flow into the compressor 12 while bypassing the air cooling expansion valve 20 and the evaporator 22. Thus, the refrigerant can be quickly recovered, as compared with the case where the refrigerant is recovered by the compressor 12 only through the air cooling expansion valve 20 and the evaporator 22. Therefore, the refrigerant shortage in the heat pump circuit 10 can be prevented in the air heating mode.

Thereafter, when the pressure difference between the refrigerant pressure in the low-pressure flow passage 106 and the refrigerant pressure in the pre-evaporator flow passage 107 is smaller than the predetermined value, the second valve body 38 closes the third outlet passage 305. Consequently, as shown in FIG. 8, in the air heating mode, the refrigerant bypasses the evaporator 22 in a state where the pre-evaporator flow passage 107 does not communicate with the low-pressure flow passage 106. That is, the flow passage that causes the pre-evaporator flow passage 107 to communicate with the low-pressure flow passage 106 without passing through the evaporator 22 is blocked.

In this way, when the pressure difference between the refrigerant pressure in the low-pressure flow passage 106 and the refrigerant pressure in the pre-evaporator flow passage 107 is smaller than the predetermined value, the second valve body 38 does not cause the pre-evaporator flow passage 107 to communicate with the low-pressure flow passage 106 while bypassing the evaporator. The situation where the pressure difference is smaller than the predetermined value also includes no pressure difference.

As mentioned above, in the present embodiment, the three-way valve 26 of the integrated valve device 30 has a differential pressure valve function. That is, when the refrigerant pressure in the low-pressure flow passage 106 is lower than the refrigerant pressure in the pre-evaporator flow passage 107, the second valve body 38 of the three-way valve 26 opens the air cooling flow passage 105 by the pressure difference between both the pressures while maintaining the opened state of the air heating flow passage 104 in the air heating mode. Thus, at the start of the air heating mode, the pre-evaporator flow passage 107 communicates with the low-pressure flow passage 106 without the evaporator 22 interposed therebetween.

The following modifications to the heat pump circuit 10 of the present embodiment can be proposed. That is, the three-way valve 26 of the integrated valve device 30 does not have any differential pressure valve function of the present embodiment. The heat pump circuit 10 includes a communication flow passage and a control valve that opens or closes the communication flow passage. The communication flow passage causes the pre-evaporator flow passage 107 to communicate with the low-pressure flow passage 106, without the evaporator 22 interposed therebetween, when the second valve body 38 of the integrated valve device 30 closes the air cooling flow passage 105. When the refrigerant pressure in the low-pressure flow passage 106 is lower than the refrigerant pressure in the pre-evaporator flow passage 107, the controller 100 controls the control valve to open the communication flow passage. This configuration can also achieve the same effects as the present embodiment.

However, in this case, another communication flow passage and another on-off valve, which serve as flow passage switching portions, need to be added to the heat pump circuit 10. In contrast, according to the present embodiment, the refrigerant in the pre-evaporator flow passage 107 can be recovered at the start of the air heating mode without adding any flow passage switching portion for recovering the refrigerant, to the heat pump circuit 10.

The heat pump circuit 10 of the present embodiment uses the integrated valve device 30 that integrates therein the three-way valve with a differential pressure valve function and the air heating expansion valve. The present embodiment can reduce the number of components constituting the heat pump circuit 10 and can also simplify the configuration of the heat pump cycle device 2.

Second Embodiment

Figure 11:
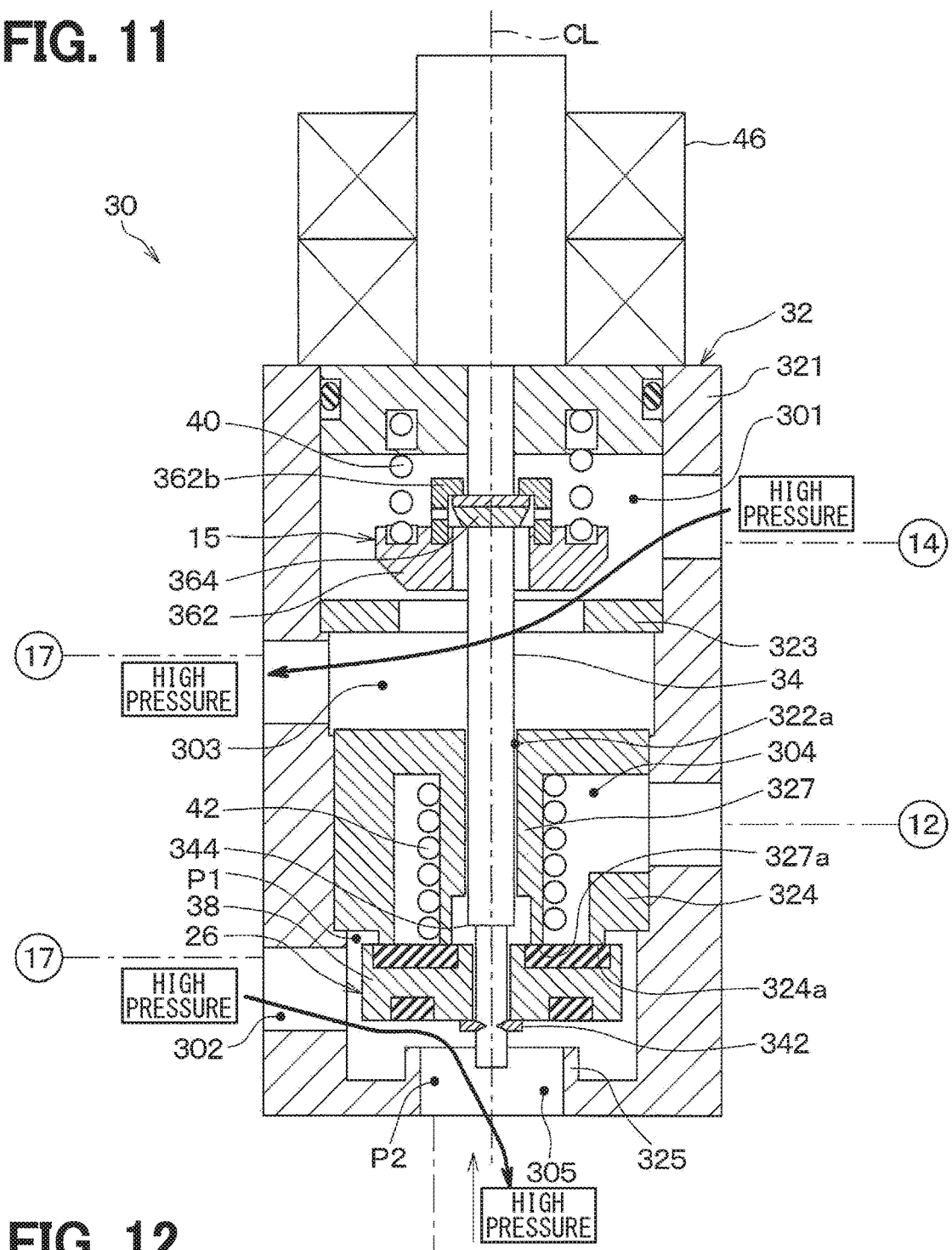
FIG. 11 is a cross-sectional view of an integrated valve device of a second embodiment in the air cooling mode.

As shown in FIG. 11, an integrated valve device 30 of the present embodiment differs from the integrated valve device 30 of the first embodiment in the position of an end 327a of the cylindrical portion 327 on the second valve body 38 side.

Figure 12:
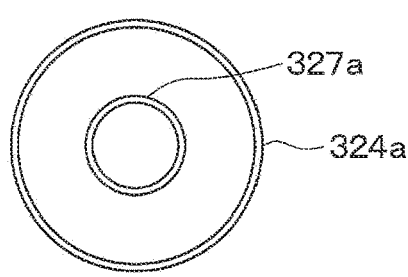
FIG. 12 is a diagram of an end of a cylindrical portion and a valve seat of a second valve seat forming portion as viewed from the arrow XII in FIG. 11.

In the present embodiment, when the second valve body 38 abuts against the second valve seat 324a to close the second outlet passage 304, the end 327a of the cylindrical portion 327 is positioned to abut against the second valve body 38. As shown in FIG. 12, the end 327a of the cylindrical portion 327 has an annular shape and located at the inner circumferential side of the second valve seat 324a. Thus, the end 327a of the cylindrical portion 327 and the second valve seat 324a form a double annular valve seat that abuts the second valve body 38.

With this configuration, in the air cooling mode, that is, when the second valve body 38 is in the second communication state to close the second outlet passage 304, the high-pressure refrigerant flowing through the first outlet passage 303 can be prevented from flowing into the second outlet passage 304 from the gap between the inner wall surface of the insertion hole 322a and the rod 34.

Figure 13:
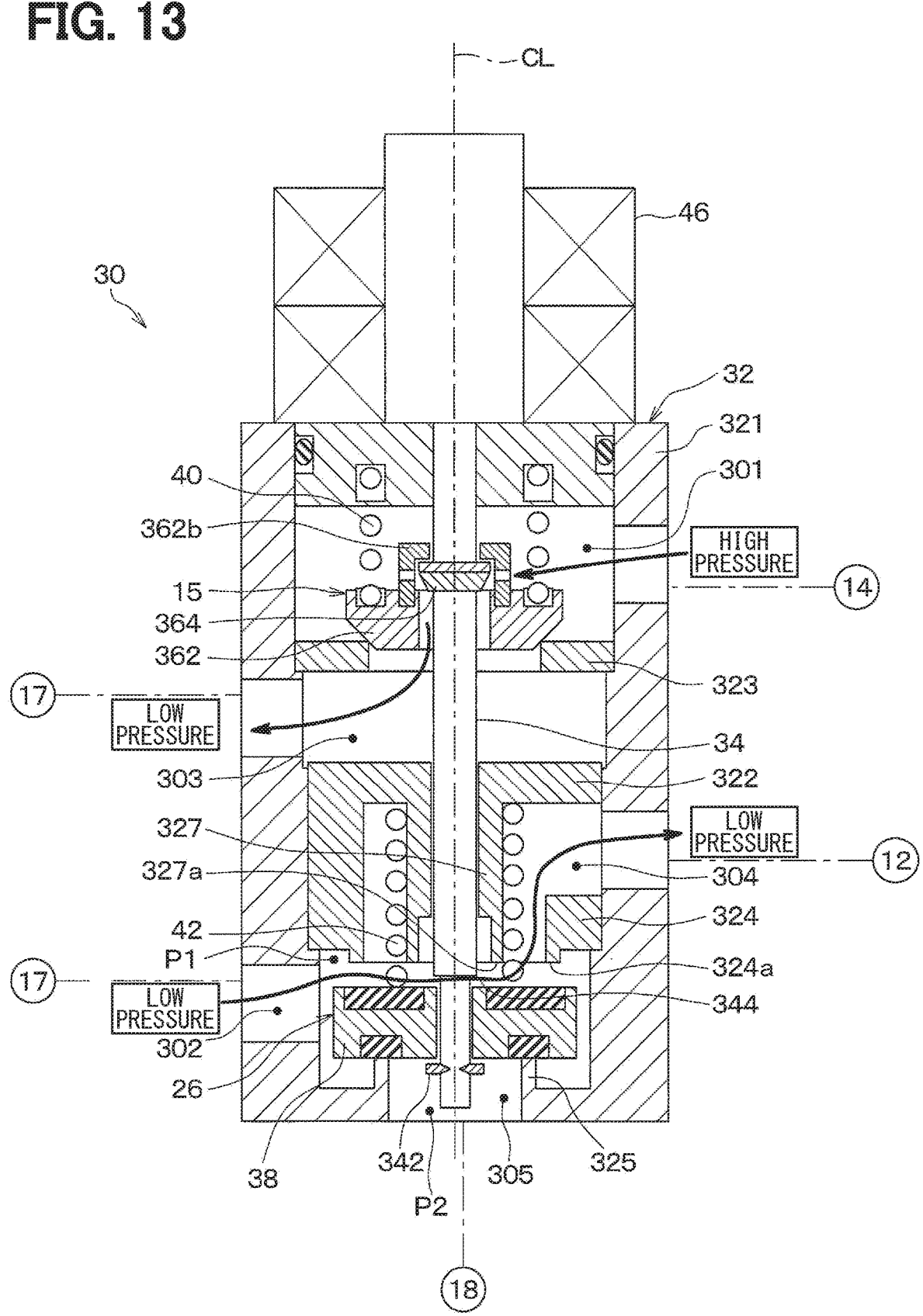
FIG. 13 is a cross-sectional view of the integrated valve device of the second embodiment in the air heating mode.

As shown in FIG. 13, in the air heating mode, the second valve body 38 is separated from both the second valve seat 324a and the end 327a of the cylindrical portion 327. Consequently, the second valve body 38 is in the first communication state.

Figure 14:
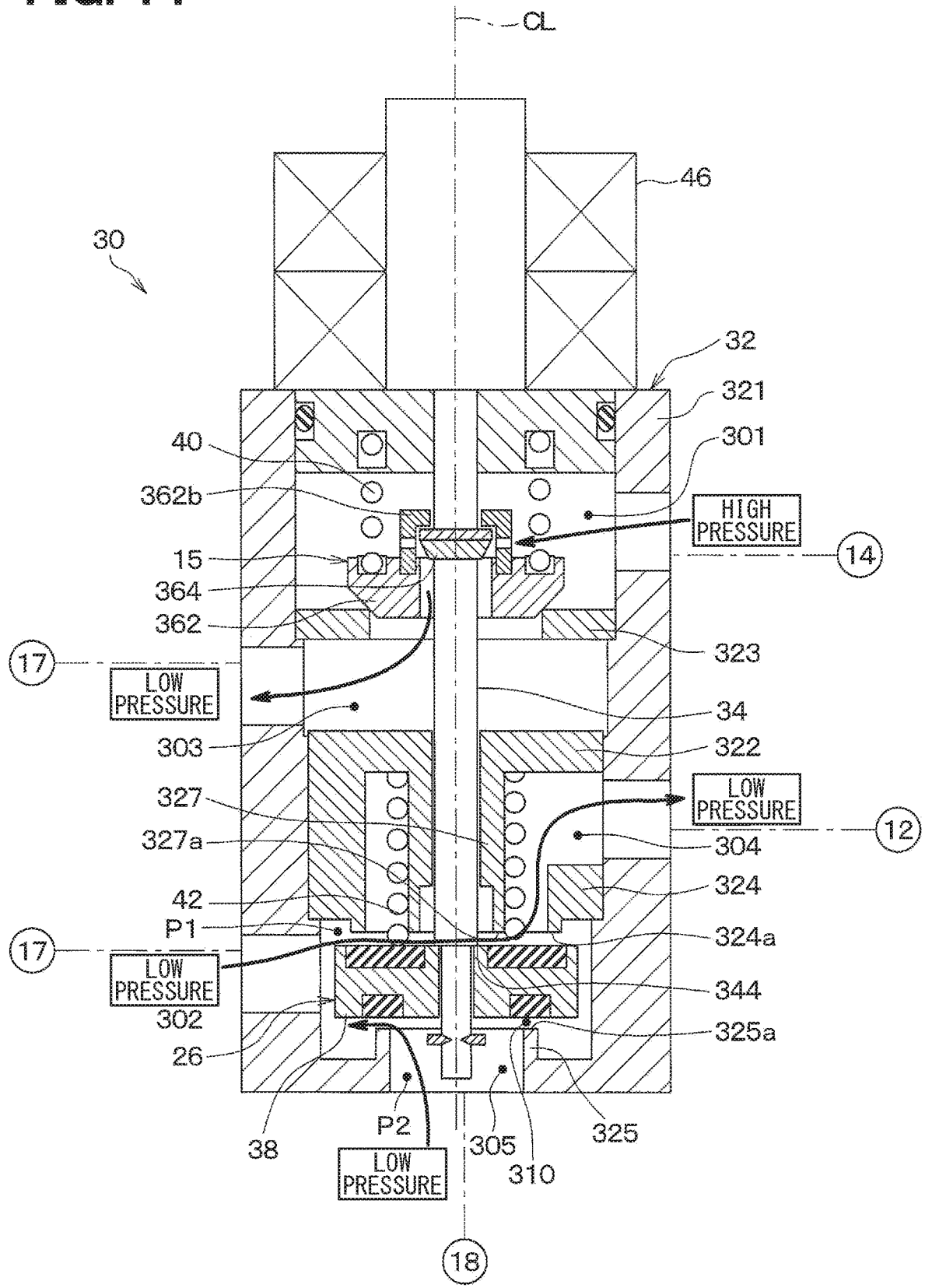
FIG. 14 is a cross-sectional view of the integrated valve device of the second embodiment at the start of the air heating mode.

As shown in FIG. 14, at the start of the air heating mode, the second valve body 38 opens the third outlet passage 305 with the second outlet passage 304 opened, similarly to the first embodiment. Thus, the present embodiment can also obtain the same effects as those in the first embodiment.

Third Embodiment

Figure 15:
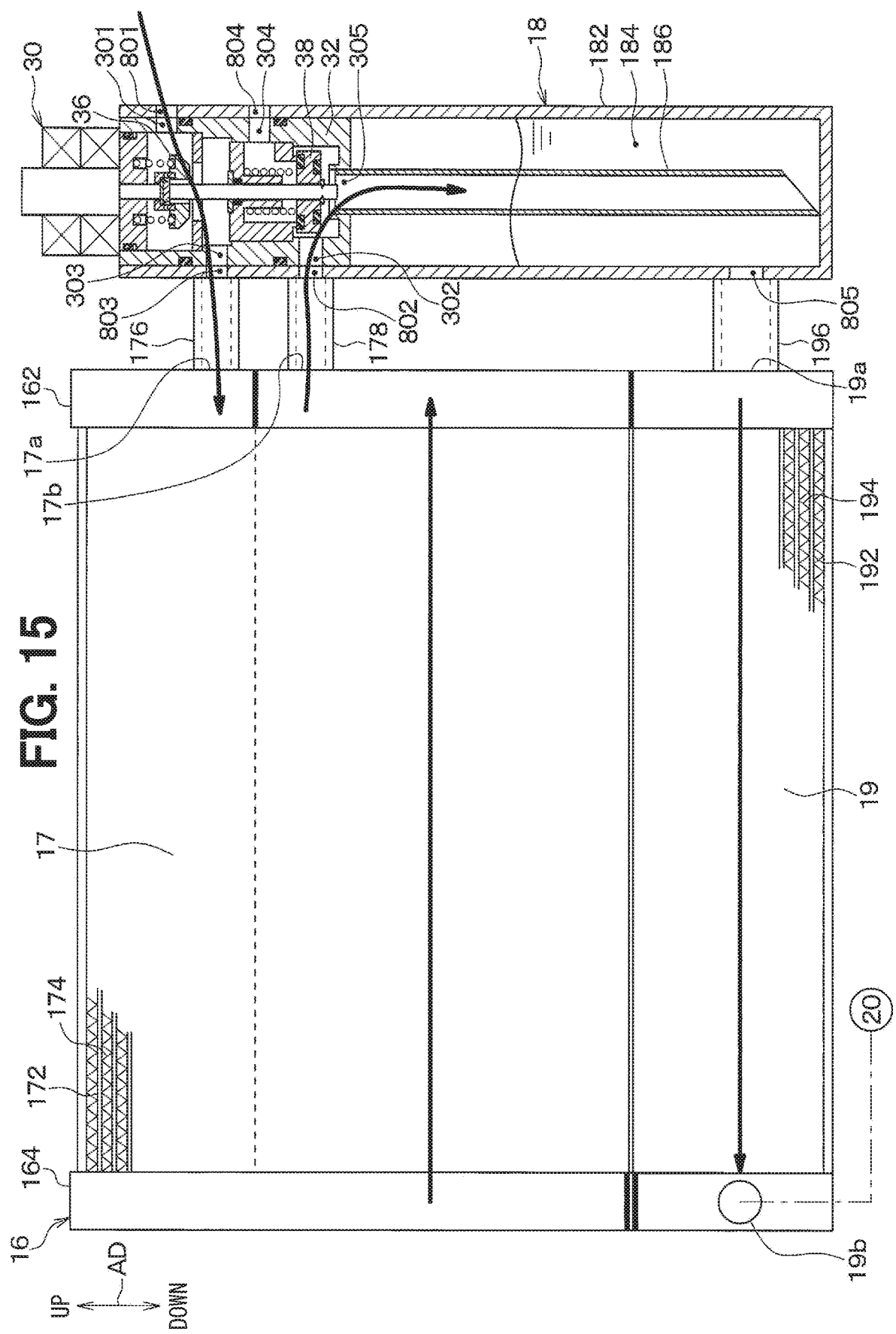
FIG. 15 is a diagram showing an exterior heat exchanger and an integrated valve device of a third embodiment in the air cooling mode.

As shown in FIG. 15, in the present embodiment, the exterior heat exchanger 16 is configured as a module that integrates therein the core portion 17, the liquid receiver 18, and the subcooling portion 19. The body portion 32 of the integrated valve device 30 is accommodated inside the liquid receiver 18. Other components of the heat pump circuit 10 are the same as those in the first embodiment.

Specifically, the exterior heat exchanger 16 includes the core portion 17, the subcooling portion 19, a pair of header tanks 162 and 164, and the liquid receiver 18.

The core portion 17 and the subcooling portion 19 are stacked in the vertical direction. In the present embodiment, the core portion 17 is disposed above the subcooling portion 19. The pair of header tanks 162 and 164 is disposed on both sides of the core portion 17 and the subcooling portion 19 in a direction that intersects the stacking direction of the core portion 17 and the subcooling portion 19.

The core portion 17 has a plurality of tubes 172 through which the refrigerant passes, and a plurality of fins 174 that promote heat exchange between the refrigerant and the outside air. The respective plurality of tubes 172 are stacked in the vertical direction with a space between adjacent tubes. Each of the plurality of fins 174 is disposed between adjacent ones of the plurality of tubes 172. Both sides of each of the plurality of tubes 172 are connected to the respective pair of header tanks 162 and 164.

Like the core portion 17, the subcooling portion 19 has a plurality of tubes 192 and a plurality of fins 194. Both ends of each of the plurality of tubes 192 are connected to the respective pair of header tanks 162 and 164.

The pair of header tanks 162 and 164 extends in the vertical direction. Portions of the pair of header tanks 162 and 164 that are connected to the plurality of tubes 172 in the core portions 17 distribute and collect the refrigerants flowing through the plurality of tubes 172 in the core portion 17. Portions of the pair of header tanks 162 and 164 that are connected to the plurality of tubes 192 in the subcooling portion 19 distribute and collect the refrigerants flowing through the plurality of tubes 192 in the subcooling portion 19.

The liquid receiver 18 is disposed adjacent to one of the pair of header tanks 162 and 164. The liquid receiver 18 includes a housing 182 that forms the outer appearance of the liquid receiver. The housing 182 extends in the extending direction of the pair of header tanks 162 and 164, that is, in the vertical direction. The housing 182 has a cylindrical shape. A liquid reservoir 184 is formed inside the housing 182. The liquid reservoir 184 temporarily stores the liquid refrigerant. The liquid reservoir 184 is a space inside the housing 182, below the body portion 32 of the integrated valve device.

The integrated valve device 30 of the present embodiment has the same structure as the integrated valve device 30 of the first embodiment. The body portion 32 of the integrated valve device 30 is disposed above the liquid reservoir 184 inside the housing 182. A pipe 186 is connected to the third outlet passage 305 of the body portion 32 so as to draw up the refrigerant present in the liquid reservoir 184 and guide the refrigerant to the compressor 12 in the air heating mode. The pipe 186 extends downward from the body portion 32. That is, the pipe 186 extends from the body portion 32 toward the lower end of the liquid reservoir 184.

A first opening 801, a second opening 802, a third opening 803, and a fourth opening 804 are formed in portions of the housing 182 in which the body portion 32 is accommodated. The first opening 801 communicates with the first inlet passage 301 of the body portion 32. The second opening 802 communicates with the second inlet passage 302 of the body portion 32. The third opening 803 communicates with the first outlet passage 303 of the body portion 32. The fourth opening 804 communicates with the second outlet passage 304 of the body portion 32.

A refrigerant inlet 17a of the core portion 17 provided in one header tank 162 is connected to the third opening 803 of the housing 182 via a connection pipe 176. A refrigerant outlet 17b of the core portion 17 provided in the one header tank 162 is connected to the second opening 802 of the housing 182 via a connection pipe 178.

A fifth opening 805 is formed in a portion of the housing 182 where the liquid reservoir 184 is formed. The fifth opening 805 is an opening for causing the liquid reservoir 184 and the subcooling portion 19 to communicate with each other. A refrigerant inlet 19a of the subcooling portion 19 provided in the one header tank 162 is connected to the fifth opening 805 via a connection pipe 196. A refrigerant outlet 19b provided in the one header tank 162 is connected to the refrigerant inlet of the air cooling expansion valve 20.

As mentioned above, in the present embodiment, the exterior heat exchanger 16 and the integrated valve device 30 are both integrated together to configure a module. Thus, the number of components constituting the heat pump circuit 10 can be reduced. Consequently, the configuration of the heat pump circuit 10 can be simplified.

As shown in FIG. 15, in the air cooling mode, the high-pressure refrigerant flowing into the first inlet passage 301 of the integrated valve device 30 flows from the first outlet passage 303 into the refrigerant inlet 17a of the core portion 17 via the connection pipe 176. The high-pressure refrigerant flowing out of the refrigerant outlet 19b of the core portion 17 flows into the liquid receiver 18 via the second inlet passage 302 and the pipe 186 connected to the third outlet passage 305 in the integrated valve device 30.

The high-pressure refrigerant flowing into the liquid receiver 18 is separated into a gas-phase refrigerant and a liquid-phase refrigerant. The liquid refrigerant stored in the liquid reservoir 184 flows into the refrigerant inlet 19a of the subcooling portion 19 via the connection pipe 196. The high-pressure refrigerant flowing into the subcooling portion 19 dissipates heat into the outside air and then flows into the air cooling expansion valve 20. In this way, the liquid receiver 18 is connected between the second valve body 38 and the air cooling expansion valve 20. Thereafter, the flow of the refrigerant is the same as that in the first embodiment.

Figure 16:
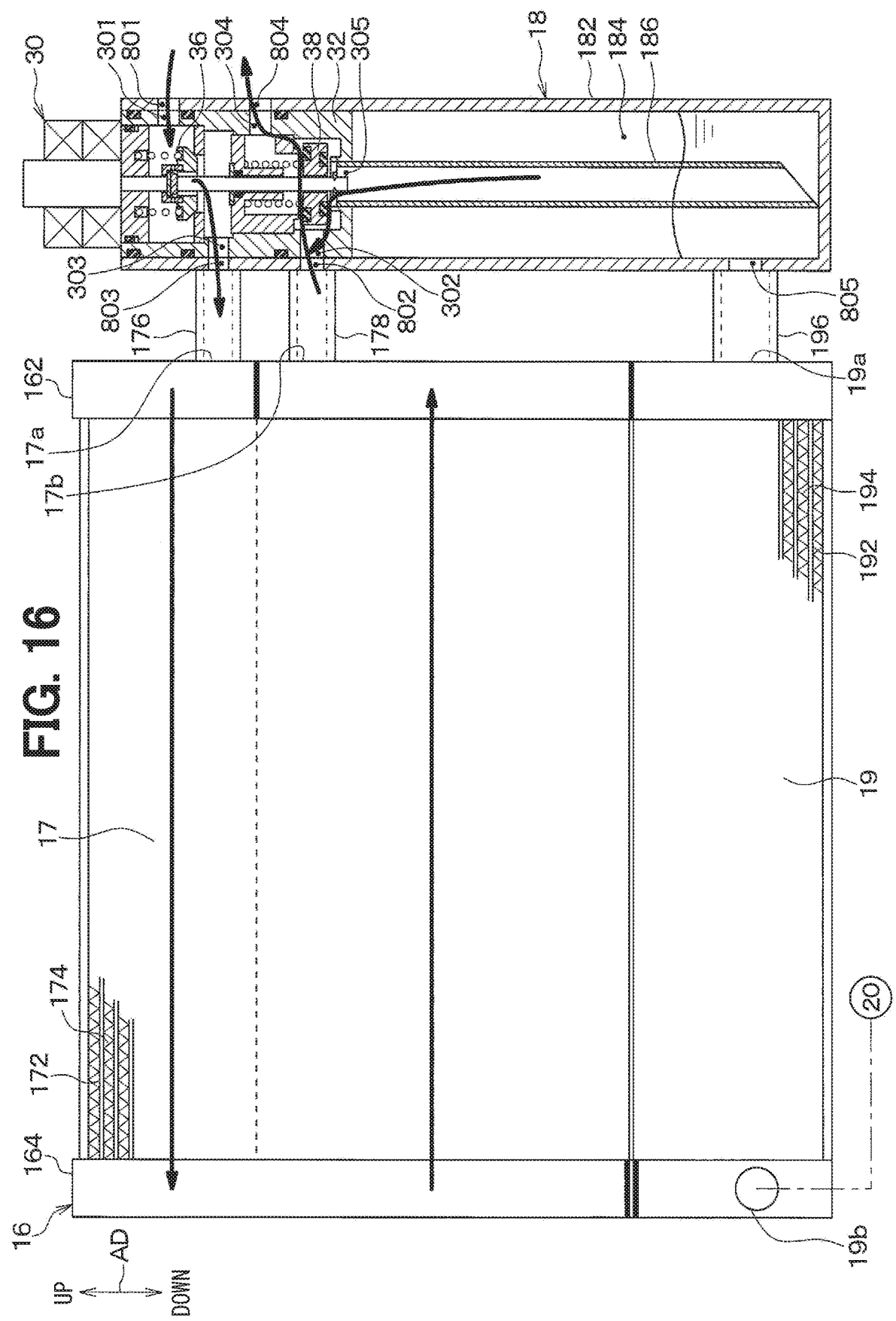
FIG. 16 is a diagram showing the exterior heat exchanger and the integrated valve device of the third embodiment at the start of the air heating mode.

As shown in FIG. 16, at the start of the air heating mode, the second valve body 38 opens the third outlet passage 305 with the second outlet passage 304 opened, similarly to the first embodiment. Thus, the liquid refrigerant in the liquid reservoir 184 flows into the third outlet passage 305 via the pipe 186 and then flows out of the second outlet passage 304. According to the present embodiment, the liquid refrigerant remaining in the pre-evaporator flow passage 107, especially, the liquid reservoir 184 of the liquid receiver 18, can be recovered at the start of the air heating mode. Thus, the present embodiment can also obtain the same effects as those in the first embodiment.

The results of the evaluation on the recovery of liquid refrigerant, conducted by the inventors, will now be described. In this evaluation, the air heating mode is started in a state where the liquid refrigerant is stored in the liquid reservoir 184 of the liquid receiver 18 in each of the heat pump circuit 10 of the present embodiment and a heat pump circuit of Comparative Example 1. At this time, the time taken until the liquid refrigerant stored in the liquid reservoir 184 is recovered is measured. Specifically, the recovery time is measured visually by using the visualized housing 182. In addition, the surface temperature of the evaporator 22 at this time is also measured.

The heat pump circuit in Comparative Example 1 differs from the heat pump circuit 10 in the present embodiment in that the third outlet passage 305 is not opened at the start of the air heating mode. Other components of the heat pump circuit in Comparative Example 1 are the same as those of the heat pump circuit 10 in the present embodiment. In the heat pump circuit of Comparative Example 1, at the start of the air heating mode, the liquid refrigerant present in the liquid receiver 18 flows into the compressor 12 via the subcooling portion 19, the air cooling expansion valve 20, and the evaporator 22.

Thus, in the heat pump circuit of Comparative Example 1, five minutes is required to recover the liquid refrigerant. On the other hand, in the heat pump circuit of the present embodiment, the recovery of the liquid refrigerant is completed within 1 minute.

Figure 17:
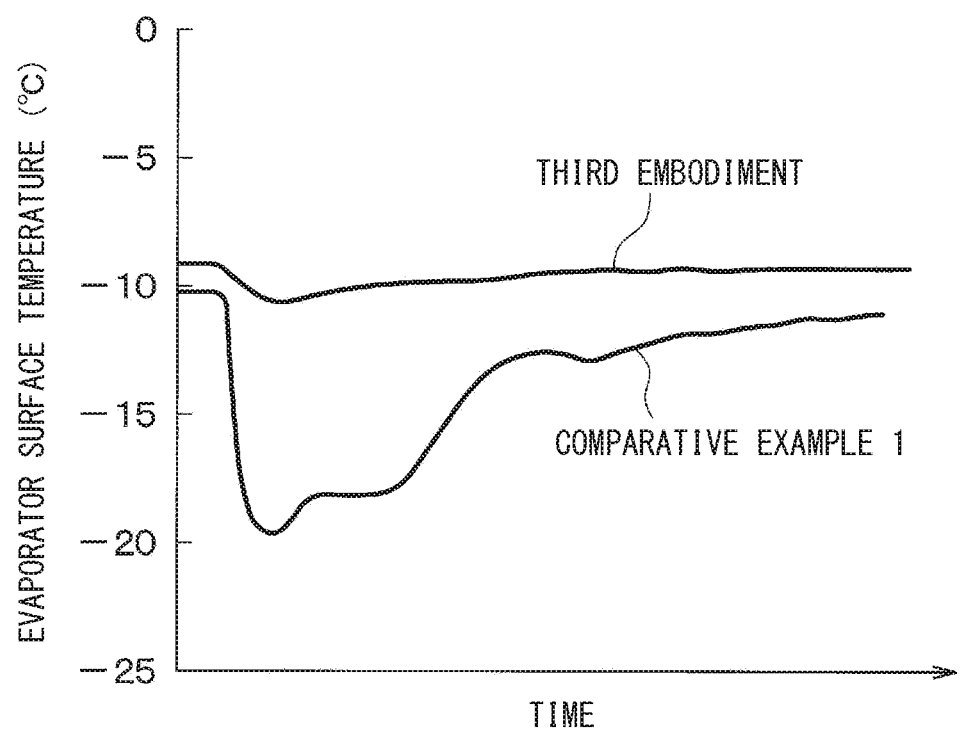
FIG. 17 is a diagram showing the relationship between the fin temperature of the evaporator and the elapsed time at the start of the air heating mode in each of the third embodiment and Comparative Example 1.

As shown in FIG. 17, in the heat pump circuit of Comparative Example 1, the surface temperature of the evaporator 22 significantly decreases. Thus, in the heat pump circuit of Comparative Example 1, frost or odor due to freezing might be generated at the start of the air heating mode. In contrast, in the heat pump circuit 10 of the present embodiment, the surface temperature of the evaporator 22 hardly decreases.

In this way, according to the present embodiment, the liquid refrigerant present in the liquid receiver 18 can be quickly recovered at the start of the air heating mode. Thus, the refrigerant shortage in the heat pump circuit 10 can be prevented in the air heating mode. The decrease in the temperature of the evaporator 22 can be suppressed at the start of the air heating mode. Therefore, the generation of frost or odor due to freezing at the evaporator 22 can be avoided.

Fourth Embodiment

Figure 18:
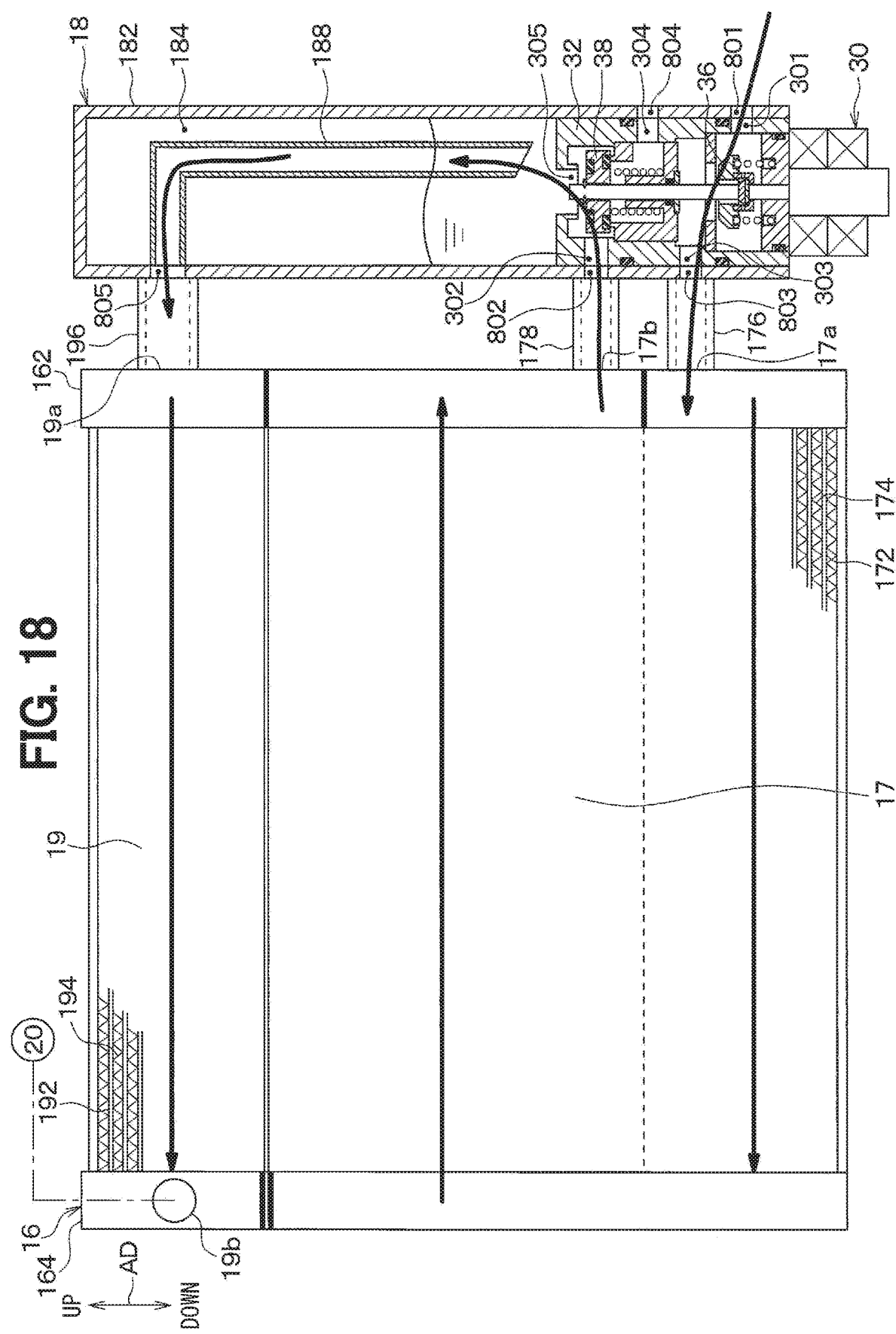
FIG. 18 is a diagram showing an exterior heat exchanger and an integrated valve device of a fourth embodiment in the air cooling mode.

As shown in FIG. 18, in the present embodiment, unlike the third embodiment, the core portion 17 of the exterior heat exchanger 16 is disposed below the subcooling portion 19. The body portion 32 of the integrated valve device 30 is disposed below the liquid reservoir 184, inside the housing 182. That is, the liquid reservoir 184 is formed above the integrated valve device 30, inside the housing 182.

In the present embodiment, a pipe 188 is provided inside the housing 182 so as to draw up the liquid refrigerant stored in the liquid reservoir 184 and then guide the drawn refrigerant to the subcooling portion 19 in the air cooling mode. The upper end of the pipe 188 is connected to the fifth opening 805 of the housing 182. The lower end of the pipe 188 is not connected to the third outlet passage 305 of the integrated valve device 30. The lower end of the pipe 188 is located near the integrated valve device 30.

As shown in FIG. 18, in the air cooling mode, the high-pressure refrigerant flowing into the first inlet passage 301 of the integrated valve device 30 flows from the first outlet passage 303 into the refrigerant inlet 17a of the core portion 17 via the connection pipe 176. The high-pressure refrigerant flowing out of the refrigerant outlet 17b of the core portion 17 flows into the liquid reservoir 184 of the liquid receiver 18 via the second inlet passage 302 and the third outlet passage 305 in the integrated valve device 30.

The high-pressure refrigerant flowing into the liquid reservoir 184 is separated into a gas-phase refrigerant and a liquid-phase refrigerant. The liquid refrigerant stored in the liquid reservoir 184 is drawn up by the pipe 188 and flows into the refrigerant inlet 19a of the subcooling portion 19. The high-pressure refrigerant flowing into the subcooling portion 19 dissipates heat into the outside air, and then flows into the air cooling expansion valve 20. Thereafter, the flow of the refrigerant is the same as that in the first embodiment.

Figure 19:
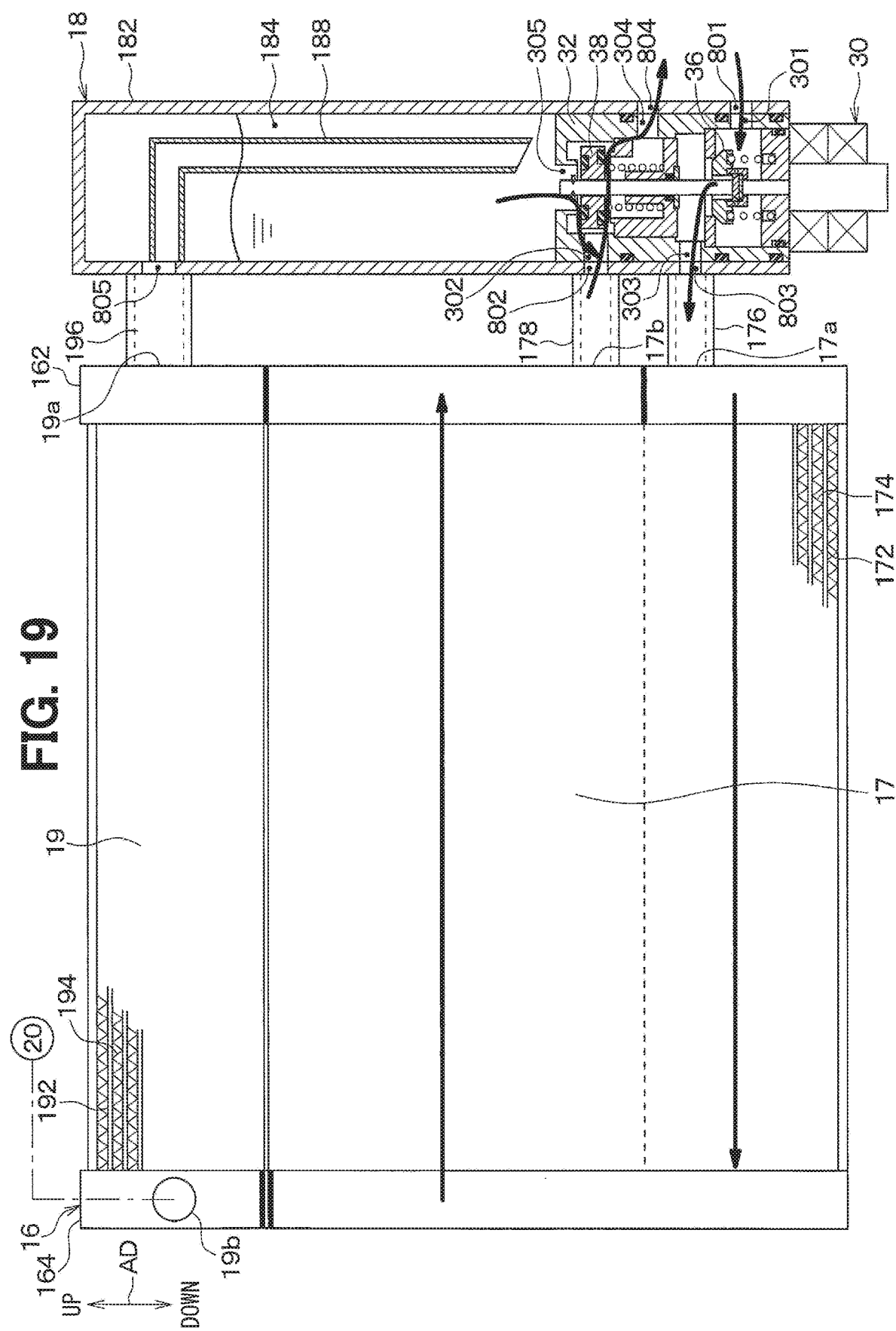
FIG. 19 is a diagram showing the exterior heat exchanger and the integrated valve device of the fourth embodiment at the start of the air heating mode.

As shown in FIG. 19, at the start of the air heating mode, the second valve body 38 opens the third outlet passage 305 in a state where the second outlet passage 304 is opened, similarly to the first embodiment. Thus, the liquid refrigerant in the liquid reservoir 184 directly flows into the third outlet passage 305 without the pipe 188 interposed therebetween and flows out of the second outlet passage 304. Therefore, according to the present embodiment, the liquid refrigerant remaining in the liquid reservoir 184 of the liquid receiver 18 can be recovered at the start of the air heating mode. Thus, the present embodiment can also obtain the same effects as those in the first embodiment.

Figure 20:
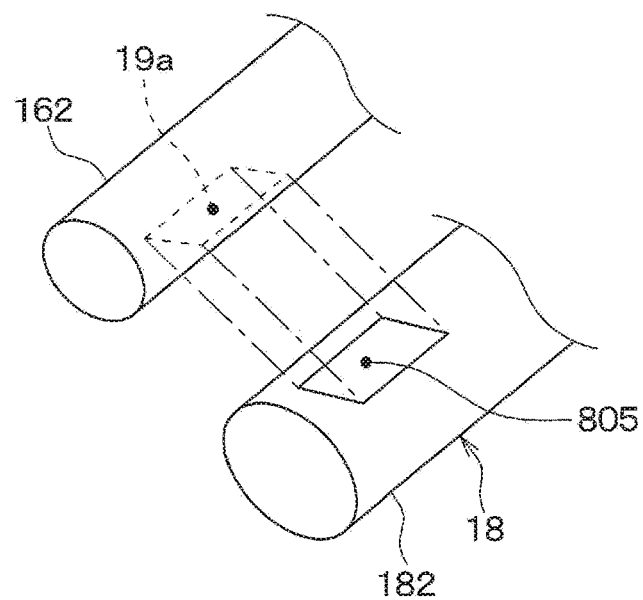
FIG. 20 is a perspective view showing an example of a header tank and a liquid receiver directly connected together without a connection pipe interposed therebetween.

In the third embodiment and the fourth embodiment, the one header tank 162 and the housing 182 are connected together via the connection pipes 176, 178, and 196. However, as shown in FIG. 20, the fifth opening 805 of the housing 182 may be directly connected to the refrigerant inlet 19a of the subcooling portion 19 of the one header tank 162. In this way, the one header tank 162 and the housing 182 may be connected together without the connection pipes 176, 178, and 196.

In the third embodiment and the fourth embodiment, the liquid receiver 18 is connected between the third outlet passage 305 of the integrated valve device 30 and the air cooling expansion valve 20, more precisely, between the third outlet passage 305 and the subcooling portion 19. However, the liquid receiver 18 may be connected between the core portion 17 and the second inlet passage 302 of the integrated valve device 30. Also in this case, the body portion 32 of the integrated valve device 30 may be accommodated inside the liquid receiver 18.

Fifth Embodiment

Figure 21:
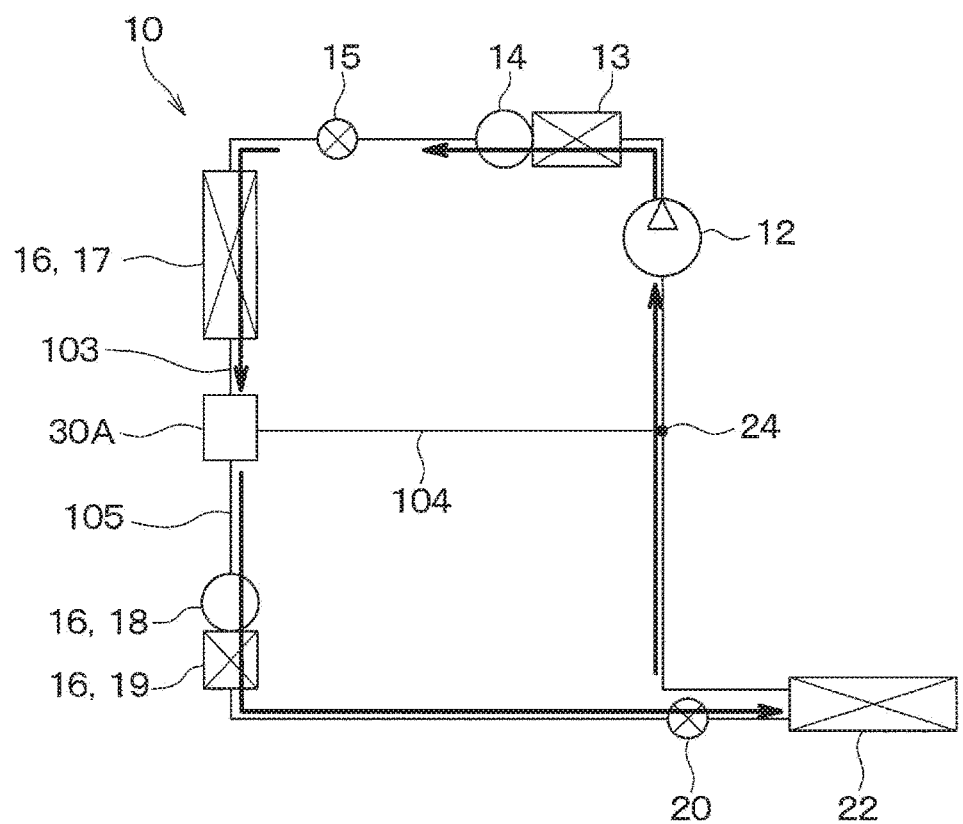
FIG. 21 is a diagram showing a heat pump circuit of a fifth embodiment in the air cooling mode.

As shown in FIG. 21, the heat pump circuit 10 of the present embodiment employs the air heating expansion valve 15 and a valve device 30A which are configured separately from each other in place of the integrated valve device 30 of the first embodiment.

The air heating expansion valve 15 switches between an opened state and a variable throttle state. The valve device 30A has the same function as the three-way valve 26 of the integrated valve device 30 in the first embodiment. The valve device 30A has the same structure as that of the three-way valve 26 in the integrated valve device 30 of the first embodiment. The valve device 30A is a three-way valve that has the differential pressure valve function.

Figure 22:
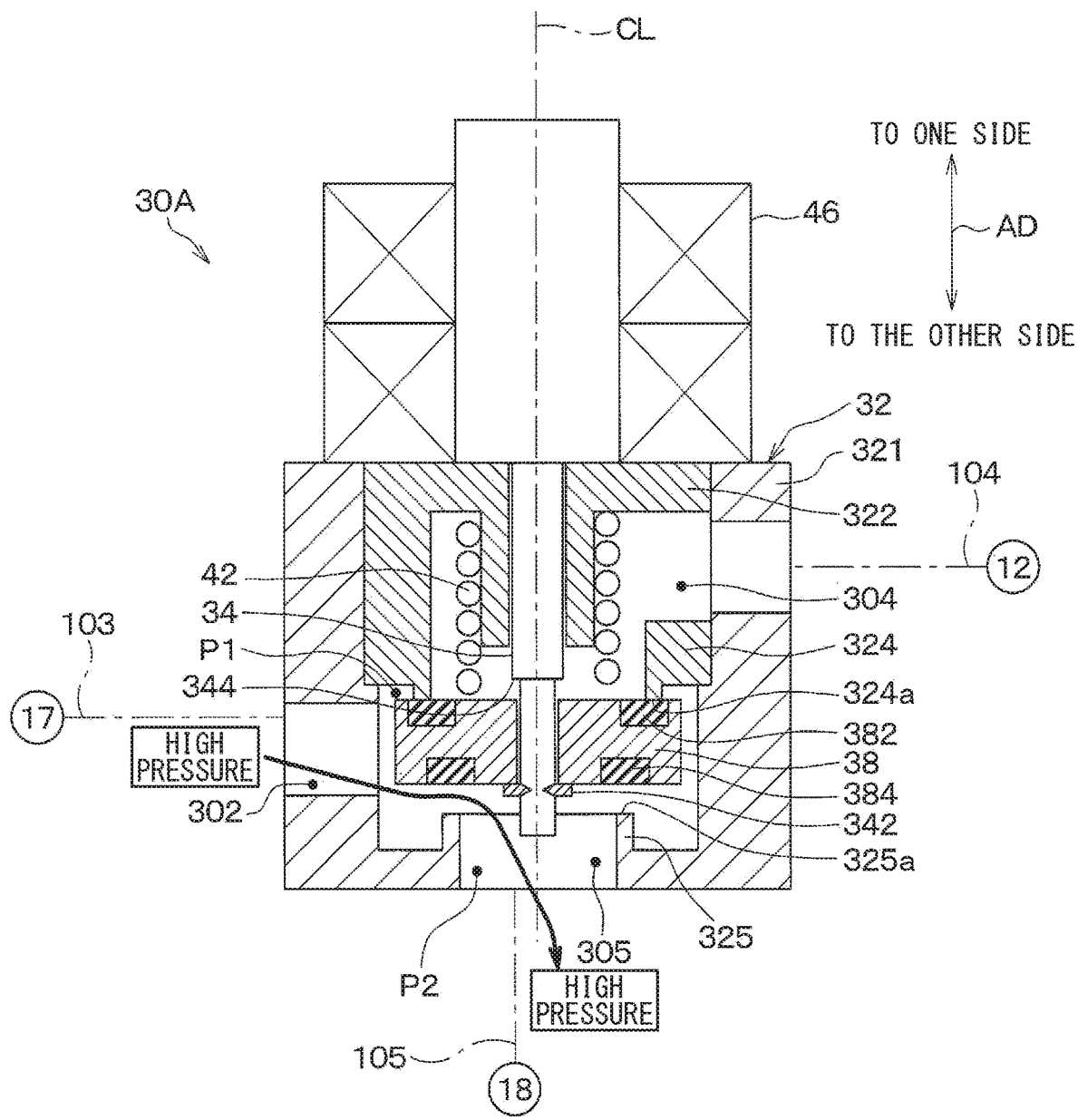
FIG. 22 is a cross-sectional view of a valve device of the fifth embodiment in the air cooling mode.

As shown in FIG. 22, the valve device 30A includes the body portion 32, the valve body 38, the rod 34, the urging spring 42, and the actuator 46. The valve body 38 and the urging spring 42 correspond to the second valve body 38 and the second urging spring 42 in the integrated valve device 30 of the first embodiment, respectively.

An inlet passage 302, a heating side outlet passage 304, and a cooling side outlet passage 305 are formed in the body portion 32.

The body portion 32 has the cylindrical portion 321, the partition 322, a heating side valve seat forming portion 324, and a cooling side valve seat forming portion 325. The heating side valve seat forming portion 324 and the cooling side valve seat forming portion 325 correspond to the second valve seat forming portion 324 and the third valve seat forming portion 325 in the integrated valve device 30 of the first embodiment, respectively.

The partition 322 forms an internal space of the body portion 32 together with the cylindrical portion 321. The heating side outlet passage 304 is formed in the internal space above the heating side valve seat forming portion 324. The inlet passage 302 is formed between the heating side valve seat forming portion 324 and the cooling side valve seat forming portion 325. A passage communication hole communicating with the inlet passage 302 is formed in the cooling side valve seat forming portion 325. The passage communication hole constitutes the cooling side outlet passage 305.

As shown in FIG. 22, in the air cooling mode, the rod 34 moves upward, so that the rod 34 is located at the air cooling position. At this time, similarly to the first embodiment, the rod 34 urges the valve body 38 upward against the urging force of the urging spring 42. Thus, the valve body 38 is separated from the valve seat 325a of the cooling side valve seat forming portion 325, and the valve body 38 abuts against the valve seat 324a of the heating side valve seat forming portion 324. Consequently, the integrated valve device 30 is in the second communication state where the inlet passage 302 communicates with the cooling side outlet passage 305 while closing the heating side outlet passage 304.

Thus, the high-pressure refrigerant flowing out of the core portion 17 flows into the inlet passage 302 of the valve device 30A and then flows out of the cooling side outlet passage 305. As shown in FIG. 21, the high-pressure refrigerant flowing out of the valve device 30A flows through the air cooling flow passage 105.

Figure 23:
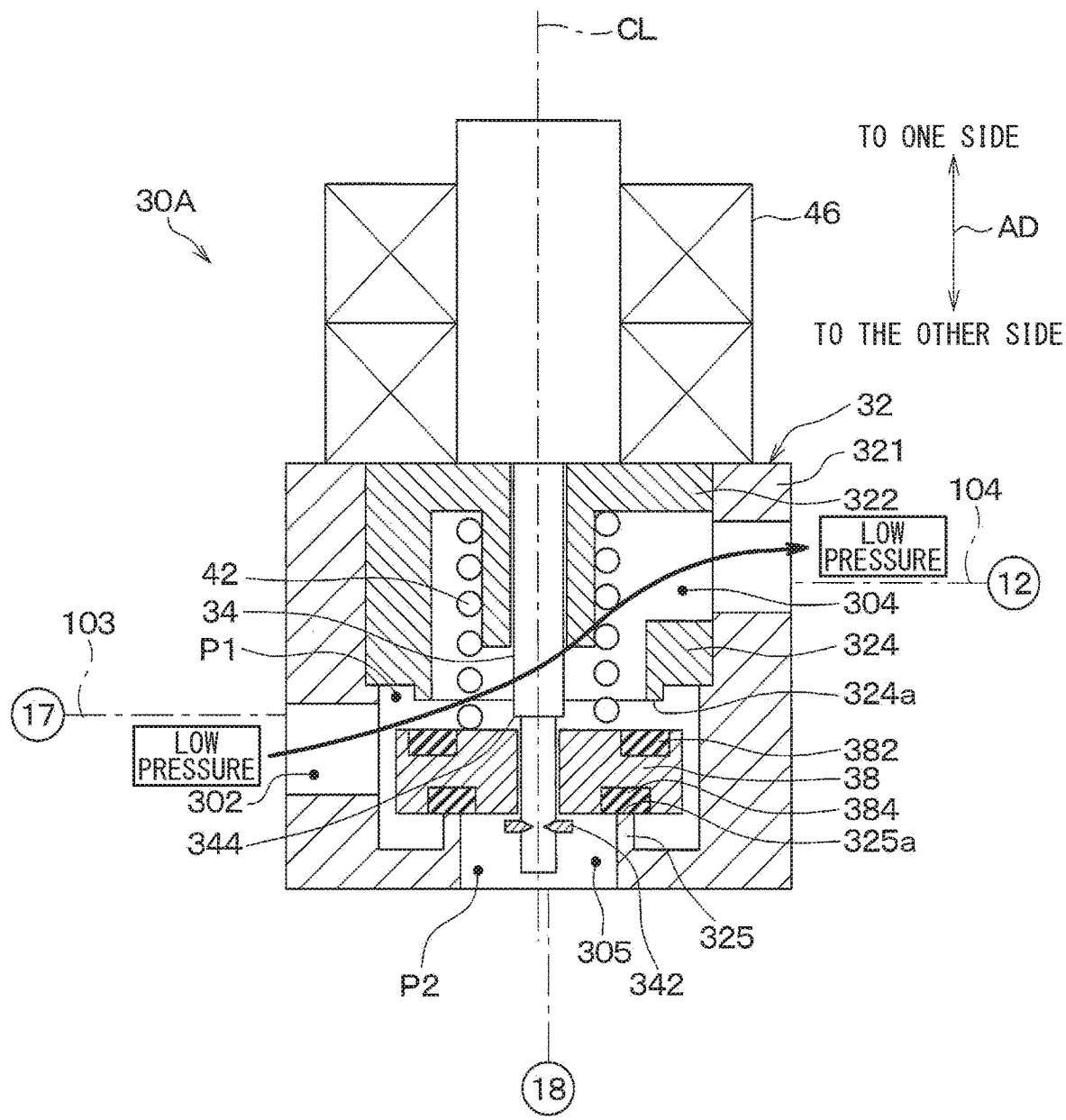
FIG. 23 is a cross-sectional view of the valve device of the fifth embodiment in the air heating mode.

As shown in FIG. 23, in the air heating mode, the rod 34 moves downward from the air cooling position, so that the rod 34 is located at the air heating position. At this time, similarly to the first embodiment, the urging spring 42 urges the valve body 38, and the rod 34 does not urge the second valve body 38. Thus, the valve body 38 is separated from the valve seat 324a of the heating side valve seat forming portion 324, causing the valve body 38 to abut against the valve seat 325a of the cooling side valve seat forming portion 325. Consequently, the integrated valve device 30 is in the first communication state where the inlet passage 302 communicates with the heating side outlet passage 304 while closing the cooling side outlet passage 305.

Figure 24:
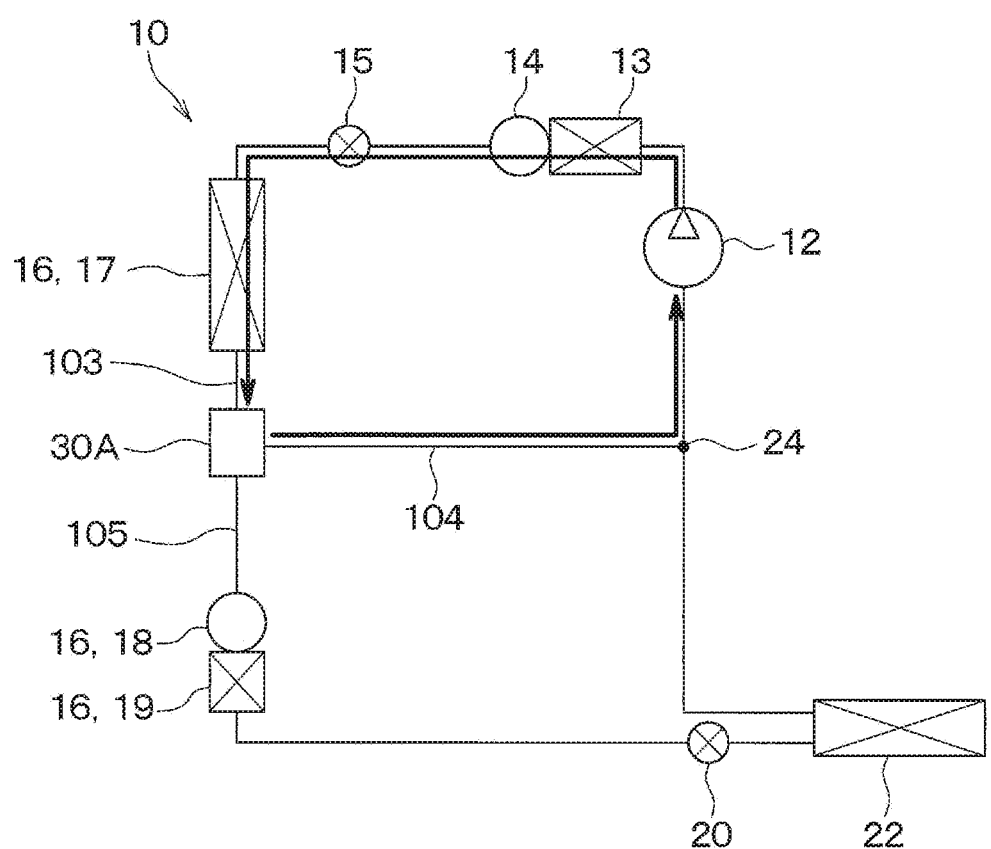
FIG. 24 is a diagram showing a heat pump circuit of the fifth embodiment in the air heating mode.

Thus, the low-pressure refrigerant flowing out of the core portion 17 flows into the inlet passage 302 of the valve device 30A and then flows out of the heating side outlet passage 304. As shown in FIG. 24, the low-pressure refrigerant flowing out of the valve device 30A flows through the air heating flow passage 104.

Figure 25:
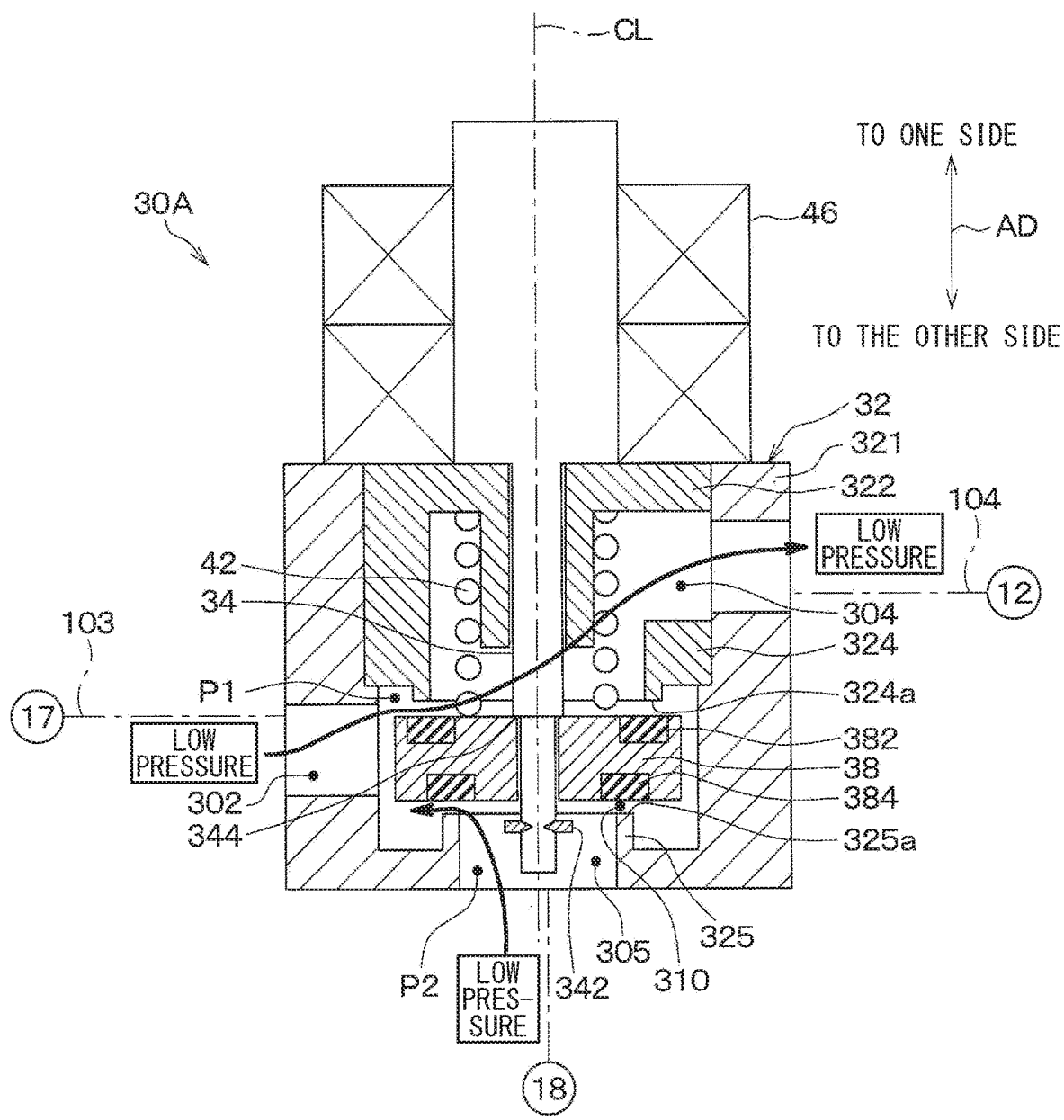
FIG. 25 is a cross-sectional view of the valve device of the fifth embodiment at the start of the air heating mode.

As shown in FIG. 25, at the start of the air heating mode, when the refrigerant pressure P1 of the inlet passage 302 is lower than the refrigerant pressure P2 of the cooling side outlet passage 305 in the valve device 30A, the valve body 38 opens the cooling side outlet passage 305 by the pressure difference between these pressures, similarly to the first embodiment. At this time, the valve body 38 opens the heating side outlet passage 304. Thus, the valve body 38 causes the pre-evaporator flow passage 107 shown in FIG. 26 to communicate with the low-pressure flow passage 106, without the evaporator 22 interposed therebetween.

Figure 26:
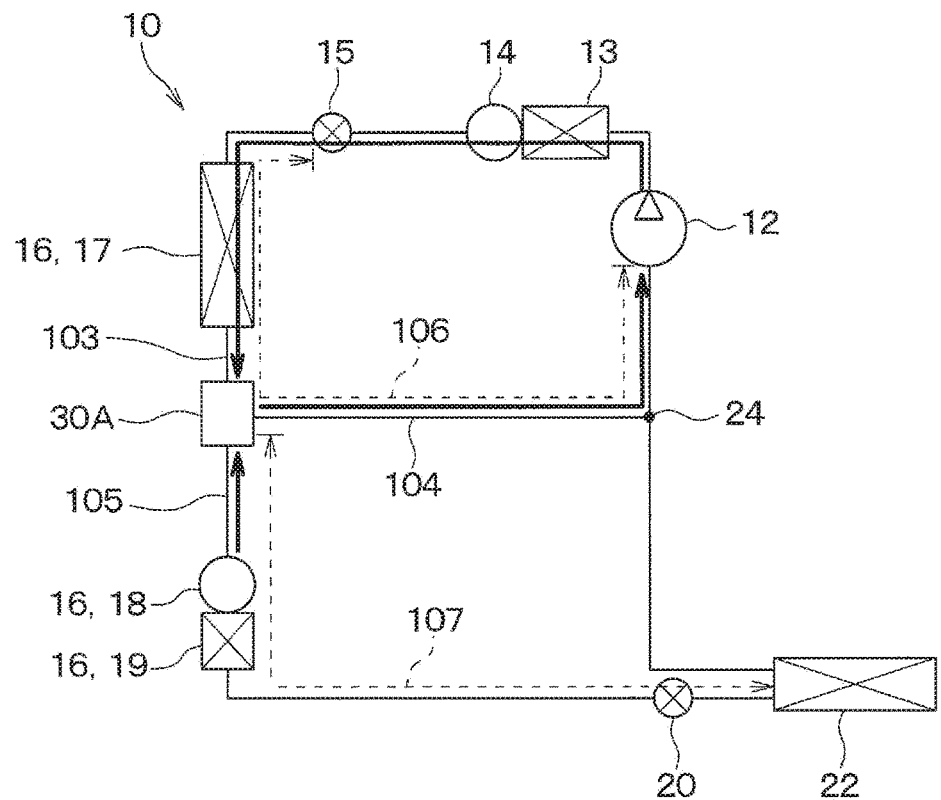
FIG. 26 is a diagram showing the heat pump circuit of the fifth embodiment at the start of the air heating mode.

Thus, at the start of the air heating mode, as shown in FIG. 25, the liquid refrigerant that remains in the pre-evaporator flow passage 107 flows from the cooling side outlet passage 305 to the heating side outlet passage 304 via the communication portion 310 in the integrated valve device 30A and flows out of the valve device 30A. As shown in FIG. 26, the refrigerant flowing out of the valve device 30A is drawn into the compressor 12 via the air heating flow passage 104. Thus, the present embodiment can also obtain the same effects as those in the first embodiment.

The heat pump circuit 10 of the present embodiment uses the valve device 30A, which is a three-way valve that has the differential pressure valve function. Thus, the present embodiment can reduce the number of components constituting the heat pump circuit 10 and can also simplify the configuration of the heat pump cycle device 2.

Sixth Embodiment

Figure 27:
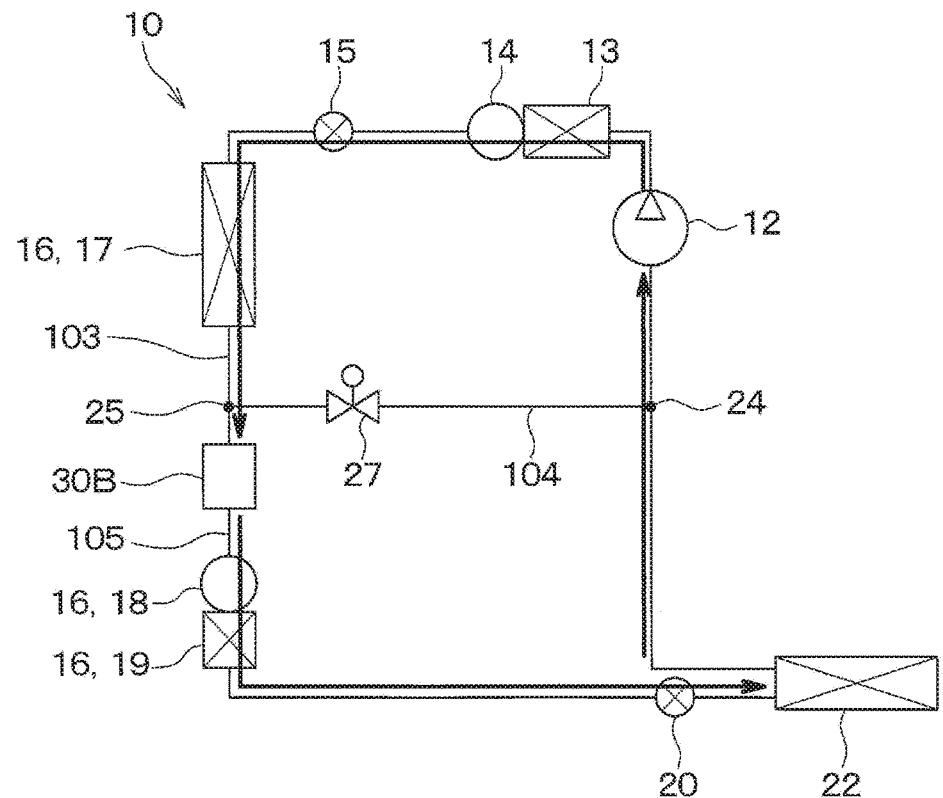
FIG. 27 is a diagram showing a heat pump circuit of a sixth embodiment in the air cooling mode.

As shown in FIG. 27, the heat pump circuit 10 of the present embodiment includes an air heating expansion valve 15, a valve device 30B, and an on-off valve 27, which are configured separately from one another, in place of the integrated valve device 30 of the first embodiment. The heat pump circuit 10 of the present embodiment is provided with a branch portion 25 that branches the refrigerant flowing out of the core portion 17.

Each of the air heating expansion valve 15, the valve device 30B, and the on-off valve 27 operates independently. The air heating expansion valve 15 switches between the opened state and the variable throttle state. The on-off valve 27 is provided between the branch portion 25 and the merging portion 24. The on-off valve 27 opens and closes the air heating flow passage 104. The valve device 30B is provided between the branch portion 25 and the air cooling expansion valve 20. That is, the valve device 30B opens and closes the air cooling flow passage 105. The valve device 30B is an on-off valve that has the differential pressure valve function. In the present embodiment, the on-off valve 27 and the valve device 30B correspond to flow passage switching portions that switch between the cooling side flow passage and the heating side flow passage.

Figure 28:
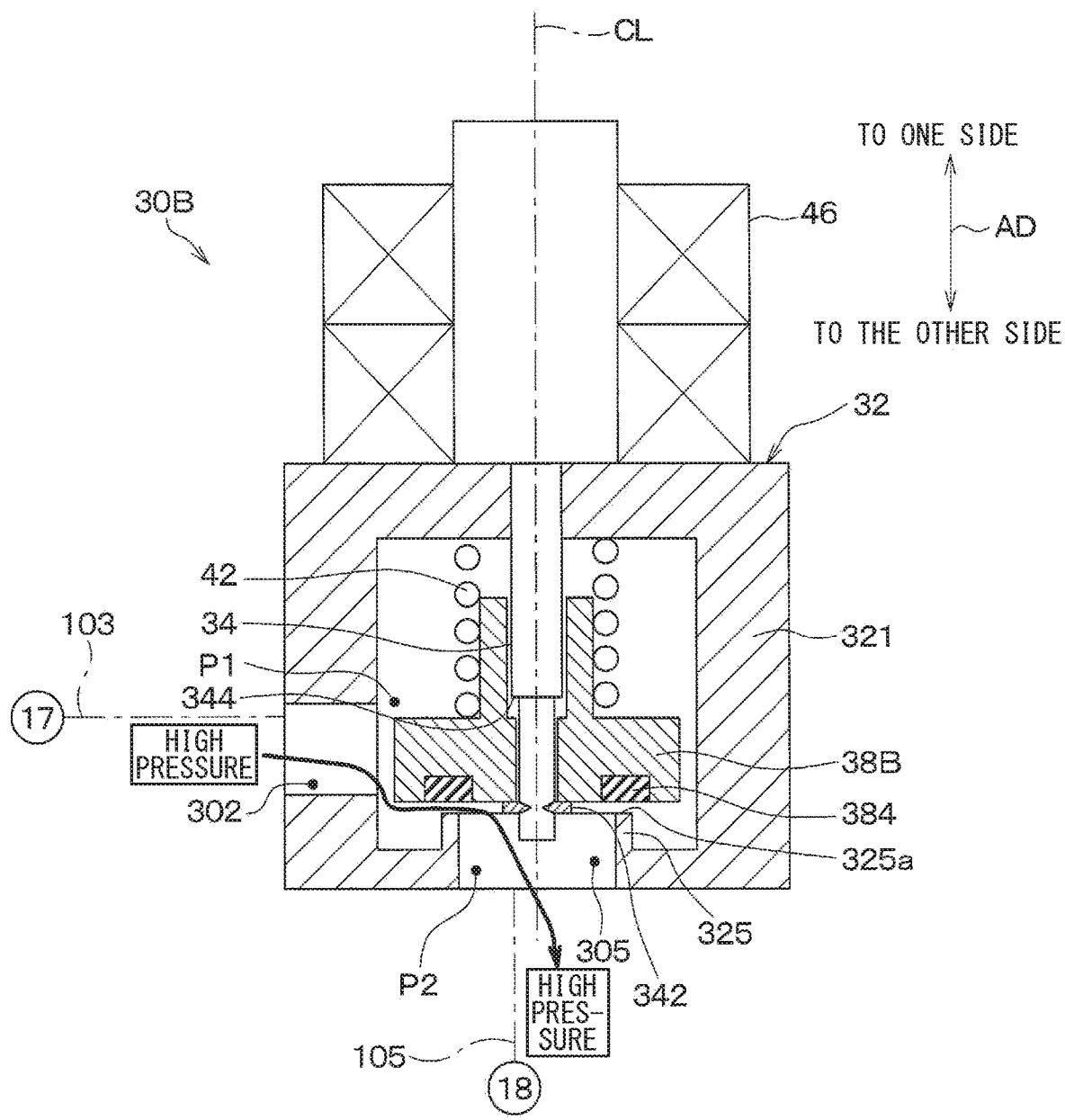
FIG. 28 is a cross-sectional view of a valve device of the sixth embodiment in the air cooling mode.

As shown in FIG. 28, the valve device 30B includes the body portion 32, a valve body 38B, the rod 34, the urging spring 42, and the actuator 46. The valve body 38B and the urging spring 42 correspond to the second valve body 38 and the second urging spring 42 in the integrated valve device 30 of the first embodiment, respectively.

The inlet passage 302 and the outlet passage 305 are formed in the body portion 32. The body portion 32 has the cylindrical portion 321 and a valve seat forming portion 325. The valve seat forming portion 325 corresponds to the third valve seat forming portion 325 in the integrated valve device 30 of the first embodiment.

The inlet passage 302 is formed in the internal space of the body portion 32 at the valve body 38 side with respect to the valve seat forming portion 325. A passage communication hole that communicates with the inlet passage 302 is formed in the valve seat forming portion 325. The passage communication hole constitutes the outlet passage 305.

The valve body 38 opens and closes the outlet passage 305 by coming into contact with and separating from the valve seat 325a of the valve seat forming portion 325. The shape of the valve body 38B is different from that of the valve body 38 in the first embodiment, but the opening and closing operation of the outlet passage 305 is the same as that of the valve body 38 in the first embodiment.

In the air cooling mode, the on-off valve 27 closes the air heating flow passage 104. As shown in FIG. 28, the rod 34 moves upward, so that the rod 34 is located at the air cooling position. At this time, similarly to the first embodiment, the rod 34 urges the valve body 38 upward against the urging force of the urging spring 42. Consequently, the valve body 38 is separated from the valve seat forming portion 325. The inlet passage 302 communicates with the outlet passage 305.

Thus, the high-pressure refrigerant flowing out of the core portion 17 flows into the inlet passage 302 of the valve device 30B, and then flows out of the outlet passage 305. As shown in FIG. 27, the high-pressure refrigerant flowing out of the valve device 30B flows through the air cooling flow passage 105.

Figure 29:
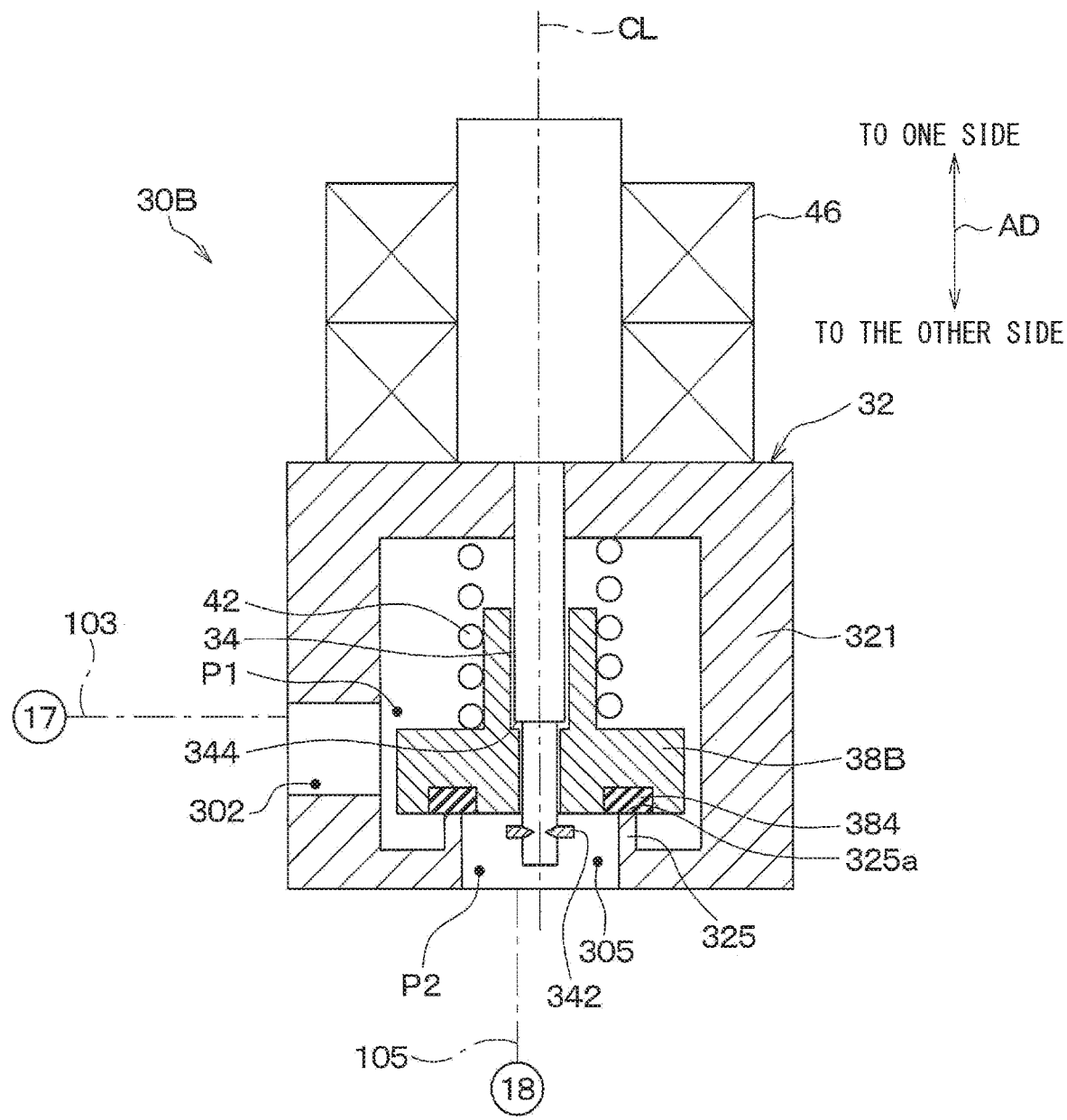
FIG. 29 is a cross-sectional view of the valve device of the sixth embodiment in the air heating mode.
Figure 30:
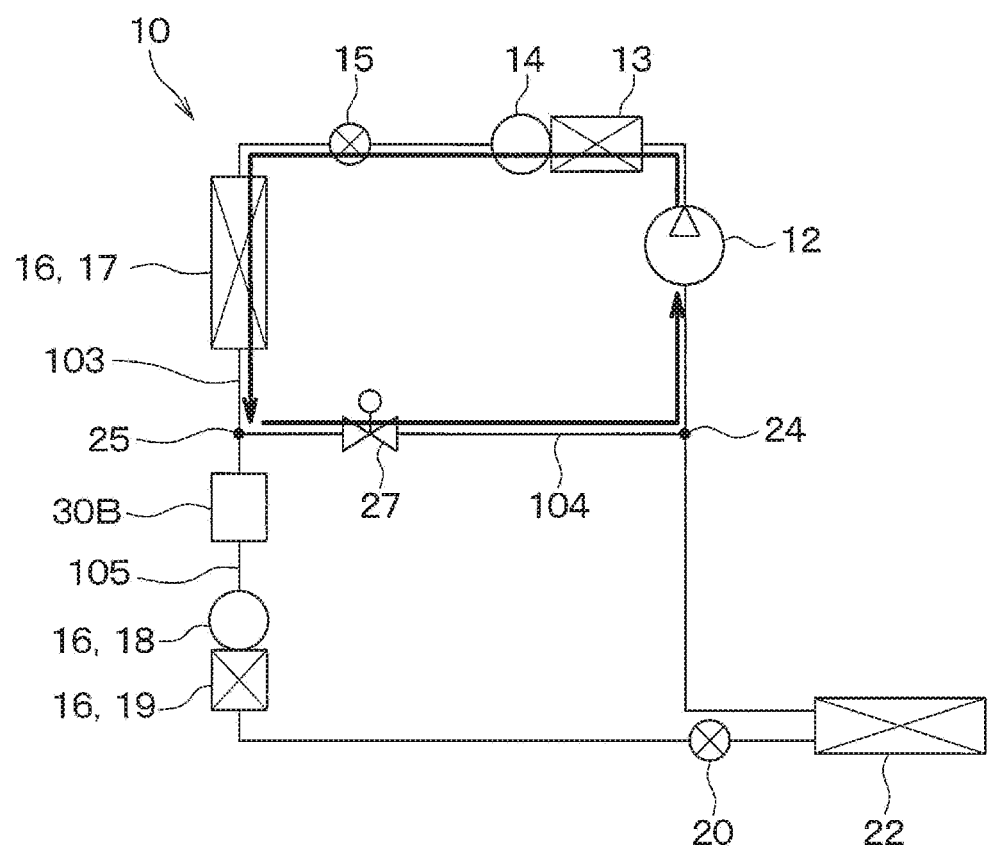
FIG. 30 is a diagram showing the heat pump circuit of the sixth embodiment in the air heating mode.

In the air heating mode, the on-off valve 27 opens the air heating flow passage 104. As shown in FIG. 29, in the valve device 30B, the rod 34 moves downward with respect to the air cooling position, so that the rod 34 is located at the air heating position. At this time, similarly to the first embodiment, the urging spring 42 urges the valve body 38, and the rod 34 does not urge the valve body 38. Consequently, the valve body 38 abuts against the valve seat 325a of the valve seat forming portion 325 to close the outlet passage 305. That is, the valve body 38 closes the air cooling flow passage 105. Thus, as shown in FIG. 30, the low-pressure refrigerant flowing out of the core portion 17 flows through the air heating flow passage 104.

Figure 31:
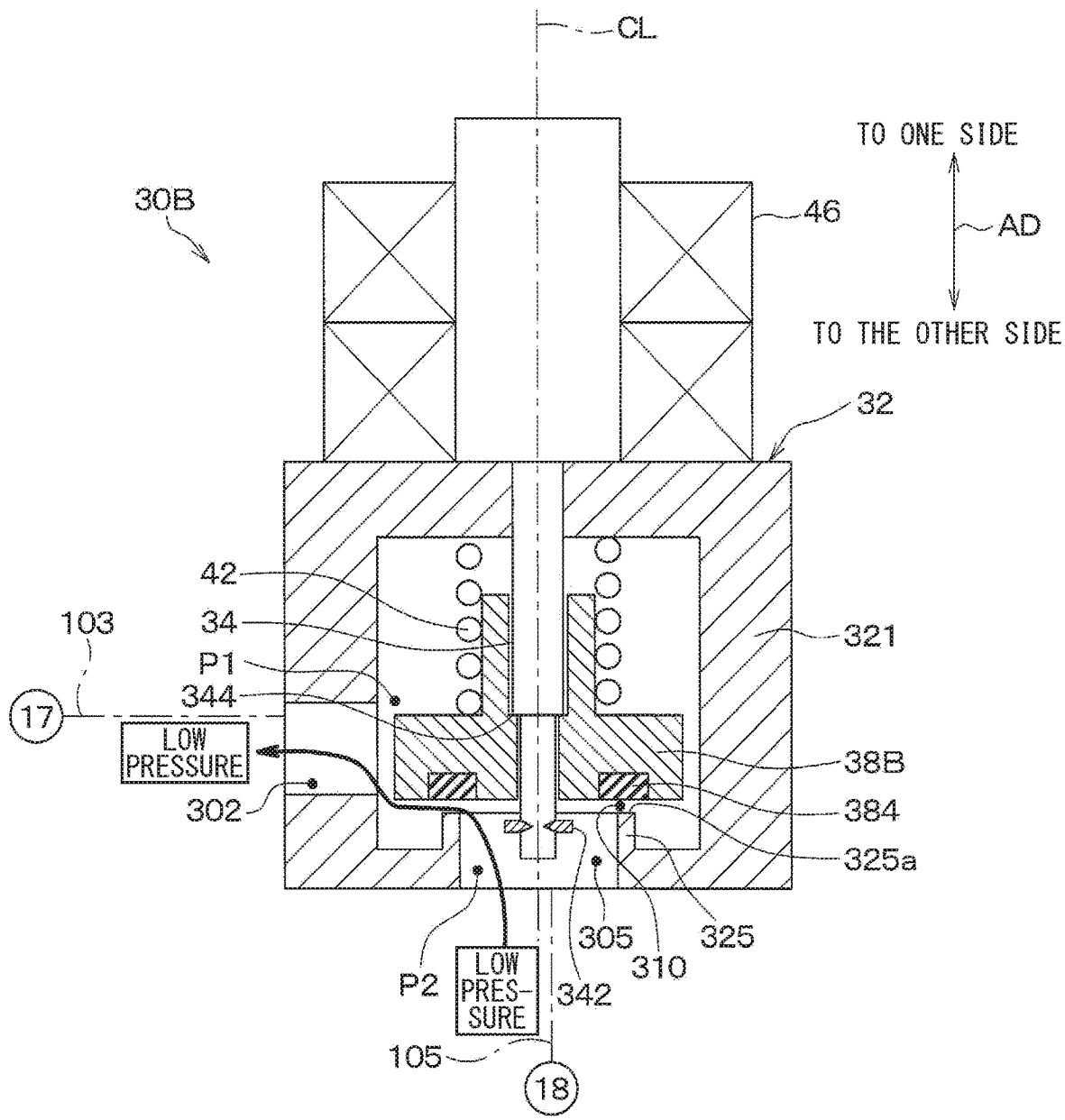
FIG. 31 is a cross-sectional view of the valve device of the sixth embodiment at the start of the air heating mode.

As shown in FIG. 31, at the start of the air heating mode, when the refrigerant pressure P1 of the inlet passage 302 is lower than the refrigerant pressure P2 of the cooling side outlet passage 305 in the valve device 30B, the valve body 38 opens the outlet passage 305 by the pressure difference between these pressures, similarly to the first embodiment. Thus, the valve body 38 causes the pre-evaporator flow passage 107 shown in FIG. 32 to communicate with the low-pressure flow passage 106, without the evaporator 22 interposed therebetween.

Figure 32:
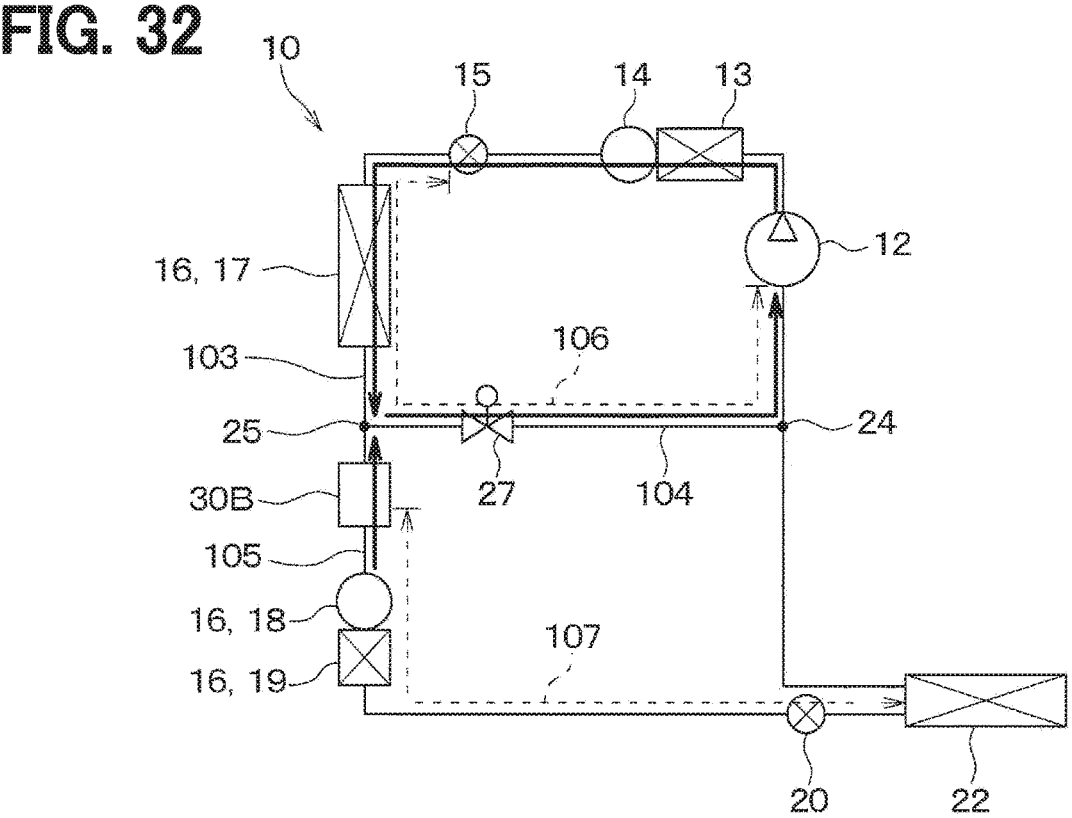
FIG. 32 is a diagram showing the heat pump circuit of the sixth embodiment at the start of the air heating mode.

Consequently, at the start of the air heating mode, as shown in FIG. 31, the liquid refrigerant that remains in the pre-evaporator flow passage 107 flows from the outlet passage 305 to the inlet passage 302 via the communication portion 310 in the valve device 30B and flows out of the valve device 30B. As shown in FIG. 32, the refrigerant flowing out of the valve device 30B is drawn into the compressor 12 via the air heating flow passage 104. Thus, the present embodiment can also obtain the same effects as those in the first embodiment.

The heat pump circuit 10 of the present embodiment uses the valve device 30B, which is an on-off valve that has the differential pressure valve function. Thus, the present embodiment can reduce the number of components constituting the heat pump circuit 10 and can also simplify the configuration of the heat pump cycle device 2.

Seventh Embodiment

The present embodiment differs from the sixth embodiment in the flow direction of the refrigerant in the core portion 17 during the air heating mode.

Figure 33:
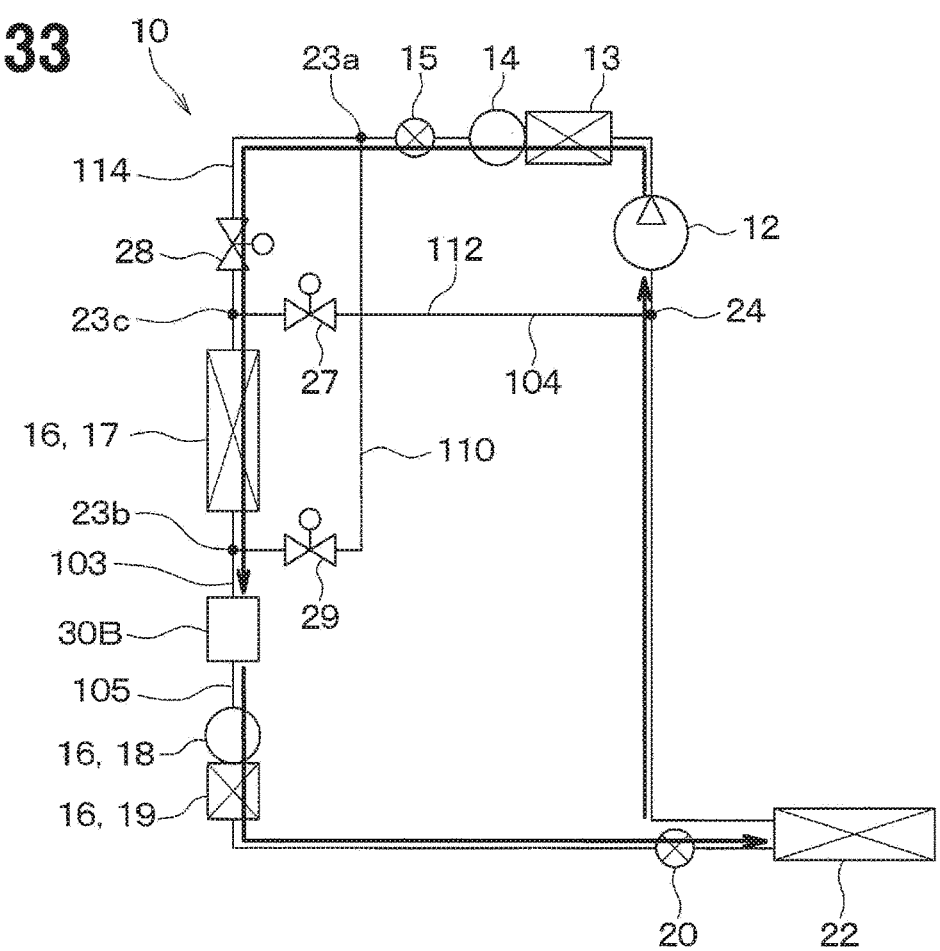
FIG. 33 is a diagram showing a heat pump circuit of a seventh embodiment in the air cooling mode.

As shown in FIG. 33, in the heat pump circuit 10 of the present embodiment, the compressor 12, the coolant-refrigerant heat exchanger 13, the air heating liquid reservoir 14, the air heating expansion valve 15, the core portion 17, the valve device 30B, the liquid receiver 18, the subcooling portion 19, the air cooling expansion valve 20, the evaporator 22, and the compressor 12 are connected to each other in this order. A first connection portion 23a is provided in the refrigerant flow passage between the air heating expansion valve 15 and the core portion 17. A second connection portion 23b is provided in the refrigerant flow passage between the core portion 17 and the valve device 30B. A first bypass flow passage 110 is provided to connect the first connection portion 23a and the second connection portion 23b. A first on-off valve 29 is provided in the first bypass flow passage 110.

A third connection portion 23c is provided in the refrigerant flow passage between the first connection portion 23a and the core portion 17. A fourth connection portion 24 is provided in the refrigerant flow passage between the evaporator 22 and the refrigerant suction side of the compressor 12. A second bypass flow passage 112 is provided to connect the third connection portion 23c and the fourth connection portion 24. A second on-off valve 27 is provided in the second bypass flow passage 112. The fourth connecting portion 24 corresponds to the merging portion 24 of the sixth embodiment. The second on-off valve 27 corresponds to the on-off valve 27 of the sixth embodiment. A third on-off valve 28 is provided in a refrigerant flow passage 114 between the first connection portion 23a and the third connection portion 23c.

The valve device 30B has the same structure as the valve device 30B of the sixth embodiment.

In the air cooling mode, the first on-off valve 29 closes the first bypass flow passage 110. The second on-off valve 27 closes the second bypass flow passage 112. The third on-off valve 28 opens the refrigerant flow passage 114. The valve device 30B opens the air cooling flow passage 105 in the same way as in the sixth embodiment. The air heating expansion valve 15 is in the opened state.

Thus, the refrigerant circuit in the air cooling mode shown in FIG. 33 is configured. In the refrigerant circuit of the air cooling mode, the high-pressure refrigerant discharged from the compressor 12 flows through the coolant-refrigerant heat exchanger 13, the air heating liquid reservoir 14, and the air heating expansion valve 15 in this order, and then flows into the core portion 17. The gas refrigerant flowing into the core portion 17 is condensed into a liquid refrigerant. The refrigerant flowing out of the core portion 17 flows through the liquid receiver 18 and the subcooling portion 19 in this order, and then is decompressed and expanded by the air cooling expansion valve 20. The low-pressure refrigerant decompressed and expanded by the air cooling expansion valve 20 is drawn into the compressor 12 via the evaporator 22.

In the air heating mode, the first on-off valve 29 opens the first bypass flow passage 110. The second on-off valve 27 opens the second bypass flow passage 112. The third on-off valve 28 closes the refrigerant flow passage 114. Similarly to the sixth embodiment, the valve device 30B closes the air cooling flow passage 105.

Figure 34:
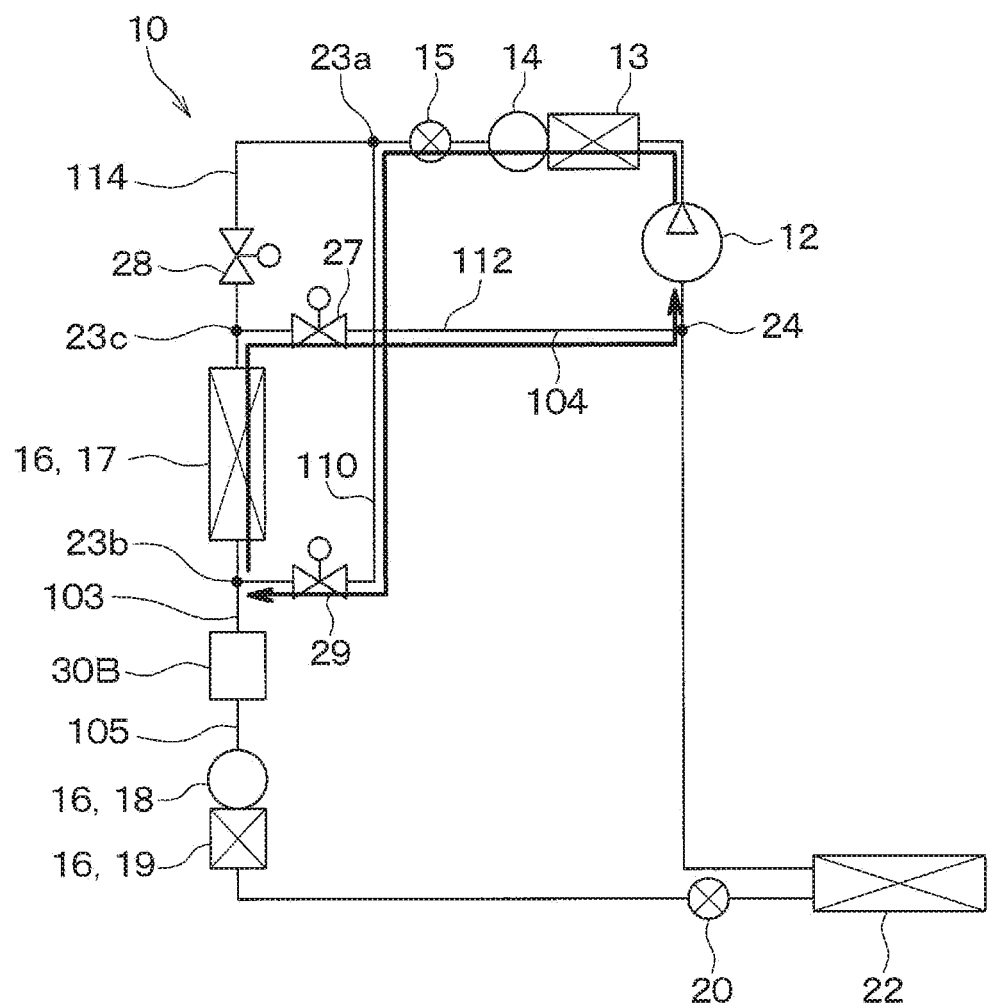
FIG. 34 is a diagram showing the heat pump circuit of the seventh embodiment in the air heating mode.

Thus, the refrigerant circuit in the air heating mode shown in FIG. 34 is configured. In the refrigerant circuit of the air heating mode, the high-pressure refrigerant discharged from the compressor 12 dissipates heat in the coolant-refrigerant heat exchanger 13, and then is decompressed and expanded by the air heating expansion valve 15 via the air heating liquid reservoir 14. The low-pressure refrigerant decompressed and expanded by the air heating expansion valve 15 flows into the core portion 17 via the first bypass flow passage 110. The liquid refrigerant flowing into the core portion 17 evaporates to become a gas refrigerant. The refrigerant flowing out of the core portion 17 is drawn into the compressor 12 via the second bypass flow passage 112.

Therefore, in the present embodiment, the second bypass flow passage 112 corresponds to a heating side flow passage that guides the refrigerant flowing out of the heat exchanger to the compressor, while bypassing the second decompressor and the evaporator in the heating mode. The first on-off valve 29, the second on-off valve 27, the third on-off valve 28, and the valve device 30B correspond to flow passage switching portions that switch between the cooling side flow passage and the heating side flow passage.

The flow direction in which the refrigerant flows through the core portion 17 in the air cooling mode is the direction from the third connection portion 23c to the second connection portion 23b. The flow direction in which the refrigerant flows through the core portion 17 in the air heating mode is the direction from the second connection portion 23b to the third connection portion 23c. Thus, the flow direction in which the refrigerant flows through the core portion 17 in the air heating mode is opposite to the flow direction in which the refrigerant flows through the core portion 17 in the air cooling mode.

Here, the gas refrigerant has a lower density than the liquid refrigerant. Thus, a first region and a second region which is smaller than the first region are set in the core portion 17. The first region has a large total flow passage cross-sectional area of the flow passages through each of which the refrigerant flows. For example, the number of tubes in the first region is greater than that in the second region. In the present embodiment, the flow direction in which the refrigerant flows through the core portion 17 is reversed depending on the air conditioning mode, such as the air cooling mode or the air heating mode. Due to this, in either the air cooling mode or the air heating mode, the core portion can be configured to cause the gas refrigerant to flow through the first region and the liquid refrigerant to flow through the second region. Thus, the pressure loss of the refrigerant that would otherwise occur when the refrigerant flows through the core portion 17 can be reduced.

Figure 35:
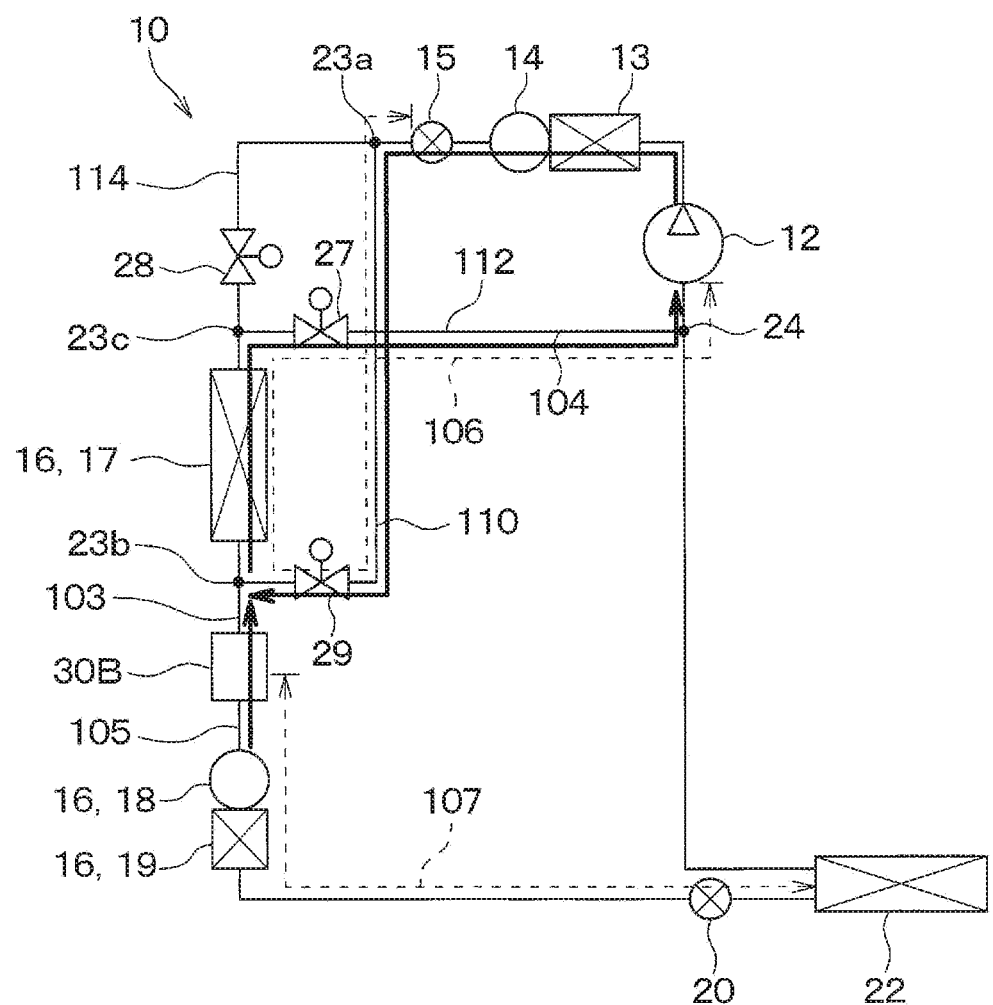
FIG. 35 is a diagram showing the heat pump circuit of the seventh embodiment at the start of the air heating mode.

At the start of the air heating mode, as shown in FIG. 31, the valve body 38 opens the outlet passage 305, similarly to the sixth embodiment. Thus, as shown in FIG. 35, the liquid refrigerant remaining in the pre-evaporator flow passage 107 is drawn into the compressor 12 via the valve device 30B and the core portion 17. Thus, the present embodiment can also obtain the same effects as those in the first embodiment.

In the heat pump circuit 10 of the present embodiment, the valve device 30B is used. However, instead of the valve device 30B, the valve device 30A may be used.

Other Embodiments (1) In the above-mentioned respective embodiments, each of the integrated valve device 30, the valve device 30A, and the valve device 30B has the differential pressure valve function. In the air heating mode, when the refrigerant pressure in the low-pressure flow passage 106 is lower than the refrigerant pressure in the pre-evaporator flow passage 107 and when a pressure difference between both the pressures is larger than the predetermined value, the valve devices 30, 30A, and 30B open the air cooling flow passage 105. Consequently, the pre-evaporator flow passage 107 communicates with the low-pressure flow passage 106, without the evaporator 22 interposed therebetween.

Figure 36:
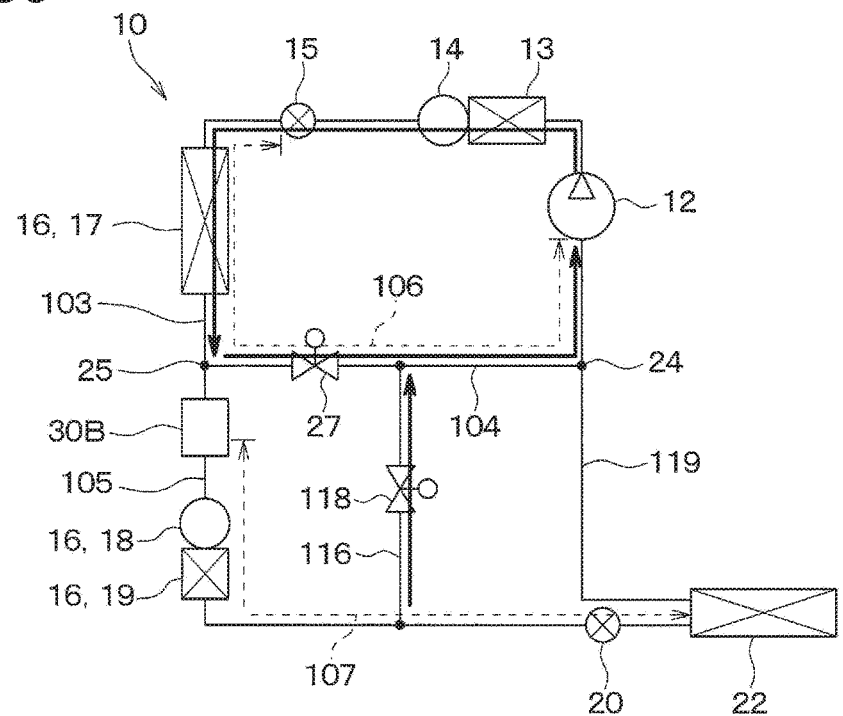
FIG. 36 is a diagram showing the heat pump circuit of an another embodiment at the start of the air heating mode.

However, a valve device different from the valve devices 30, 30A, and 30B may cause the pre-evaporator flow passage 107 to communicate with the low-pressure flow passage 106, without the evaporator 22 interposed therebetween. For example, as shown in FIG. 36, the heat pump circuit 10 of the sixth embodiment shown in FIG. 27 is provided with a recovery flow passage 116 and a recovery on-off valve 118. The recovery flow passage 116 is a refrigerant flow passage that causes the pre-evaporator flow passage 107 to communicate with the low-pressure flow passage 106, without the evaporator 22 interposed therebetween, when the valve body 38B closes the air cooling flow passage 105. The recovery on-off valve 118 opens and closes the recovery flow passage 116. The recovery on-off valve 118 corresponds to a part of the flow passage switching portion that switches the refrigerant flow passage in the refrigerant circulation circuit. Unlike the present embodiment, the valve device 30B does not have the differential pressure valve function.

At the start of the air heating mode, the controller 100 controls the recovery on-off valve 118 so that the recovery on-off valve 118 opens the recovery flow passage 116. At this time, a pressure sensor detects the respective refrigerant pressures of the low-pressure flow passage 106 and the pre-evaporator flow passage 107. The controller 100 opens the recovery on-off valve 118 when the refrigerant pressure in the low-pressure flow passage 106 detected by the pressure sensor is lower than the refrigerant pressure in the pre-evaporator flow passage 107 detected by the pressure sensor, by a predetermined value or more. Alternatively, the controller 100 has a timer for measuring the elapsed time immediately after the start of the air heating mode. The controller 100 may open the recovery on-off valve 118 only for a predetermined period of time when the air heating mode is started.

Consequently, the pre-evaporator flow passage 107 communicates with the low-pressure flow passage 106 via the recovery flow passage 116. In this way, the flow passage switching portion causes the pre-evaporator flow passage 107 to communicate with the low-pressure flow passage 106, without the evaporator 22 interposed therebetween, in the air heating mode when the refrigerant pressure in the low-pressure flow passage 106 is lower than the refrigerant pressure in the pre-evaporator flow passage 107 and when the pressure difference between both the pressures is larger than the predetermined value. In the air heating mode, when the pressure difference between both the pressures is smaller than the predetermined value, the flow passage switching portion may be configured not to cause the pre-evaporator flow passage 107 to communicate with the low-pressure flow passage 106 while bypassing the evaporator 22. Thus, the present embodiment can also achieve the same effects as those in the first embodiment.

When the compressor 12 is stopped, the controller 100 may activate the compressor 12 to start the air heating mode after the recovery on-off valve 118 opens the recovery flow passage 116. In this case, at the start of the air heating mode, the refrigerant in the pre-evaporator flow passage 107 flows to the low-pressure flow passage 106. Thus, also in this case, the flow passage switching portion causes the pre-evaporator flow passage 107 to communicate with the low-pressure flow passage 106, without the evaporator 22 interposed therebetween, at the start of the air heating mode when the refrigerant pressure in the low-pressure flow passage 106 is lower than the refrigerant pressure in the pre-evaporator flow passage 107 and when the pressure difference between both the pressures is larger than the predetermined value.

In FIG. 36, a portion of the recovery flow passage 116 at the low-pressure flow passage 106 side is connected to the refrigerant flow passage between the branch portion 25 and the merging portion 24. However, the portion of the recovery flow passage 116 at the low-pressure flow passage 106 side may be connected to another position in the low-pressure flow passage 106 that leads from the refrigerant outlet of the air heating expansion valve 15 to the refrigerant suction port of the compressor 12. The low-pressure flow passage 106 side of the recovery flow passage 116 may be connected to an evaporator downstream side flow passage 119 between the refrigerant outlet of the evaporator 22 and the merging portion 24. Even in this case, when the recovery on-off valve 118 opens the recovery flow passage 116, the pre-evaporator flow passage 107 communicates with the low-pressure flow passage 106 via the recovery flow passage 116 and the evaporator downstream side flow passage 119.

Figure 37:
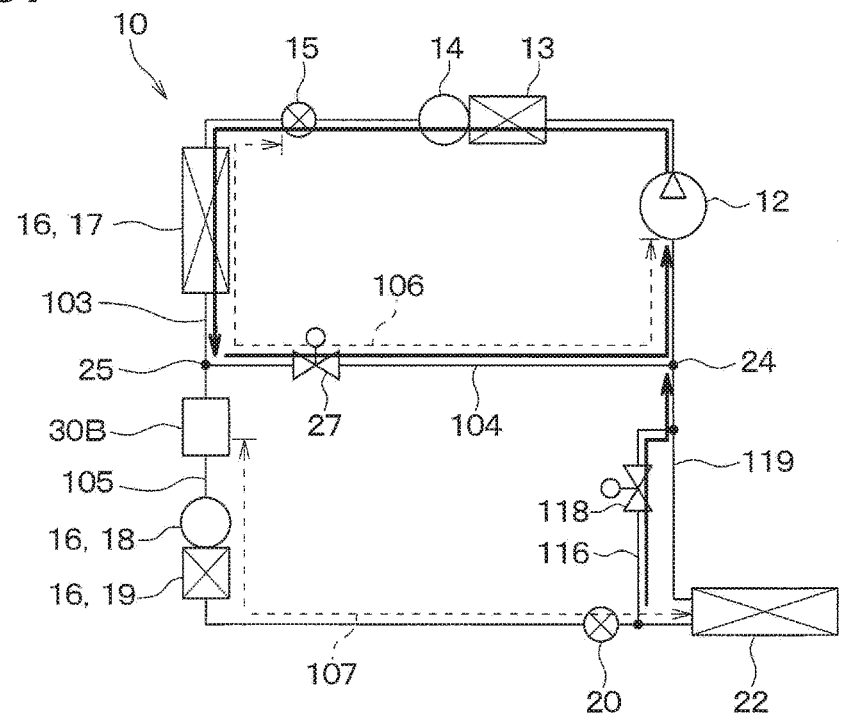
FIG. 37 is a diagram showing the heat pump circuit of a further another embodiment at the start of the air heating mode.

A portion of the recovery flow passage 116 at the pre-evaporator flow passage 107 side may be connected to any position of the air cooling flow passage 105 between the valve body 38, 38B and the refrigerant inlet of the evaporator 22. For example, in the example shown in FIG. 37, the portion of the recovery flow passage 116 at the pre-evaporator flow passage 107 side may be connected to a refrigerant flow passage between the refrigerant outlet of the air cooling expansion valve 20 and the refrigerant inlet of the evaporator 22. The portion of the recovery flow passage 116 at the low-pressure flow passage 106 side may be connected to the evaporator downstream side flow passage 119 between the refrigerant outlet of the evaporator 22 and the merging portion 24. Even this case can also achieve the same effects as those in the first embodiment.

(2) In the above-described respective embodiments, when the pressure difference is smaller than the predetermined value in the air heating mode, these valve devices 30, 30A, and 30B close the air cooling flow passage 105. Thus, the pre-evaporator flow passage 107 does not communicate with the low-pressure flow passage 106. However, if the refrigerant flow in the evaporator 22 is suppressed in the air heating mode, the air cooling flow passage 105 may remain open.

(3) In the above-mentioned respective embodiments, the refrigerant does not flow through the liquid receiver 18 in the refrigerant circuit of the air heating mode, but the refrigerant may flow through the liquid receiver 18. When the refrigerant circuit in the air heating mode is configured not to cause the refrigerant to flow through the liquid receiver 18, similarly to the above-mentioned respective embodiments, it takes time to recover the liquid refrigerant present in the liquid receiver 18 at the start of the air heating mode, which could be a serious issue. Therefore, the heat pump cycle device of the present disclosure is preferably applied to a heat pump cycle device that has a refrigerant circuit configured not to cause the refrigerant to flow through the liquid receiver 18 in the air heating mode.

(4) In the above-mentioned respective embodiments, the exterior heat exchanger 16 includes the liquid receiver 18 and the subcooling portion 19. However, the exterior heat exchanger 16 may not include the liquid receiver 18 and the subcooling portion 19.

(5) In the above-mentioned respective embodiments, the heat pump cycle device 2 of the present disclosure is applied to the vehicle air conditioner 1, but may be used in other applications. Examples of other applications include systems for hot water supply and air cooling.

(6) The present disclosure is not limited to the above-mentioned embodiments and can be modified appropriately within the scope of claims. The present disclosure may also include various modifications and their equivalents. The above-mentioned respective embodiments are not irrelevant to each other, and any combination of the embodiments may be implemented as appropriate, except when the combination seems obviously impossible. It is obvious that in the above-mentioned respective embodiments, the elements included in the embodiments are not necessarily essential particularly unless otherwise specified to be essential, except when clearly considered to be essential in principle, and the like. When referring to a specific number about a component in the above-mentioned embodiments, including the number, a numerical value, an amount, a range, and the like regarding the component, the component should not be limited to the specific number particularly unless otherwise specified to be essential and except when clearly limited to the specific number in principle. Even when referring to the material, shape, and positional relationship of the components and the like of the respective embodiments described above, the embodiments are not limited to such a material, shape, or positional relationship unless otherwise specified and except when obviously limited to the specific material, shape, positional relationship, and the like in principle.

According to a first aspect of a part or all of the above-mentioned respective embodiments, a heat pump cycle device includes a compressor, a radiator, a first decompressor, a heat exchanger, a second decompressor, an evaporator, and a flow passage switching portion. The flow passage switching portion switches between a cooling side flow passage and a heating side flow passage. The flow passage switching portion is provided between the heat exchanger and the second decompressor and includes a flow passage switching valve body that opens and closes the cooling side flow passage. The flow passage switching valve body opens the cooling side flow passage in the cooling mode and closes the cooling side flow passage in the heating mode. The flow passage switching portion causes the pre-evaporator flow passage to communicate with the low-pressure flow passage while bypassing the evaporator when a refrigerant pressure in the low-pressure flow passage is lower than a refrigerant pressure in the pre-evaporator flow passage in the heating mode.

According to a second aspect, the flow passage switching portion causes the pre-evaporator flow passage to communicate with the low-pressure flow passage, without the evaporator interposed therebetween, when the refrigerant pressure in the low-pressure flow passage is lower than the refrigerant pressure in the pre-evaporator flow passage, and when a pressure difference between the refrigerant pressure in the low-pressure flow passage and the refrigerant pressure in the pre-evaporator flow passage is larger than a predetermined value in the heating mode. In the heating mode, the flow passage switching portion does not causes the pre-evaporator flow passage to communicate with the low-pressure flow passage when the pressure difference is smaller than the predetermined value. In this way, preferably, the pre-evaporator flow passage does not communicate with the low-pressure flow passage when the pressure difference is smaller than the predetermined value in the heating mode.

According to a third aspect, the flow passage switching valve body is configured to open the cooling side flow passage by operating an actuator to drive the flow passage switching valve body in the cooling mode and to close the cooling side flow passage by operating the actuator in the heating mode. The flow passage switching valve body opens the cooling side flow passage by the pressure difference when the pressure difference is larger than the predetermined value in the heating mode. Thus, in such a case, the pre-evaporator flow passage can communicate with the low-pressure flow passage while bypassing the evaporator. The flow passage switching valve body closes the cooling side flow passage when the pressure difference is smaller than the predetermined value in the heating mode. Thus, in such a case, the pre-evaporator flow passage can be caused not to communicate with the low-pressure flow passage while bypassing the evaporator.

Thus, the refrigerant can be recovered at the start of the heating mode without adding any other flow passage switching portion for recovering the refrigerant.

According to a fourth aspect, the flow passage switching valve body closes the heating side flow passage by operating the actuator in the cooling mode and opens the heating side flow passage by operating the actuator in the heating mode. The flow passage switching valve body opens the cooling side flow passage by the pressure difference while maintaining an opened state of the heating side flow passage when the pressure difference is larger than the predetermined value in the heating mode. On the other hand, the flow passage switching valve body closes the cooling side flow passage and brings the heating side flow passage into the opened state when the pressure difference is smaller than the predetermined value in the heating mode. In this way, by using the three-way valve having the differential pressure valve function, the number of components constituting the refrigerant circulation circuit can be reduced, thus simplifying the configuration of the heat pump cycle device.

According to a fifth aspect, the refrigerant circulation circuit includes: a body portion configured to accommodate therein the flow passage switching valve body; and a shaft member driven by the actuator. The body portion defines therein a decompressor passage through which the refrigerant flowing out of the radiator is guided to the heat exchanger, an introduction passage into which the refrigerant flowing out of the heat exchanger is introduced, a heating side lead-out passage through which the refrigerant is led out to the heating side flow passage, and a cooling side lead-out passage through which the refrigerant is led out to the cooling side flow passage. The first decompressor is accommodated within the body portion and includes a decompression valve body configured to adjust a flow rate of the refrigerant flowing through the decompressor passage. The flow passage switching valve body switches between a first communication state in which the introduction passage communicates with the heating side lead-out passage while closing the cooling side lead-out passage and a second communication state in which the introduction passage communicates with the cooling side lead-out passage while closing the heating side lead-out passage. The shaft member interlocks the flow passage switching valve body with the decompression valve body. In this way, by using the valve device that integrates therein the three-way valve having the differential pressure valve function and the air heating expansion valve, the number of components constituting the refrigerant circulation circuit can be reduced, thereby simplifying the configuration of the heat pump cycle device.

According to a sixth aspect, the refrigerant circulation circuit includes a liquid receiver. A liquid reservoir is formed inside the liquid receiver so as to temporarily store part of the refrigerant flowing out of the heat exchanger. The body portion is accommodated within the liquid receiver. Thus, the valve device is integrated with the liquid receiver. Thus, the number of components constituting the refrigerant circulation circuit can be reduced, thereby simplifying the configuration of the heat pump cycle device.

According to a seventh aspect, the body portion is disposed above the liquid reservoir within the liquid receiver. The refrigerant circulation circuit includes a pipe that is connected to the cooling side lead-out passage in the body portion and causes the cooling side lead-out passage to communicate with the liquid reservoir. Thus, at the start of the heating mode, the refrigerant present in the liquid reservoir can be caused to flow into the compressor.

According to an eighth aspect, a valve device is used in a heat pump cycle device that is configured to be switchable between a cooling side flow passage through which the refrigerant flowing out of the heat exchanger is guided to the compressor via the second decompressor and the evaporator in a cooling mode and a heating side flow passage through which the refrigerant flowing out of the heat exchanger is guided to the compressor while bypassing the second decompressor and the evaporator in a heating mode. The valve device is provided between the heat exchanger and the second decompressor and includes a flow passage switching valve body configured to open and close the cooling side flow passage. The flow passage switching valve body is configured to open the cooling side flow passage by operating an actuator to drive the flow passage switching valve body in the cooling mode and to close the cooling side flow passage by operating the actuator in the heating mode. When the refrigerant pressure in the low-pressure flow passage is lower than the refrigerant pressure in the pre-evaporator flow passage, and when a pressure difference between the refrigerant pressure in the low-pressure flow passage and the refrigerant pressure in the pre-evaporator flow passage is larger than a predetermined value in the heating mode, the flow passage switching valve body opens the cooling side flow passage by the pressure difference. Thus, the pre-evaporator flow passage communicates with the low-pressure flow passage while bypassing the evaporator. The flow passage switching valve body closes the cooling side flow passage when the pressure difference is smaller than the predetermined value in the heating mode. Thus, the pre-evaporator flow passage does not communicate with the low-pressure flow passage.

According to a ninth aspect, the flow passage switching valve body closes the heating side flow passage by operating the actuator in the cooling mode and opens the heating side flow passage by operating the actuator in the heating mode. The flow passage switching valve body opens the cooling side flow passage by the pressure difference while maintaining an opened state of the heating side flow passage when the pressure difference is larger than the predetermined value in the heating mode. On the other hand, the flow passage switching valve body closes the cooling side flow passage and brings the heating side flow passage into the opened state when the pressure difference is smaller than the predetermined value in the heating mode. In this way, the configuration of the heat pump cycle device can be simplified by using the three-way valve having the differential pressure valve function.

According to a tenth aspect, the valve device further includes a body portion configured to accommodate therein the flow passage switching valve body, a decompression valve body accommodated in the body portion and constituting the first decompressor, and a shaft member driven by the actuator. The body portion defines therein a decompressor passage through which the refrigerant flowing out of the radiator is guided to the heat exchanger, an introduction passage into which the refrigerant flowing out of the heat exchanger is introduced, a heating side lead-out passage through which the refrigerant is led out to the heating side flow passage, and a cooling side lead-out passage through which the refrigerant is led out to the cooling side flow passage. The decompression valve body adjusts a flow rate of the refrigerant flowing through the decompressor passage. The flow passage switching valve body switches between a first communication state in which the introduction passage communicates with the heating side lead-out passage while closing the cooling side lead-out passage and a second communication state in which the introduction passage communicates with the cooling side lead-out passage while closing the heating side lead-out passage. The shaft member interlocks the flow passage switching valve body with the decompression valve body. In this way, the configuration of the heat pump cycle device can be simplified by using the valve device that integrates therein the three-way valve having the differential pressure valve function and the air heating expansion valve.

According to an eleventh aspect, the heat pump cycle device further includes a liquid receiver. A liquid reservoir is formed inside the liquid receiver so as to temporarily store part of the refrigerant flowing out of the heat exchanger. The body portion is accommodated within the liquid receiver. Thus, the valve device is integrated with the liquid receiver. Consequently, the configuration of the heat pump cycle device can be simplified.

According to a twelfth aspect, the body portion is disposed above the liquid reservoir within the liquid receiver. The valve device includes a pipe that is connected to the cooling side lead-out passage in the body portion and causes the cooling side lead-out passage to communicate with the liquid reservoir. Thus, at the start of the heating mode, the refrigerant present in the liquid reservoir can be caused to flow into the compressor.

What is claimed is:

1. A heat pump cycle device including a refrigerant circulation circuit in which a refrigerant circulates and flows, the heat pump cycle device comprising:
    a compressor configured to compress and discharge a refrigerant drawn into the compressor;
    a radiator configured to dissipate heat from the refrigerant discharged from the compressor;
    a first decompressor configured to decompress and expand the refrigerant flowing out of the radiator;
    a heat exchanger configured to exchange heat between the refrigerant and a heat medium other than the refrigerant;
    a second decompressor configured to decompress and expand the refrigerant flowing out of the heat exchanger;
    an evaporator configured to evaporate the refrigerant decompressed and expanded by the second decompressor; and
    a flow passage switching portion configured to switch a refrigerant flow passage in the refrigerant circulation circuit, wherein
    the flow passage switching portion switches between a cooling side flow passage through which the refrigerant flowing out of the heat exchanger is guided to the compressor via the second decompressor and the evaporator in a cooling mode and a heating side flow passage through which the refrigerant flowing out of the heat exchanger is guided to the compressor while bypassing the second decompressor and the evaporator in a heating mode,
    the flow passage switching portion includes a flow passage switching valve body that is located between the heat exchanger and the second decompressor to open and close the cooling side flow passage,
    the flow passage switching valve body is configured to open the cooling side flow passage in the cooling mode and to close the cooling side flow passage in the heating mode,
    the refrigerant circulation circuit includes a low-pressure flow passage through which a low-pressure refrigerant decompressed by the first decompressor and having a pressure lower than a pressure of the refrigerant discharged from the compressor flows toward the compressor in the heating mode, and a pre-evaporator flow passage provided between the flow passage switching valve body and a refrigerant inlet of the evaporator,
    the flow passage switching portion is configured to cause the pre-evaporator flow passage to communicate with the low-pressure flow passage while bypassing the evaporator when a refrigerant pressure in the low-pressure flow passage is lower than a refrigerant pressure in the pre-evaporator flow passage in the heating mode,
    the flow passage switching portion is configured to cause the pre-evaporator flow passage to communicate with the low-pressure flow passage while bypassing the evaporator when the refrigerant pressure in the low-pressure flow passage is lower than the refrigerant pressure in the pre-evaporator flow passage and when a pressure difference between the refrigerant pressure in the low-pressure flow passage and the refrigerant pressure in the pre-evaporator flow passage is larger than a predetermined value in the heating mode, and
    the flow passage switching portion is configured to shut a communication of the pre-evaporator flow passage with the low-pressure flow passage while the refrigerant bypassing the evaporator when the pressure difference is smaller than the predetermined value in the heating mode.

2. The heat pump cycle device according to claim 1, wherein
    the flow passage switching valve body is configured to be driven by an actuator, so as to open the cooling side flow passage in the cooling mode and to close the cooling side flow passage in the heating mode,
    the flow passage switching valve body is configured to open the cooling side flow passage by the pressure difference when the pressure difference is larger than the predetermined value in the heating mode, and
    the flow passage switching valve body is configured to close the cooling side flow passage when the pressure difference is smaller than the predetermined value in the heating mode.

3. The heat pump cycle device according to claim 2, wherein
    the flow passage switching valve body closes the heating side flow passage by operating the actuator in the cooling mode and opens the heating side flow passage by operating the actuator in the heating mode,
    the flow passage switching valve body opens the cooling side flow passage by the pressure difference while maintaining an opened state of the heating side flow passage when the pressure difference is larger than the predetermined value in the heating mode, and
    the flow passage switching valve body closes the cooling side flow passage and brings the heating side flow passage into the opened state when the pressure difference is smaller than the predetermined value in the heating mode.

4. The heat pump cycle device according to claim 3, wherein
the refrigerant circulation circuit comprises:
a body portion configured to accommodate the flow passage switching valve body; and
a shaft member driven by the actuator,
the body portion defines therein a decompressor passage through which the refrigerant flowing out of the radiator is guided to the heat exchanger, an introduction passage into which the refrigerant flowing out of the heat exchanger is introduced, a heating side lead-out passage through which the refrigerant is led out to the heating side flow passage, and a cooling side lead-out passage through which the refrigerant is led out to the cooling side flow passage,
the first decompressor is accommodated within the body portion and includes a decompression valve body configured to adjust a flow rate of the refrigerant flowing through the decompressor passage,
the flow passage switching valve body switches between a first communication state in which the introduction passage communicates with the heating side lead-out passage while closing the cooling side lead-out passage and a second communication state in which the introduction passage communicates with the cooling side lead-out passage while closing the heating side lead-out passage, and
the shaft member interlocks the flow passage switching valve body with the decompression valve body.

5. The heat pump cycle device according to claim 4, wherein
the refrigerant circulation circuit includes a liquid receiver,
a liquid reservoir is formed inside the liquid receiver so as to temporarily store a part of the refrigerant flowing out of the heat exchanger, and
the body portion is accommodated within the liquid receiver.

6. The heat pump cycle device according to claim 5, wherein
the body portion is disposed above the liquid reservoir within the liquid receiver, and
the refrigerant circulation circuit includes a pipe connected to the cooling side lead-out passage in the body portion, the pipe being configured to cause the cooling side lead-out passage to communicate with the liquid reservoir.

7. A valve device used in a heat pump cycle device, the heat pump cycle device comprising:
a compressor configured to compress and discharge a refrigerant drawn into the compressor;
a radiator configured to dissipate heat from the refrigerant discharged from the compressor;
a first decompressor configured to decompress and expand the refrigerant flowing out of the radiator;
a heat exchanger configured to exchange heat between the refrigerant and a heat medium other than the refrigerant;
a second decompressor configured to decompress and expand the refrigerant flowing out of the heat exchanger; and
an evaporator configured to evaporate the refrigerant decompressed and expanded by the second decompressor, wherein the heat pump cycle device is switchable between a cooling side flow passage through which the refrigerant flowing out of the heat exchanger is guided to the compressor via the second decompressor and the evaporator in a cooling mode and a heating side flow passage through which the refrigerant flowing out of the heat exchanger is guided to the compressor while bypassing the second decompressor and the evaporator in a heating mode, wherein
the valve device is provided between the heat exchanger and the second decompressor, the valve device including a flow passage switching valve body configured to open and close the cooling side flow passage,
the flow passage switching valve body is configured to open the cooling side flow passage by operating an actuator to drive the flow passage switching valve body in the cooling mode and to close the cooling side flow passage by operating the actuator in the heating mode,
the heat pump cycle device includes a low-pressure flow passage through which a low-pressure refrigerant decompressed by the first decompressor and having a pressure lower than a pressure of the refrigerant discharged from the compressor flows toward the compressor in the heating mode, and a pre-evaporator flow passage provided between the flow passage switching valve body and a refrigerant inlet of the evaporator, and
the flow passage switching valve body opens the cooling side flow passage by a pressure difference, the pressure difference being a difference between the refrigerant pressure in the low-pressure flow passage and the refrigerant pressure in the pre-evaporator flow passage, when the refrigerant pressure in the low-pressure flow passage is lower than the refrigerant pressure in the pre-evaporator flow passage and when the pressure difference is larger than a predetermined value in the heating mode, and
the flow passage switching valve body closes the cooling side flow passage when the pressure difference is smaller than the predetermined value in the heating mode.

8. The valve device according to claim 7, wherein
the flow passage switching valve body closes the heating side flow passage by operating the actuator in the cooling mode and opens the heating side flow passage by operating the actuator in the heating mode,
the flow passage switching valve body opens the cooling side flow passage by the pressure difference while maintaining an opened state of the heating side flow passage when the pressure difference is larger than the predetermined value in the heating mode, and
the flow passage switching valve body closes the cooling side flow passage and brings the heating side flow passage into the opened state when the pressure difference is smaller than the predetermined value in the heating mode.

9. The valve device according to claim 8, further comprising:
a body portion configured to accommodate therein the flow passage switching valve body;
a decompression valve body accommodated in the body portion and constituting the first decompressor; and
a shaft member driven by the actuator, wherein
the body portion defines therein a decompressor passage through which the refrigerant flowing out of the radiator is guided to the heat exchanger, an introduction passage into which the refrigerant flowing out of the heat exchanger is introduced, a heating side lead-out passage through which the refrigerant is led out to the heating side flow passage, and a cooling side lead-out passage through which the refrigerant is led out to the cooling side flow passage, the decompression valve body is configured to adjust a flow rate of the refrigerant flowing through the decompressor passage, the flow passage switching valve body switches between a first communication state in which the introduction passage communicates with the heating side lead-out passage while closing the cooling side lead-out passage and a second communication state in which the introduction passage communicates with the cooling side lead-out passage while closing the heating side lead-out passage, and the shaft member interlocks the flow passage switching valve body with the decompression valve body.

10. The valve device according to claim 9, wherein the heat pump cycle device further includes a liquid receiver, a liquid reservoir is formed inside the liquid receiver so as to temporarily store a part of the refrigerant flowing out of the heat exchanger, and the body portion is accommodated within the liquid receiver.

11. The valve device according to claim 10, wherein the body portion is disposed above the liquid reservoir within the liquid receiver, and the valve device includes a pipe connected to the cooling side lead-out passage in the body portion, the pipe being configured to cause the cooling side lead-out passage to communicate with the liquid reservoir.

* * * * *